Oct. 19, 1965 H. B. GARRETT ETAL 3,213,275
CENTRALIZED TRAFFIC CONTROL SYSTEM FOR RAILROADS
Filed Sept. 15, 1961 12 Sheets-Sheet 6
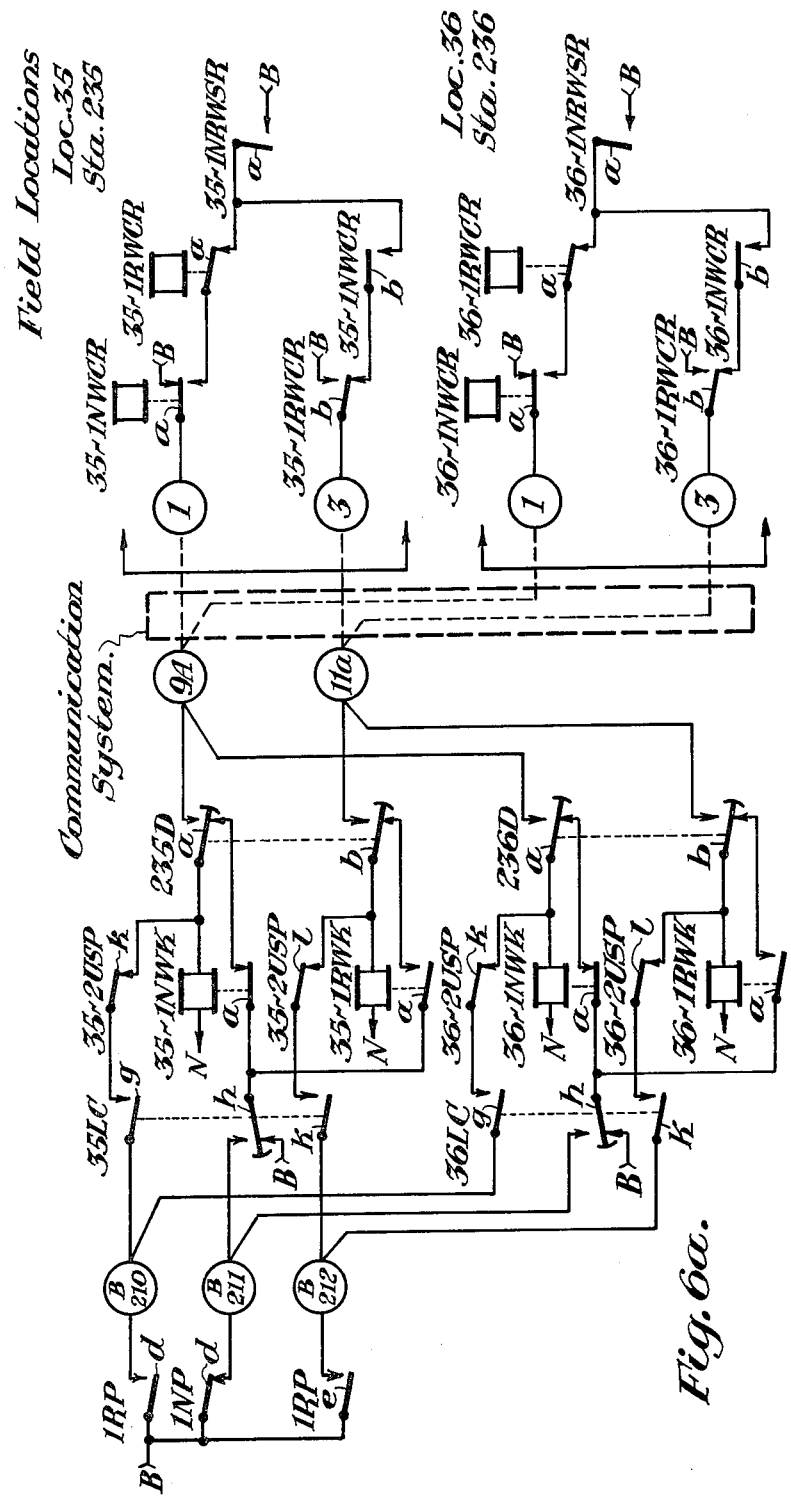
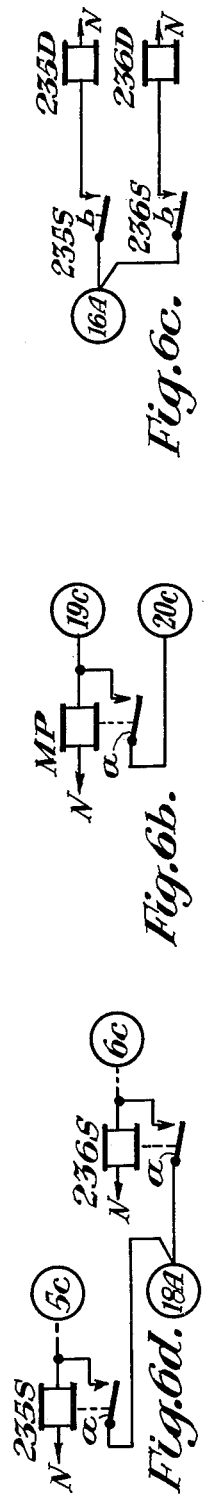

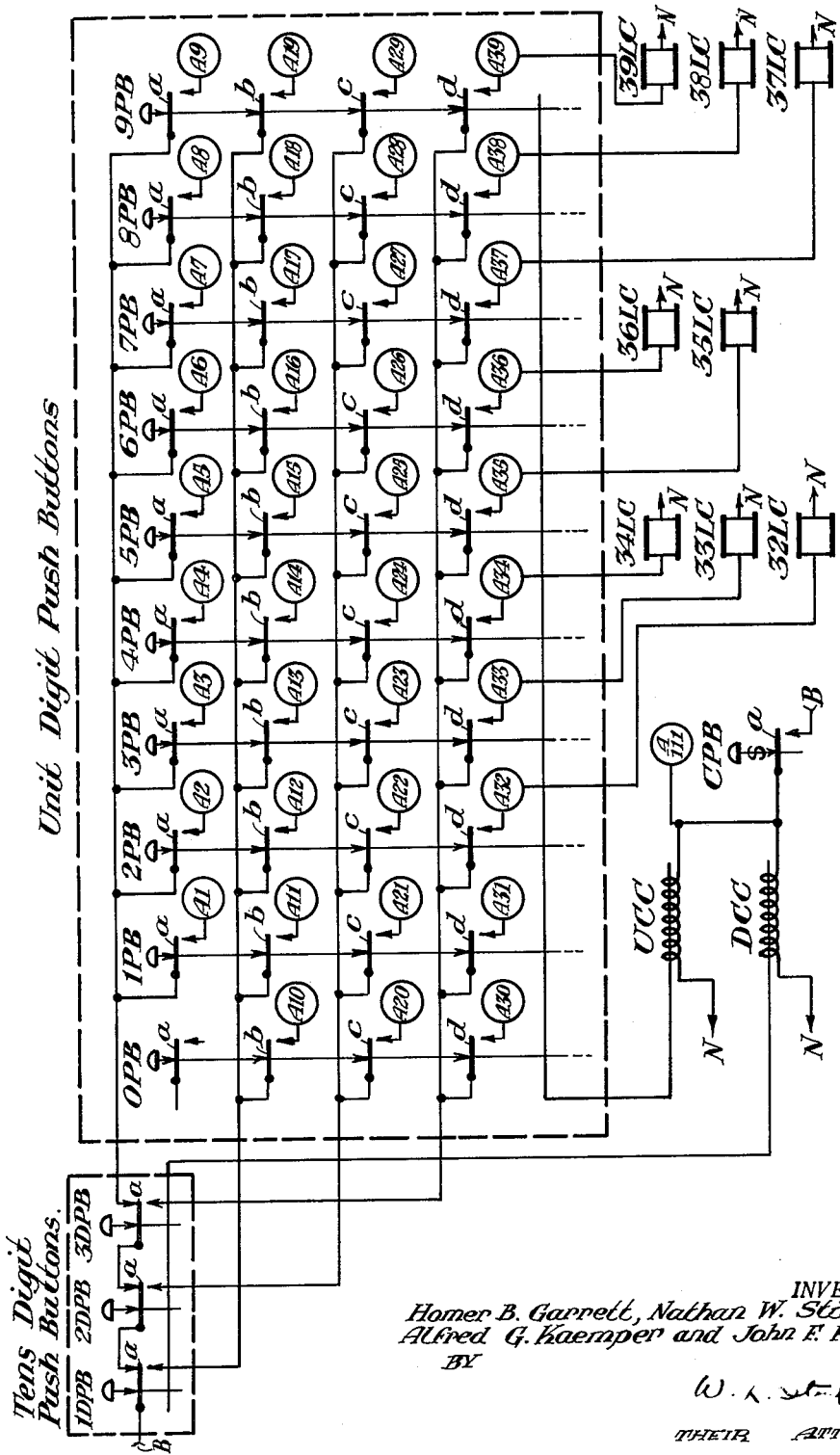

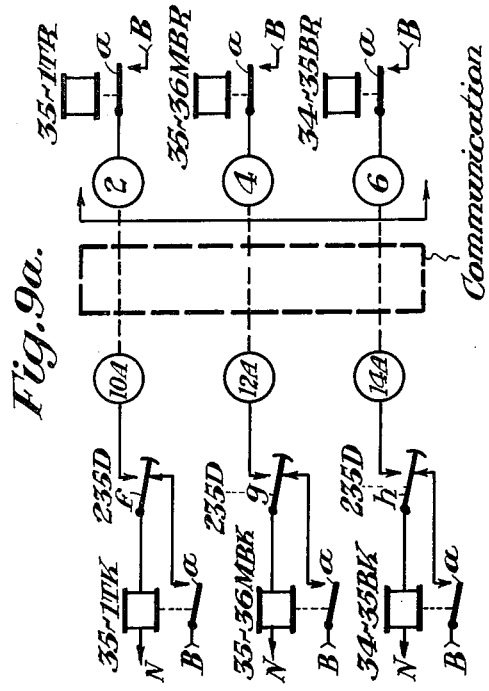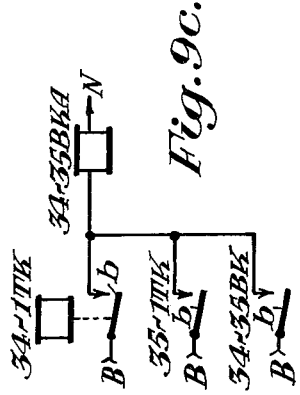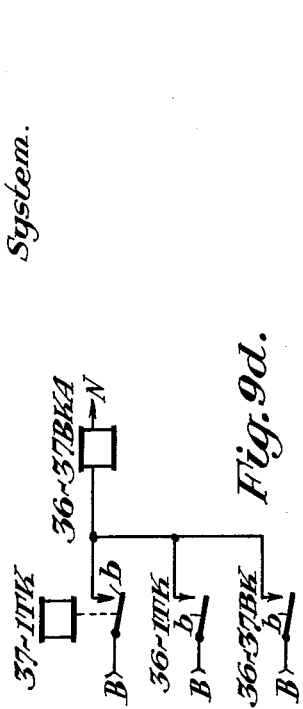

Oct. 19, 1965 H. B. GARRETT ETAL 3,213,275
CENTRALIZED TRAFFIC CONTROL SYSTEM FOR RAILROADS
Filed Sept. 15, 1961 12 Sheets-Sheet 10

Oct. 19, 1965  H. B. GARRETT ETAL  3,213,275
CENTRALIZED TRAFFIC CONTROL SYSTEM FOR RAILROADS
Filed Sept. 15, 1961  12 Sheets-Sheet 11
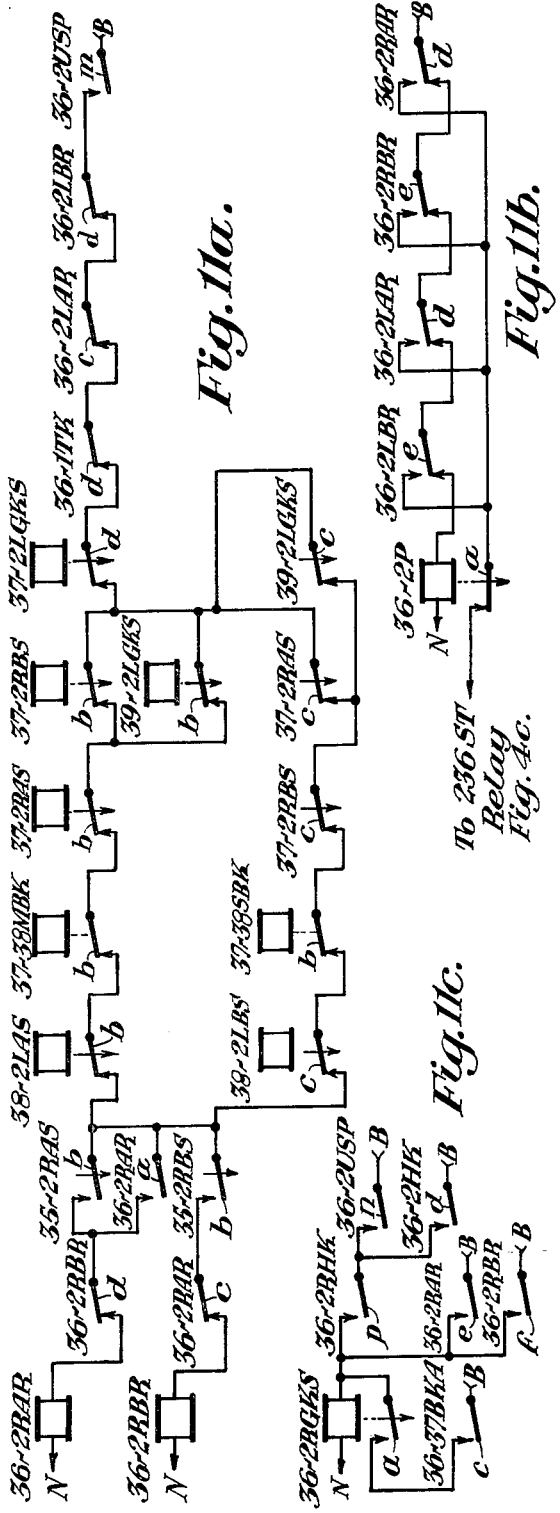
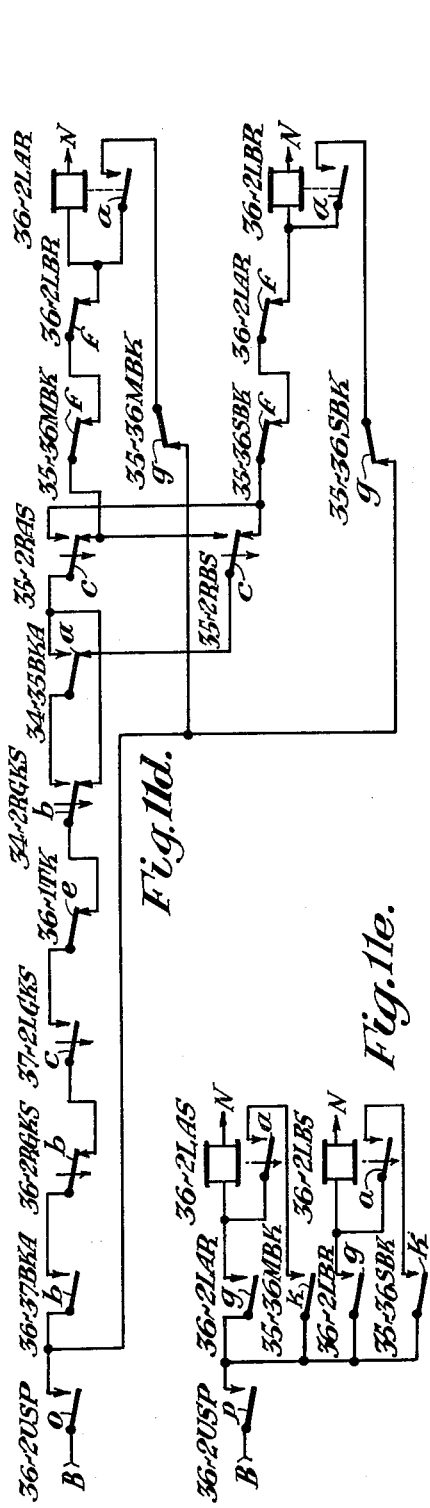

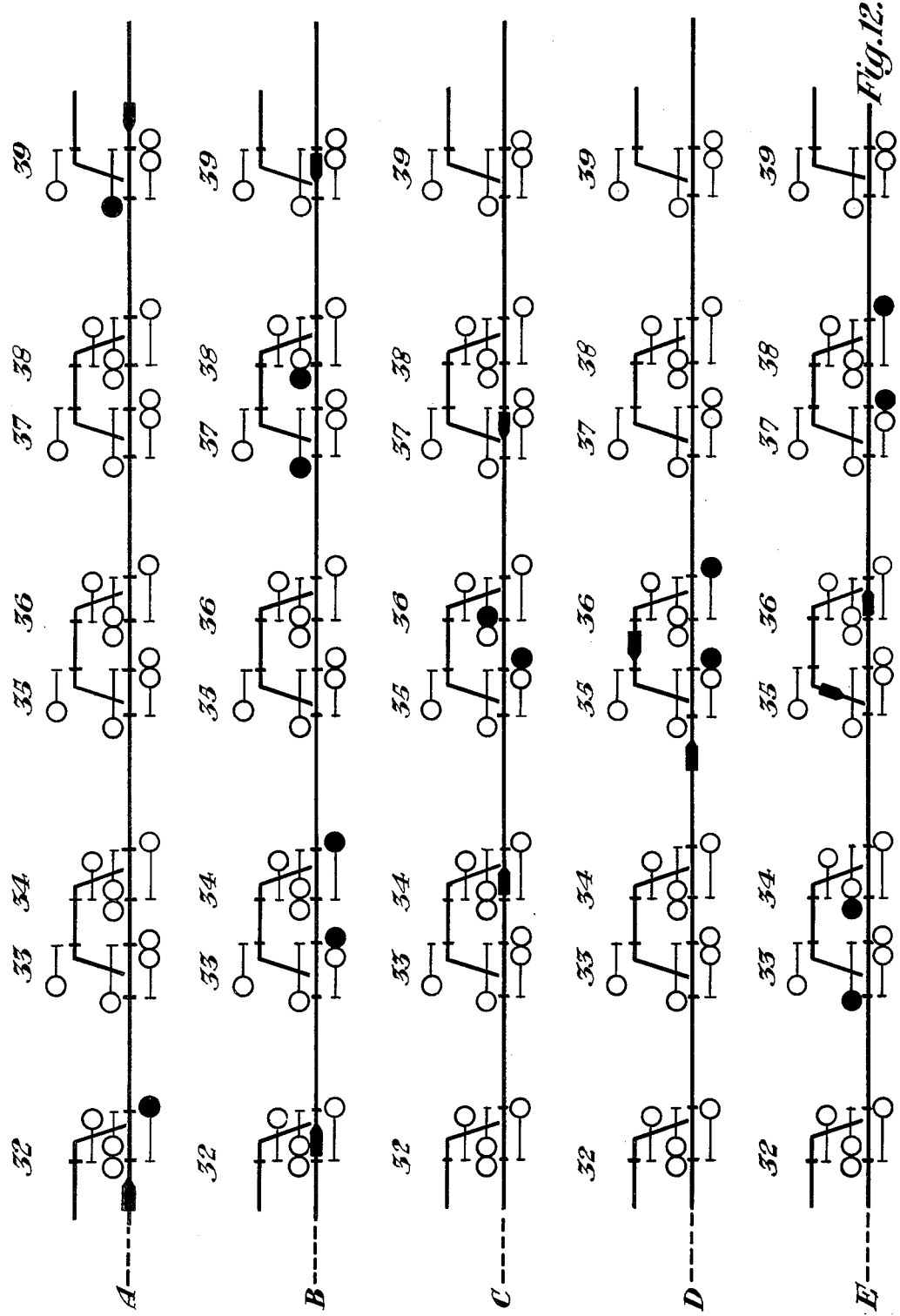

United States Patent Office 3,213,275
Patented Oct. 19, 1965

3,213,275
CENTRALIZED TRAFFIC CONTROL SYSTEM
FOR RAILROADS
Homer B. Garrett, Piedmont, Nathan W. Stickney
and Alfred G. Kaemper, Oakland, and John F.
Herbert, San Jose, Calif., assignors to Westinghouse Air Brake Company, Wilmerding, Pa., a corporation of Pennsylvania
Filed Sept. 15, 1961, Ser. No. 138,483
10 Claims. (Cl. 246—3)

Our invention relates to a centralized traffic control system for railroads, and more particularly to the provision of apparatus in such a system for at times automatically controlling from the central control office the alignment of track routes and the clearing of train governing signals by information transmitted to said office in response to the movements of trains over the railway track or track stretch provided with the centralized traffic control system.

Centralized railway traffic control systems are most generally employed on single track railroads over which trains travel in either direction and which include a plurality of spaced-apart siding tracks which provide for passing movements of trains traveling in opposite directions over the railroad. A power-operated track switch and an associated group of signals are provided at each end of each passing siding. A control machine or panel having a plurality of control devices, such as levers or push buttons, is located at a central office or control location for manually initiating controls and actuating the transmission of such controls to the wayside switches and signals for the alignment of routes and the governing of train movements through the siding tracks or the main tracks of the siding areas, thereby providing for the passing train movements. The levers or push buttons are manipulated by an operator or operators who are informed, by track occupancy indications transmitted to the central office, of the locations of the trains traveling the track stretch provided with the traffic control system. The received indications actuate indication devices usually located on the control machine on a miniature track diagram of said track stretch, and the operator or operators can manipulate the control devices to govern the movements of trains over the railroad in a manner which in their judgment is the most expeditious in view of the intelligence conveyed to them by said indication devices.

In many centralized railway traffic control systems there are times when traffic is very light and the services of the control machine operator, required during periods of heavy traffic, could be dispensed with if they were not required for the alignment of routes and the clearing of the wayside train governing signals for a relatively few passing train movements. Similarly, when extremely long sections of railroad are controlled from a single control office or location, there are periods when one section of the railroad may have heavy traffic, requiring the complete services of one operator, and another section may have traffic which does not justify the services of a second operator but which, due to the heavy traffic in the first railroad section, the first operator can not handle. It is accordingly one object of our invention to furnish means, in centralized traffic control systems for railroads, for at times automatically operating the track switches to align routes for passing train movements in the stretch of railroad provided with such a traffic control system and for automatically clearing the signals governing the train movements over such routes.

It is a second object of our invention to provide an automatic route control system, such as that outlined above, in which the passing routes and the clearing of signals thereover for trains traveling in opposite directions through the track stretch provided with the traffic control system are established, so far as practicable, so that the trains may maintain their schedules.

In accomplishing the above objects of our invention we employ the usual train approach or track occupancy indication apparatus, provided at the central control office for receiving from the field stations or wayside locations and conveying to the control machine operators information of the location of trains on the railroad provided with a centralized traffic control system, as a means, in lieu of manual operation of the control machine control devices, for at times automatically initiating or establishing switch and signal controls. These controls are transmitted in the usual manner, which may be by means of a direct wire or by a code type communication system, from the centralized control office to the field stations or wayside locations of the switches and signals which are to be actuated to establish the routes for the trains which travel the railroad and which actuate said approach indication apparatus.

Other objects and characteristic features of our invention will become apparent as the description proceeds.

We shall describe one form of apparatus embodying our invention, and shall then point out the novel features thereof in claims.

There is shown and described in the copending application for Letters Patent of the United States, Serial No. 791,185, filed February 4, 1959 by Frank T. Pascoe, for Centralized Traffic Control System for Railroads, now Patent No. 3,015,722, issued January 2, 1962, which is assigned to the assignee of the present application, a traffic control system such as that outlined above, and we have chosen to describe and illustrate our invention as employed with the control system of that patent. The track occupancy indication apparatus required for control of the apparatus of our invention is, for purposes of simplification of said Pascoe patent, not shown therein but in the drawings of our present application we have supplied to the patented system such track occupancy indication apparatus. This will become more apparent later in this description.

While we have chosen to describe the apparatus of our invention as employed with the traffic control system of said patent of Frank T. Pascoe, it is to be understood that our invention can be readily adapted to any of the well-known centralized railway traffic control systems, and that our invention is not intended to be limited to use in the traffic control system disclosed in Patent 3,015,722 but is to be limited only by the scope of the appended claims.

In the accompanying drawings, FIGS. 1a through 1d, when arranged in that order from left to right, show an illuminated track diagram of a typical track layout of a stretch of railway track in centralized traffic controlled railroad territory and provided with a plurality of spaced-apart passing siding tracks. While several ends of siding locations or field stations are illustrated in FIGS. 1a through 1d, for purposes of simplification of this description, only the apparatus of our invention provided at field stations 235 and 236 illustrated in FIGS. 1b and 1c need be shown and described in detail for a complete understanding of the invention. This will become apparent as the description proceeds.

FIG. 2 shows the circuit arrangement for the illumination of the indication lamps for ends of siding locations 35 and 36 (field stations 235 and 236) shown diagrammatically in FIGS. 1b and 1c. These lamps are in actual practice mounted in the diagram of the track layout illustrated in FIGS. 1b and 1c, and the association between the filaments of the various lamps shown in FIG. 2 and their respective location in the track diagram of FIGS. 1b and 1c is believed readily apparent but will be described in more detail as the description proceeds. It will be understood that lamps and control circuits therefor, similar to those shown in FIG. 2, are provided for the other field locations shown on the track diagram but, as previously pointed out, for purposes of minimizing the description these lamps and circuits are not shown in the drawings. However the location of these lamps in the track diagram is shown in FIGS. 1a through 1d and it will readily become apparent that such lamps at locations other than locations 35 and 36 would be controlled in a manner similar to that shown in FIG. 2 of the drawings.

FIG. 3 of the drawings shows two groups of push buttons which are located on a control panel or keyboard and are employed by the operator to select each field station or location to which control codes are to be transmitted.

FIGS. 4a, 4b, 4c and 4d show the function control push buttons and a series of relays which repeat the manipulations of the push buttons. These push buttons are also located on the control panel along with the station or location selection push buttons.

FIG. 5 shows the manner in which relays in the control office are employed for transmission of the function control codes to the field locations. The apparatus shown on the left-hand side of the arrows is located in the control office and the apparatus shown on the right-hand side of the arrows is located at the field locations. The relays shown on the right-hand side of the arrows are termed final stick relays and, as will be described, respond to controls transmitted to the field locations.

FIGS. 6a, 7 and 8 show the manner in which the indication relays are manipulated to store control codes, and also the manner in which these relays are employed to repeat the positions of various relays at the field locations to indicate at the office the condition of the field apparatus. Similarly to FIG. 5, the apparatus shown on the left-hand side of the arrows in FIGS. 6a, 7 and 8 is located at the control office, and the apparatus shown on the right-hand side of the arrows is located at the field locations.

FIGS. 6b, 6c and 6d show several relays employed in a code control system used for the illustration of our invention and these relays and the code system will be further described later in the specification.

FIGS. 9a and 9b show track occupancy indication relays employed at the control office for actuating indication devices to indicate the location of trains and also employed in our invention for automatically establishing switch and signal controls. These drawing figures also show the manner in which the indication relays are controlled from the field locations. As in FIGS. 5, 6a, 7 and 8, the apparatus shown on the left-hand side of the arrows in FIGS. 9a and 9b is located at the control office, and the apparatus shown on the right-hand side of the arrows is located at the field locations.

FIGS. 9c and 9d show relays and control circuits therefor, which are employed to repeat the operation of selected ones of the track occupancy indication relays in the apparatus of our invention.

FIGS. 11a, 11b, 11c, 11d and 11e show a similar set of relays and control circuits for field station 236.

FIG. 12 is a sequence chart illustrating one example of a passing train movement in a centralized traffic control system provided with the apparatus of our invention.

Figure 1A:
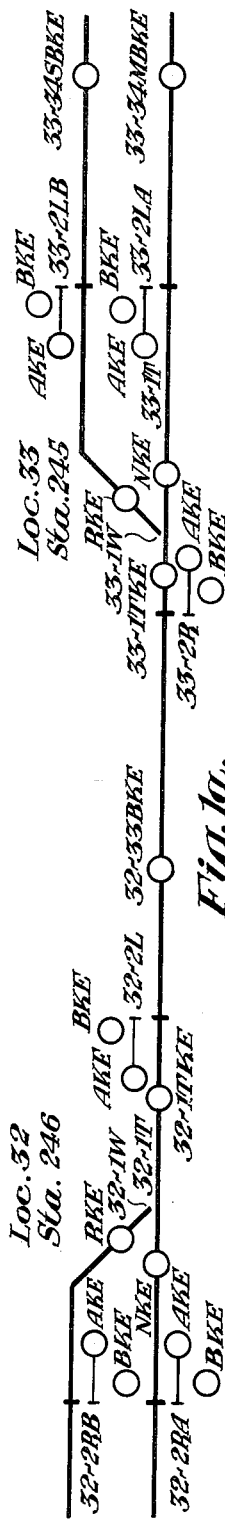

It is expedient to point out at this time several conventions employed in the drawings for illustration of the apparatus of our invention.

First, energy for operation of the apparatus shown in the drawings is furnished by suitable sources of direct current at each location, such as a battery of proper voltage and current. For the sake of simplicity these sources of current are not shown in the drawings, but the positive and negative terminals of each source are identified in each instance by the reference characters B and N, respectively.

Secondly, the contacts of the relays employed in our invention are in many instances not shown directly below the geometric rectangles representing the windings of the respective relays controlling such contacts, but where the contacts are not so shown the reference character designating the winding of the relay controlling each contact or sets of contacts is disposed on the drawings directly above each such contact or sets of contacts.

Thirdly, several of the relays shown in the drawings are slow release relays, that is, are provided with a slow release feature which delays the opening of the front contacts of the relays for a brief period following the deenergization of the winding of each such relay. The windings of these relays are illustrated in the drawings by geometric rectangles in the usual manner, but the contacts of such relays are provided with an arrow drawn vertically through the movable portion of each contact and pointed in the downward direction, that is, the direction in which the contacts are slow acting.

It is also expedient to point out at this time that the form of apparatus embodying our invention and described herein is illustrated, by way of an example, as employing a communication system of the type shown in Letters Patent of the United States No. 2,698,425, issued December 28, 1954, to Alfred B. Miller for Remote Control Systems, which system is illustrated and described in a publication of the Union Switch & Signal Division of Westinghouse Air Brake Company, entitled "Manual No. 514," revised in September 1956. However, it is to be understood that any type of communication system may be employed in conjunction with the apparatus of our invention, and it is not intended that our invention is for use only with the system of the said Miller patent.

Figure 1B:
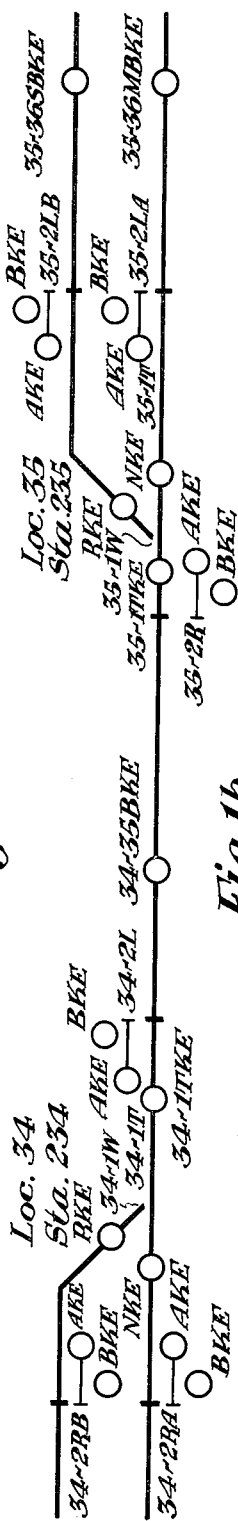
Figure 1C:
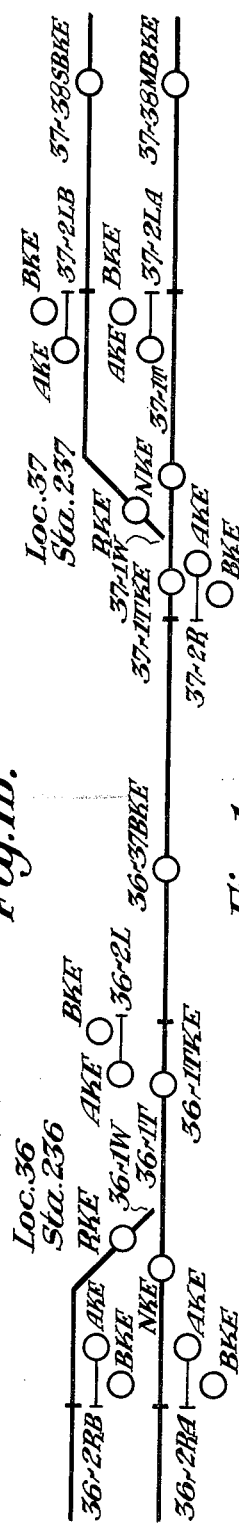
Figure 1D:
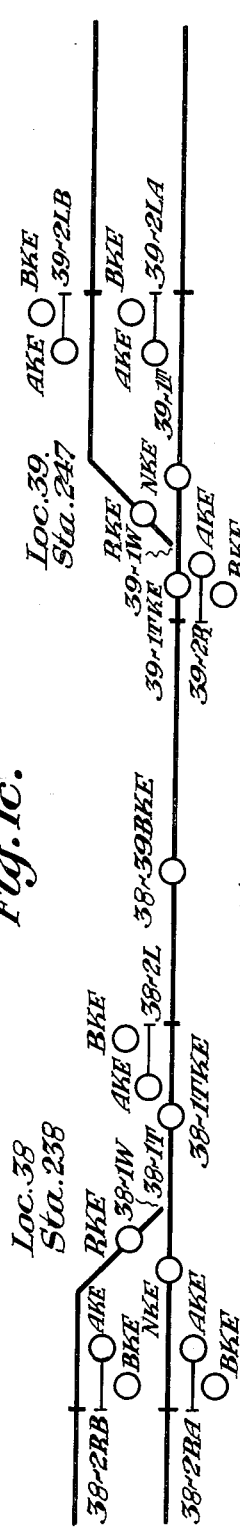

Referring now to FIGS. 1b and 1c, the location shown on the right-hand side of FIG. 1b is the west end of a passing siding on the illuminated miniature track diagram and is designated location 35 and assigned the field station selection or code numeral 235. The location shown on the left-hand side of FIG. 1c is the east end of said siding and is designated location 36 and assigned the field station selection or code numeral 236. For reasons which will become apparent these two locations have been selected as the typical locations to be covered in detail by this description and the coincidence between the two digits of the location designation numerals and the last two digits of the field station code numerals is insignificant. Similar numerals were chosen merely to assist in avoiding confusion in the description of the operation of the apparatus of our invention. The code control communication system of the aforesaid Miller patent is a 35 station system or capable of transmitting controls and indications to and from 35 field stations; but, by employing additional sets of the communication system equipment, the number of field stations associated with a single control panel is virtually unlimited. However, for purposes of this description, it is assumed that field station 235 at location 35 and field station 236 at location 36, as well as the other field stations shown in FIGS. 1a through 1d, are controlled by the same code control communication system. By further reference to FIGS. 1a through 1d it will be seen that location 32 is assigned the field station code numeral 246, location 33 is assigned code numeral 245, location 34 is assigned code numeral 234, and locations 37, 38 and 39 are assigned field station code numerals 237, 238 and 247, respectively.

The track switch at location 35 in FIG. 1b is designated 35–1W and has normal and reverse indication lamps designated NKE and RKE, respectively. The signal at said location for governing train movements to the right into the siding area is designated 35–2R and has two indication lamps designated AKE and BKE. The signal for governing train movements to the left out of the main track in the siding area is designated 35–2LA, and the signal for governing train movements to the left out of the siding track is designated 35–2LB. Each of these signals also has two indication lamps, each pair also being designated AKE and BKE; however, by the location of the said signal indication lamps on the track diagram it is readily recognized with which signal each pair of lamps is associated.

The signal block section or section of single track between location 35 and the first location to the west, that is, location 34, is provided with a track occupancy indication lamp designated 34–35BKE. Similarly, the siding tracks and main tracks within the passing siding area between locations 35 and 36 are provided with track occupancy indication lamps designated 35–36SBKE and 35–36MBKE, respectively. The short track section at the west end of the siding and within which switch 35–1W is located is provided with a track occupancy indication lamp designated 35–1TKE.

The signal block section or section of single track between location 36 and the first location to the east, that is, location 37, is provided with a track occupancy indication lamp designated 36–37BKE. The short track section at the east end of the passing siding 35–36 is provided with a track occupancy indication lamp 36–1TKE.

The track switch at location 36 in FIG. 1c is designated 36–1W and also has normal and reverse indication lamps designated NKE and RKE, respectively. The signals at this location are designated 36–2RA and 36–2RB, and 36–2L, controlling train movements to the right or left as indicated by the letter R or L included in their designations. Each of these signals also has a pair of indication lamps each designated AKE and BKE. The indication lamps will be described later in this description.

Figure 2:
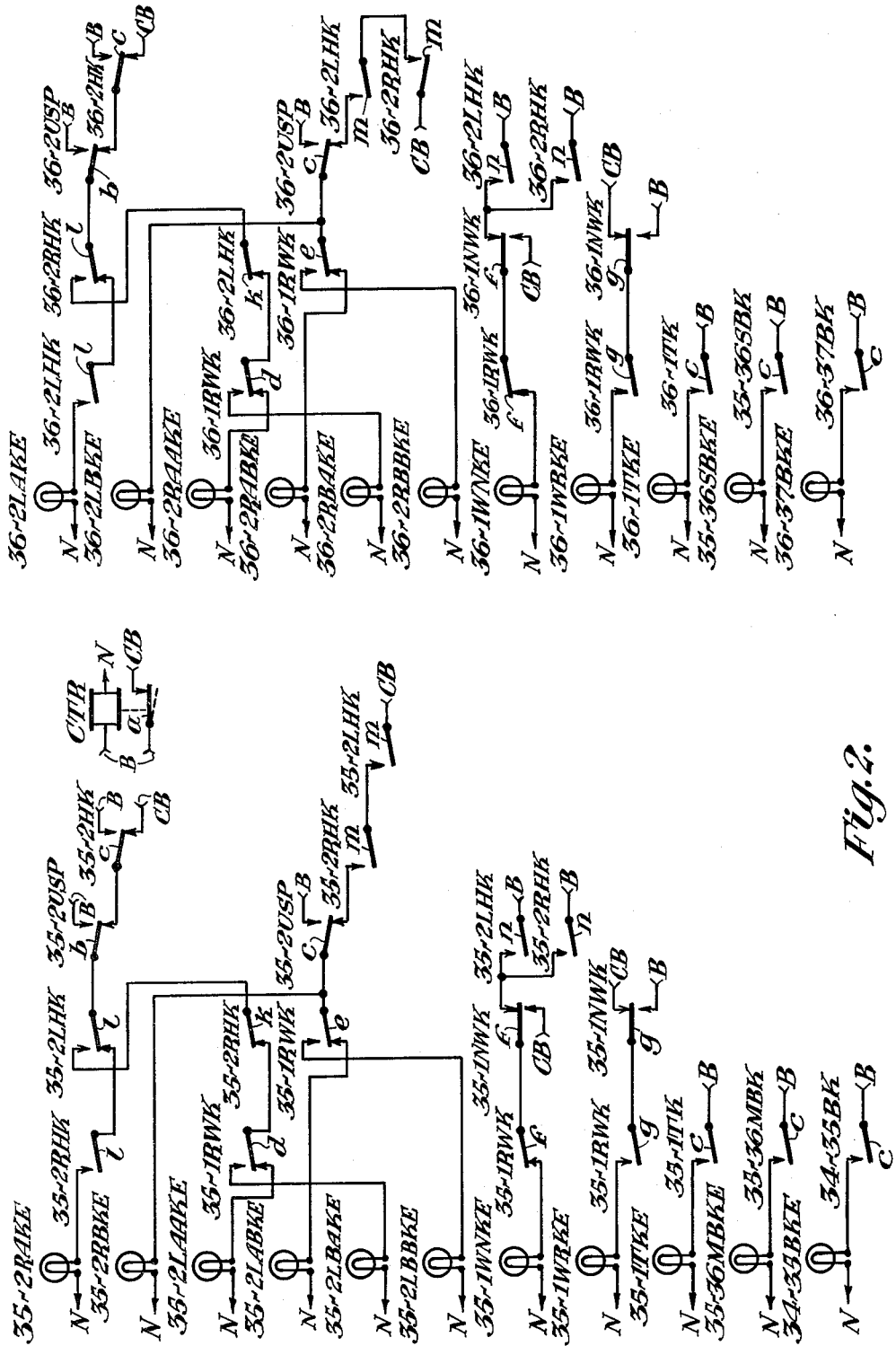

The filaments of the above-described indication lamps are shown in FIG. 2, and the switch and signal indication lamps are designated by the designation of the signal or switch with which they are associated suffixed by the designation of the respective indication lamp. For example, the filament of the AKE indication lamp for signal 35–2LA (FIG. 1b) is designated 35–2LAAKE and the filament of the NKE indication lamp for switch 36–1W (FIG. 1c) is designated 36–1WNKE. The association between the filaments of the lamps shown in FIG. 2 and the lamps designated on the track diagram in FIGS. 1b and 1c is, therefore, readily apparent. The filaments of the lamps are normally deenergized and therefore the track diagram is normally dark. The circuits for energization of the lamp filaments will be described hereinafter in the description.

There is also shown in FIG. 2 a code transmitter relay designated by the reference character CTR. As is obvious the terminals of this relay are connected to terminals B and N of the battery and the relay is, therefore, constantly operating to periodically open and close its front contact *a*. These relays and their operation are well known in the art and any type of such relay may be employed. Terminal B of the battery is connected to the movable portion of contact *a* of relay CTR and a form of coded energy designated CB appears at the front point of contact *a* of the relay. This coded energy is employed to provide additional indications by intermittently flashing the indication lamps AKE, BKE, NKE and RKE under conditions that will hereinafter be described.

FIG. 3 of the drawings shows the field station selection push buttons which are located on the keyboard or control panel and the circuit arrangement controlled by the push buttons. As previously set forth, two groups of push buttons are provided. The first group comprises the tens digit push buttons which establish the tens digit of a field location designation such, for example, as the digit 3 in the numeral 35 employed for designation of field location 35 illustrated in FIG. 1b; or the digit 2 in the numeral 21 employed for the designation of a field location 21, not shown in the drawings. The second group of push buttons comprises the unit digit push buttons which establish the unit digits of field location designations, such as the digit 5 or 1, respectively, in the examples set forth above. The push buttons of this group are designated 0PB through 9PB for the unit digits 0 through 9, respectively.

For purposes of illustration of our invention, only 3 tens digit push buttons are shown in FIG. 3 and, by employing these in conjunction with the 10 unit digit push buttons, a total of 39 field stations or locations may be selected (omitting the use of 0PB push button alone for selecting a field station). These 3 tens digit push buttons are designated 1DPB, 2DPB and 3DPB for selecting the tens digits 1, 2 and 3, respectively, as is obvious. It is apparent that 9 tens digit push buttons may be employed for use in conjunction with the 10 unit digit push buttons shown, whereupon a total of 99 field stations could be selected (again omitting the use of push button 0PB for selecting a field station). It is also apparent that by providing a third or hundreds digit group of push buttons the arrangement shown could be expanded to control a total of 999 field locations (omitting 0PB as before). It should be pointed out that in the arrangement shown in FIG. 3 one of the unit digit push buttons 1PB through 9PB only would be operated to select a field station having the location designations 1 through 9, respectively. No tens digit push button would be operated to select these field locations.

Each of the groups of station selection push buttons 1DPB through 3DPB and 0PB through 9PB is of the "stick" type and is interlocked with each other. That is to say, a push button which has been depressed will remain or "stick" in the depressed position until another push button in the same group is depressed or until a cancellation winding or coil, to be described later, is energized. The interlocking feature of the push buttons thus permits only one push button in a group to be depressed at any one time. Such interlocked types of push buttons are well known in the art and the interlocking feature of the push buttons form no part of our present invention.

Each of the tens digit push buttons 1DPB through 3DPB is shown provided with a movable contact member *a* normally closed against a front contact point and having a normally open or back contact point. Each of the unit digit push buttons 0PB through 9PB is shown provided with a series of movable contact members *a, b, c, d,* each having only a normally open or back contact point. The arrow heads on the extensions of the push buttons indicate that the buttons must be depressed to close their back contact points or to open their front contact points.

There is also shown in FIG. 3 a cancellation push button designated by the reference character CPB. This push button is of the spring return type as shown in the conventional manner by the letter S on the extension of the push button. The button is provided with a movable contact member having a normally open or back contact point. When the push button is depressed the movable contact member closes against the back contact point, as indicated by the arrowhead on the extension of the push button, and when the button is released it is returned to its normal position by the aforesaid spring return action, thereby again opening the aforesaid contact. The utilization of this cancellation button will be described hereinafter.

A tens digit cancellation coil or winding designated by the reference character DCC and a unit cancellation coil or winding designated by the reference character UCC are also shown in FIG. 3. These windings or coils, sometimes referred to as "knockdown" coils, control the cancellation of a storage in each respective group of location selection push buttons, which storages are represented by the depressed condition of a push button in each group of push buttons. In other words, each respective cancellation coil, when energized, releases a depressed push button in the respective push button group to permit it to return to its undepressed or normal position. Interlocking types of push buttons provided with cancellation windings or coils are also well known in the art.

A plurality of keyboard or control panel terminals are shown in FIG. 3 by a plurality of circles each enclosing a terminal designation comprising the letter A followed by a numeral, as readily appears. The terminals A1 through A39, if 39 field locations are to be selected at various times, are each connected to a location selection or control relay similar to relays 32LC through 39LC shown in FIG. 3. However, for the purpose of simplification since only the field locations 32 through 39 are employed in the description of our invention, only the location selection relays for these field locations are shown. These relays are designated 32LC through 39LC for said locations 32 through 39, respectively. Since only the apparatus for locations 35 and 36 is to be described in any detail, only relays 35LC and 36LC will be further described, it being understood that the remainder of the LC relays are constructed and controlled in a manner similar to relays 35LC and 36LC.

One terminal of the winding of relay 35LC is connected to terminal A35 of the control panel, and one terminal of the winding of relay 36LC is connected to terminal A36 of the control panel. The other terminals of the windings of the relays are connected to termnal N of the battery. Relays 35LC and 36LC are telephone type relays each having a plurality of front and back contact points, open and closed, respectively, when the winding of the relay is deenergized, and closed and open, respectively, when the winding of the relay is energized. Some of the contacts on these relays are dependent contacts so arranged as to constitute so-called make-before-break or continuity contacts. This type of relay is well known in the art and any such relay having a sufficient number of contacts may be employed for the location selection relays. The make-before-break contacts on the relays are shown with a wiper portion on the end of the movable members of the contacts as is apparent from the drawings (see for example FIG. 6a). The manner in which additional location selection relays may be connected to the control panel for the selection of additional field locations is obvious from the above description and by reference to FIG. 3 of the drawings. The operation of the apparatus for energizing one of the location selection relays 35LC or 36LC will be discussed below.

Control panel or keyboard terminal A111 shown in FIG. 3 is a cancellation control terminal and is utilized in a manner to be hereinafter described.

It is believed expedient, at this time, to describe the manner in which relays 35LC and 36LC are energized to select their respective field locations. Relay 35LC has a pickup circuit which extends from terminal B of the battery in FIG. 3 over the front point of contact *a* of push button 1DPB, the front point of contact *a* of push button 2DPB, the back point of contact *a* of push button 3DPB, thence to the group of unit digit push buttons and over back contact *d* of push button 5PB to terminal A35, and from terminal A35 through the winding of relay 35LC to terminal N of the battery. Relay 36LC has a pickup circuit extending from terminal B of the battery over the front point of contact *a* of push button 1DPB, the front point of contact *a* of 2DPB, the back point of contact *a* of 3DPB, thence to back contact *d* of unit digit push button 6PB, terminal A36, and through the winding of relay 36LC to terminal N of the battery. It is thus obvious that when it is desired to energize relay 35LC for selecting field location 35, the operator depresses push buttons 3DPB and 5PB on the control panel. These push buttons being of the stick type, the described circuit is completed to energize relay 35LC and the relay will pick up and remain up as long as the said push buttons remain depressed. Similarly, when it is desired to energize relay 36LC for selecting field location 36, the operator depresses push buttons 3DPB and 6PB on the control panel, and relay 36LC is energized over its described pickup circuit and picks up and remains up as long as the selection push buttons remain depressed. It is to be noted that relays 35LC and 36LC can not be energized simultaneously because push buttons 5PB and 6PB can not be depressed at the same time due to the previously described interlocking feature of each group of push buttons. As previously stated, the manner of energization of the other station selection relays is apparent from this description of the control of relays 35LC and 36LC. The circuits controlled by relays 35LC and 36LC will be described hereinafter.

If an incorrect location selection relay is inadvertently energized by the operator depressing an incorrect push button or buttons, a cancellation may be made by depressing the cancellation button CPB. The depressing of button CPB closes an energizing circuit for cancellation or knockdown coils DCC and UCC which may be traced from terminal B of the battery over back contact *a* of CPB in its depressed position and through the coils DCC and UCC in multiple to terminal N of the battery. As previously described, the energization of the cancellation coils permits the depressed push buttons to return to their undepressed positions and the field location selection storages on the control panel are cancelled. As will be hereinafter described, automatic cancellation of location selection storages can be accomplished by connecting terminal B of the battery to terminal A111 of the panel. The cancellation circuit from terminal A111 to the cancellation coils is obvious and no detailed description thereof is necessary.

Figure 4A:
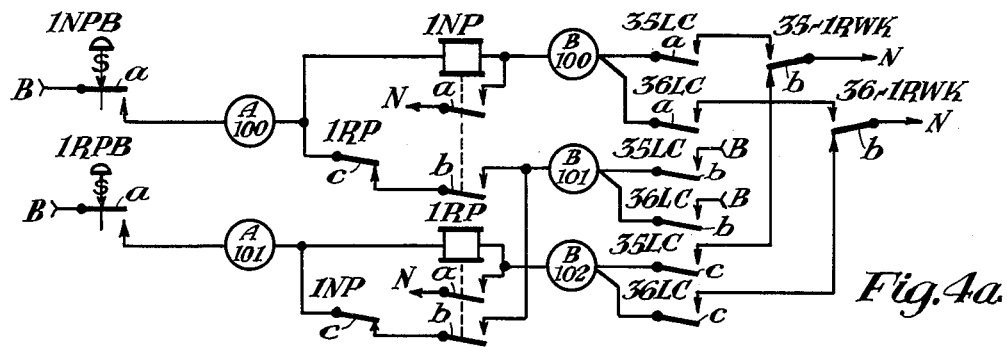

Referring now to FIG. 4a, there is shown a normal switch control push button designated 1NPB, a normal repeater relay 1NP which is energized by the actuation of the normal switch control push button, a reverse switch control push button 1RPB, and a reverse repeater relay 1RP which is energized by the actuation of the reverse switch control push button. The push buttons 1NPB and 1RPB are spring return push buttons mounted on the control panel, each having a normally open back contact, and employed for initiating controls for directing a first switch at a field location to normal and reverse positions, respectively. These push buttons are identical in operation to cancellation push button CPB previously described and no further description of their operation is considered necessary. Relays 1NP and 1RP are conventional telephone type relays, similar to relays 35LC and 36LC previously described, and no further description of these relays is considered necessary except to point out that no make-before-break contacts are provided on these relays.

Terminals A100 and A101 shown in FIG. 4a are terminals on the control panel similar to the terminals shown in FIG. 3, previously described. Terminals B100, B101 and B102 are multiple connection terminals to which circuits from contacts of all field location selection relays LC are connected. Because, in this illustrated embodiment of our invention, only two location selection relays 35LC and 36LC are described in detail, connection to contacts of these two relays only are shown. However, it should be pointed out that with each additional field location which is to be selected from the control panel, an additional connection is made from each of the multiple connection terminals to a contact of each additional location selection relay LC employed.

Returning to FIG. 4a, relay 1NP has a pickup circuit which extends from terminal B of the battery over the back point of contact *a* of push button 1NPB, terminal A100, the winding of the relay, multiple connection terminal B100, and thence over a multiple circuit comprising two branches, the first branch extending from terminal B100 over front contact *a* of location selection relay 35LC, previously described and the front point of contact *b* of switch indication relay 35–1RWK, to be described, to terminal N of the battery; and the second branch extending from terminal B100 over front contact *a* of location selection relay 36LC, previously described, and over the front point of contact *b* of switch indication relay 36–1RWK, to be described, to terminal N of the battery. Relay 1NP is provided with a stick circuit which extends from terminal B of the battery over front contact *b* of relay 25LC or over front contact *b* of relay 36LC to multiple connection terminal B101, front contact *b* of relay 1NP, back contact *c* of relay 1RP, the winding of relay 1NP, and over front contact *a* of relay 1NP to terminal N of the battery. Relay 1NP is thus picked up when push button 1NPB is depressed, relay 35LC is picked up, and reverse switch indication relay 35–1RWK is picked up; or when button 1NPB is depressed, relay 36LC is picked up and reverse switch indication relay 36–1RWK is picked up. Relay 1NP when thus energized is maintained picked up by its stick circuit so long as relay 1RP remains deenergized and relay 35LC or relay 36LC remains energized.

Relay 1RP (FIG. 4*a*) has a pickup circuit extending from terminal B of the battery over back contact *a* of push button 1RPB, terminal A101, the winding of relay 1RP, multiple connection terminal B102, and thence over a multiple circuit comprising two branches, the first branch extending from terminal B102 over front contact *c* of relay 35LC, and over the back point of contact *b* of relay 35–1RWK to terminal N of the battery; and the second branch extending from terminal B102 over front contact *c* of relay 36LC, and over the back point of contact *b* of relay 36–1RWK to terminal N of the battery. Relay 1RP is provided with a stick circuit which extends from terminal B of the battery over front contact *b* of relay 35LC or over front contact *b* of relay 36LC to multiple connection terminal B101, front contact *b* of relay 1RP, back contact C of relay 1NP, the winding of relay 1RP, and over front contact *a* of relay 1RP to terminal N of the battery. Relay 1RP is thus picked up when push button 1RPB is depressed, relay 35LC is energized and reverse switch indication relay 35–1RWK is deenergized; or when push button 1RPB is depressed, relay 36LC is energized and reverse switch indication relay 36–1RWK is deenergized. Relay 1RP when thus energized is maintained picked up by its stick circuit so long as relay 1NP remains deenergized and relay 35LC or relay 36LC remains energized. The circuits controlled by contacts of relays 1NP and 1RP will be described later in this description.

Figure 4B:
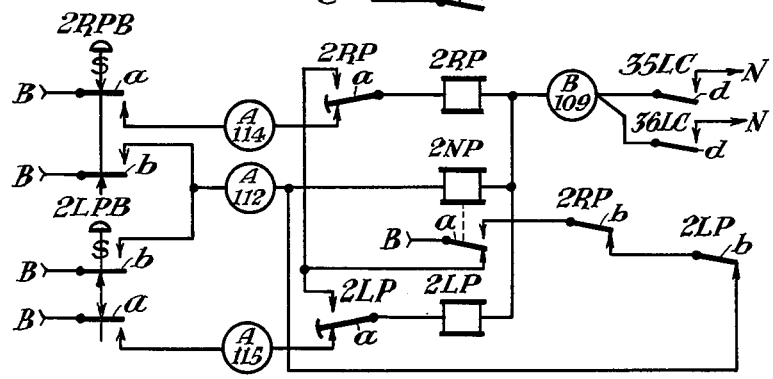

There is shown in FIG. 4*b* two push buttons designated by the reference characters 2RPB and 2LPB, respectively. Push button 2RPB is the right signal control push button for initiating controls for operating signal or signals 2R at each field location for governing train movements to the right, and push button 2LPB is the left signal control push button for initiating controls for operating signal or signals 2L at each field location for governing train movements to the left. These push buttons are also mounted on the control panel and are of the three-position, push-pull type with spring return to the center or neutral position. That is, the push buttons ecah have a normally open back contact which is closed only when the respective push button is depressed and a normally open front contact which is closed only when the respective push button is pulled. The spring arrangements on the push buttons return the buttons to, and normally maintain them in, their center positions in which no contacts are closed. The arrow heads shown on the extensions of the push buttons indicate the direction in which the push buttons must be operated in order to close the respective movable contact members against their respective stationary contact points.

Relays 2RP and 2LP shown in FIG. 4*b* are right and left repeater relays which are energized by pushing push buttons 2RPB and 2LPB, respectively, while relay 2NP is a normal repeater relay which is energized by pulling either said push button. Relays 2RP, 2LP and 2NP are also conventional type telephone relays similar to relays 35LC and 36LC previously described and no further description of these relays is considered necessary except to say that relays 2RP and 2LP are each provided with at least one make-before-break contact while no such contact arrangement is provided on relay 2NP.

Terminals A112, A114 and A115 shown in FIG. 4*b* are terminals on the control panel similar to the previously described terminals having a numeral designated with a letter A prefix. Terminal B109 is a multiple connection terminal similar to terminals B100, B101 and B102 previously described.

Referring again to FIG. 4*b*, relay 2RP has a pickup circuit extending from terminal B of the battery over back contact *a* of push button 2RPB, terminal A114, the back point of make-before-break contact *a* of relay 2RP, the winding of relay 2RP, multiple connection terminal B109, and thence over front contacts *d*, in multiple, of relays 35LC and 36LC to terminal N of the battery. Relay 2RP has a stick circuit which extends from terminal B of the battery over the back point of contact *a* of relay 2NP, the front point of make-before-break contact *a* of relay 2RP, the winding of relay 2RP, terminal B109 and thence over front contacts *d* in multiple of relays 35LC and 36LC to terminal N of the battery. It is thus apparent that relay 2RP is picked up when push button 2RPB is depressed and relay 35LC or 36LC is energized, and sticks up over its stick circuit, including the front point of its own contact *a*, so long as relay 2NP remains released and relay 35LC or 36LC remains energized. Make-before-break contact *a* of relay 2RP insures that relay 2RP will be maintained picked up when contact *a* transfers from its back to its front contact points in the closing of its stick circuit.

Relay 2LP has a pickup circuit extending from terminal B of the battery, over back contact *a* of push button 2LPB, terminal A115, the back point of make-before-break contact *a* of relay 2LP, the winding of relay 2LP, terminal B109, and thence over a circuit including, in multiple, the front contacts *d* of relays 35LC and 36LC to terminal N of the battery. Relay 2LP has a stick circuit which extends from terminal B of the battery over the back point of contact *a* of relay 2NP, the front point of make-before-break contact *a* of relay 2LP, the winding of relay 2RP, terminal B109, and thence over front contacts *d* in multiple of relays 35LC and 36LC to terminal N of the battery. It thus readily appears that relay 2LP is picked up when push button 2LPB is depressed and relay 35LC or relay 36LC is energized, and is maintained picked up by its stick circuit including the front point of its own contact *a*, so long as relay 2NP remains released and relay 35LC or 36LC remains energized. Make-before-break contact *a* of relay 2LP insures that relay 2LP will be maintained picked up during the transfer of the contact *a* from its back contact point to its front contact point.

Relay 2NP has a multiple pickup circuit extending from terminal B of the battery over front contacts *b*, in multiple, of each of push buttons 2RPB and 2LPB, terminal A112, the winding of relay 2NP, terminal B109, and thence through the circuit including a front contact *d* of each of the relays 35LC and 36LC, in multiple to terminal N of the battery. Relay 2NP has a stick circuit which extends from terminal B of the battery over the front point of its own contact *a*, back contact *b* of relay 2RP, back contact *b* of relay 2LP, the winding of relay 2NP to terminal B109 and thence over the multiple circuit previously traced, including front contacts *d* of relays 35LC and 36LC, to terminal N of the battery. It is readily seen that relay 2NP is picked up by pulling push button 2RPB or 2LPB when relay 35LC or relay 36LC is energized, and is maintained picked up by its stick circuit including the front point of its own contact *a* so long as relays 2RP and 2LP remain released and relay 35LC or 36LC is energized. The circuits controlled by contacts of relays 2RP, 2LP and 2NP will be described later in this description.

Figure 4C:
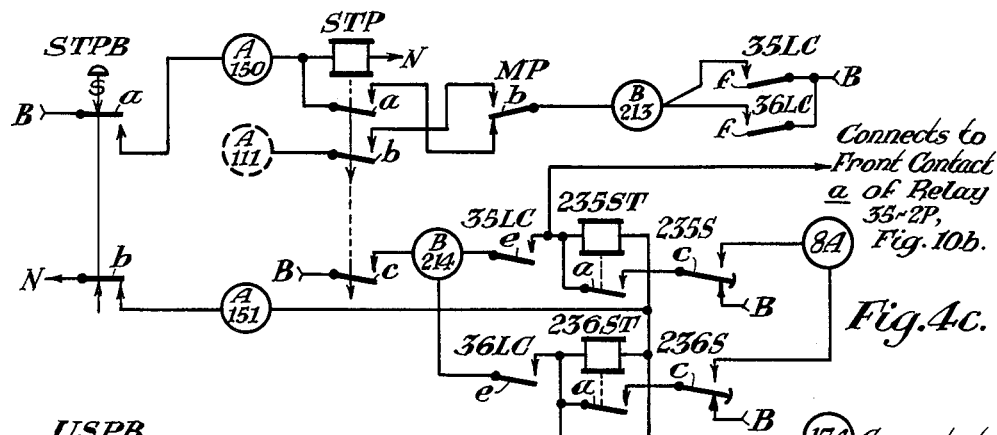

Referring now to FIG. 4c, there is shown the arrangement of circuits and apparatus for storing a code start for transmission of control codes to field locations through the Form 514 code control system previously mentioned. A spring return push button designated by the reference character STPB and having a normally open back contact *a* and a normally closed back contact *b* is provided on the control panel for initiating and cancelling, respectively, code starts. Contact *a* of push button STPB operates in a manner identical to contact *a* of push button CPB previously described and no further description thereof is necessary except to say that contact *a* is closed when push button STPB is depressed. Contact *b* of push button STPB is normally closed and is opened by the pulling of the push button, as designated by the arrowhead on the extension of the push button at the movable portion of contact *b*. When the push button is released the spring return feature thereof returns contact *b* to its normally closed position as shown.

Relay STP shown in FIG. 4c is a start repeater relay which repeats the manipulation of push button STPB as will be hereinafter described. Relays 235ST and 236ST are the start relays for storing a start for transmission of control codes to field stations 235 and 236, respectively. These relays correspond to relay 234ST shown in circuit diagram drawing D-2547, Sheet 14A, located in the back of the aforesaid Manual No. 514 of the Union Switch & Signal Division of Westinghouse Air Brake Company. It is to be understood that one of these start relays is employed in the control office for each field location controlled from the control panel, but, as only two such locations are covered in detail in the specific example of our invention described herein, we have shown only the two start relays necessary for the example illustrated. It is believed readily apparent that when additional field locations are controlled from the control panel, the additional necessary start relays provided will be arranged in a manner similar to relays 235ST and 236ST shown in FIG. 4c and controlled in a manner similar to said relays as described below.

Terminals A150 and A151 are terminals on the control panel similar to terminals A100 and A101 shown in FIG. 4a and described above. Terminal A111 shown by dotted lines in FIG. 4c is the identical terminal A111 shown by solid lines in FIG. 3 and is thus shown in order that the circuit connections to terminal A111 may be described. Terminals B213 and B214 are multiple connection terminals similar to terminals B100, B101 and B102 shown in FIG. 4a. Terminals 8A and 17A in FIG. 4c are terminals on the office line coding unit for the Form 514 code communication system employed in our invention and said terminals 8A and 17A correspond to terminals 8A and 17A shown on aforesaid circuit drawing D-2547, Sheet 14A. Reference is made to aforesaid Manual No. 514 and to the said circuit drawing in said manual for a complete understanding of the operation of the internal circuits in the said office line coding unit and connected therein to said terminals 8A and 17A.

Relay STP has a pickup circuit which extends from terminal B of the battery over back contact *a* of push button STPB, terminal A150, and through the winding of relay STP to terminal N of the battery. Relay STP has a stick circuit which extends from terminal B of the battery over front contacts *f* of relays 35LC and 36LC, in multiple, multiple connection terminal B213, the back point of contact *b* of relay MP, to be described, front contact *a* of relay STP and through the winding of relay STP to terminal N of the battery. Relay STP is thus picked up whenever push button STPB is depressed and is maintained picked up as long as relay MP remains released and one of the location selection relays remains energized.

The location selection storage cancellation circuit connected to terminal A111 as shown in FIG. 4c extends from terminal B of the battery over front contacts *f* of relays 35LC and 36LC, in multiple, terminal B214, and front contact *b* of relay MP, and front contact *b* of relay STP to terminal A111. It is thus apparent that section location storages on the control panel are cancelled when relay MP is picked up as will be described later in this description. Relay STP, as indicated by the arrows drawn through the movable members of the contacts of the relay, is made slightly slow release to insure that relay MP closes the front point of its contact *b* before front contact *b* of relay STP opens. This insures that the cancellation circuit to terminal A111 is completed when the stick circuit over the back point of contact *b* of relay MP to relay STP is opened by the picking up of relay MP.

Relay 235ST in FIG. 4c has a first pickup circuit which extends from terminal B of the battery over front contact *c* of relay STP, multiple connection terminal B214, front contact *e* of relay 35LC, the winding of relay 235ST, terminal A151 of the back contact *b* of push button STPB to terminal N of the battery. Relay 235ST is provided with a second pickup circuit which will be described hereinafter in this description. Relay 235ST has a stick circuit including two branches; the first branch extending from terminal B of the battery over the back point of make-before-break contact *c* of relay 235S, to be described, to front contact *a* of relay 235ST, and the second branch extending from terminal 8A over the front point of make-before-break contact *c* of relay 235S to front contact *a* of relay 235ST, and thence through the winding of relay 235ST to terminal A151 and over back contact *b* of push button STPB to terminal N of the battery. Relay 235ST is thus picked up when relay STP picks up and location selection relay 35LC is energized, and is maintained picked up until push button STPB is pulled or until relay 235S is energized and energy is removed from terminal 8A of the office line coding unit.

Relay 236ST shown in FIG. 4c has a first pickup circuit which extends from terminal B of the battery over front contact *c* of relay STP, terminal B214, front contact *e* of relay 36LC, the winding of relay 236ST, control panel terminal A151, and over back contact *b* of push button STPB to terminal N of the battery. Relay 236ST has a second pickup circuit which will be described hereinafter in this description. Relay 236ST has a stick circuit including two branches; the first branch extending from terminal B of the battery over the back point of make-before-break contact *c* of relay 236S, to be described, to front contact *a* of relay 236ST, and the second branch extending from terminal 8A over the front point of make-before-break contact *c* of relay 236S to front contact *a* of relay 236ST, and thence through the winding of relay 236ST to terminal A151 and over back contact *b* of push button STPB to terminal N of the battery. Relay 236ST is thus picked up when relay STP picks up and is maintained picked up until push button STPB is pulled or until relay 236S is energized and energy is removed from terminal 8A of the office line coding unit. Relays 235ST and 236ST operate in a manner similar to relay 234ST shown in said drawing D-2547, Sheet 14A, in said Manual No. 514, and reference is made to said manual for a complete understanding of the operation of the ST relays and the circuits controlled thereby, these relays themselves forming no part of our present invention but being shown in order to make the specification complete.

Figure 4D:
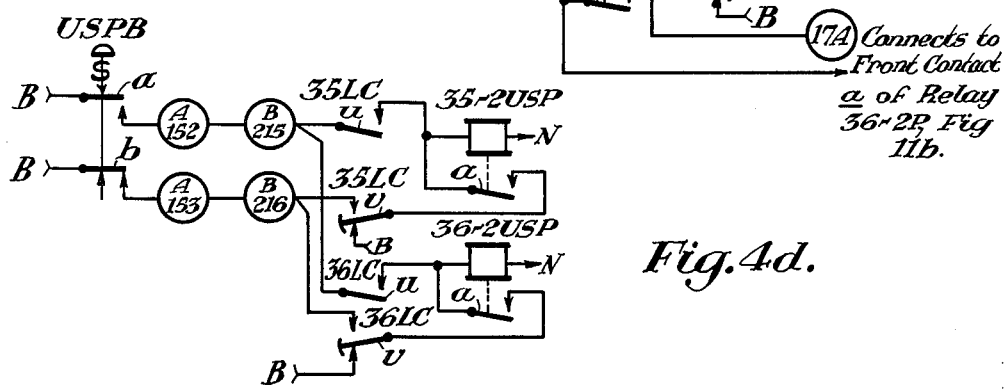

There is shown in FIG. 4d the circuits and apparatus which provide for the control machine operator to switch the centralized traffic control system from the usual manual control to the apparatus of our invention providing for automatic approach control of the traffic control system. A spring return push button USPB, similar to push button STPB, previously described, and having a normally open back contact *a* and a normally closed back contact *b* is provided on the control panel for selectively switching each wayside location or field station from manual operation to the automatic operation provided by our invention. Contacts *a* and *b* of push button USPB operate in a manner identical to that described for contacts *a* and *b* of push button STPB and no further description thereof is necessary except to say that contact *a* is closed when push button USPB is depressed. Contact *b* of push button USPB is normally closed and is opened by the pulling of the push button as designated by the arrowhead on the extension of the push button at the movable part of contact *b*. When the push button is released, the spring return feature thereof returns contact *b* to its normally closed position as shown in FIG. 4*d*.

Relays 35–2USP and 36–2USP shown in FIG. 4*d* are repeater relays which repeat the manipulation of push button USPB, as hereinafter described. Terminals A152 and A153 are terminals on the control panel similar to terminals A100 and A101 shown in FIG. 4*a* and described above. Terminals B215 and B216 are multiple connection relays similar to terminals B100, B101 and B102, shown in FIG. 4*a*.

Relay 35–2USP has a pickup circuit which extends from terminal B of the battery over back contact *a* of push button USPB, terminal A152, terminal B215, front contact *u* of relay 35LC and through the winding of relay 35–2USP to battery terminal N. Relay 35–2USP is provided with a first stick circuit which extends from battery terminal B over back contact *b* of push button USPB, terminal A153, terminal B216, the front point of make-before-break contact *v* of relay 35LC, front contact *a* of relay 35–2USP and through the winding of relay 35–2USP to battery terminal N. Relay 35–2USP has a second stick circuit extending from terminal B of the battery over the back point of make-before-break contact *v* of relay 35LC, front contact *a* of relay 35–2USP and through the winding of relay 35–2USP to battery terminal N. Relay 35–2USP is thus picked up when push button USPB is depressed and location selection relay 35LC is energized, and is thereafter maintained picked up until push button USPB is pulled while relay 35LC is energized.

Relay 36–2USP has a pickup circuit which extends from battery terminal B over back contact *a* of push button USPB, terminal A152, terminal B215, front contact *u* of relay 36LC and through the winding of relay 36–2USP to battery terminal N. Relay 36–2USP has a first stick circuit which extends from battery terminal B over back contact *b* of push button USPB, terminal A153, terminal B216, the front point of make-before-break contact *v* of relay 36LC, front contact *a* of relay 36–2USP and through the winding of relay 36–2USP to battery terminal N. Relay 36–2USP has a second stick circuit extending from battery terminal B over the back point of make-before-break contact *v* of relay 36LC, front contact *a* of relay 36–2USP and through the winding of relay 36–2USP to battery terminal N. Relay 36–2USP is thus picked up when push button USPB is depressed and location selection relay 36LC is energized, and is thereafter maintained picked up until push button USPB is pulled while relay 36LC is energized. The purpose of relays 35–2USP and 36–2USP and the circuits controlled thereby will be discussed hereinafter.

It is deemed expedient to discuss at this time the apparatus shown in FIGS. 6*b*, 6*c* and 6*d* before further description of the apparatus arrangement of our invention is given. Relay MP shown in FIG. 6*b* corresponds to relay MP shown in the lower left-hand portion of said drawing D–2547, Sheet 14A, and operates in a manner identical to said relay. Relays 235D and 236D in FIG. 6*c* are similar to relay 234D shown on the right-hand side of Sheet 14A of said drawing D–2547. Relays 235S and 236S shown in FIG. 6*d* are similar to relay 234S shown in the lower right-hand portion of said Sheet 14A. These relays shown in said FIGS. 6*b*, 6*c* and 6*d* form no part of our present invention but are shown in order to make this specification complete. It is considered sufficient for purposes of this description to point out that relay MP is the repeater of the master relay M of the code communication system. The M relay and thus the MP relay are energized when a control code is to be transmitted by the code system. Relays 235D and 236D are the delivery relays for the code control communication system and pick up to deliver information, received from the respective field location, to the proper indication relays as will be more apparent later in this description. Relays 235S and 236S are the station call relays for field stations 235 and 236 and select the respective station determined by the code combination transmitted by the code control communication system. Reference is made to aforesaid Manual No. 514 for a more complete understanding of the operation of relays MP, 235D, 236D, 235S and 236S.

Figure 5:
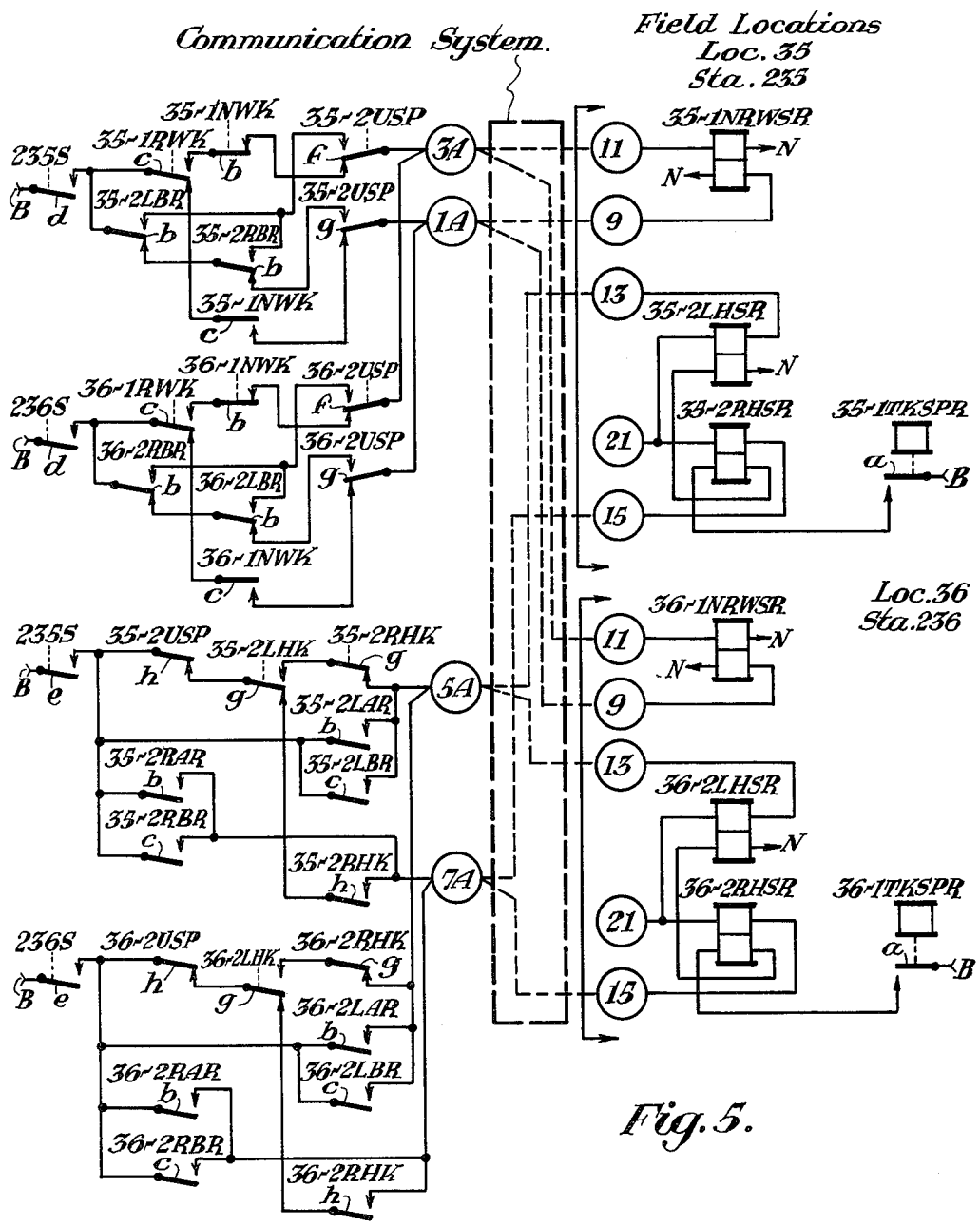

The code communication circuits for transmitting control codes to the field locations are shown schematically in FIG. 5. Relays 35–1NRWSR, 35–2LHSR, 35–2RHSR, and 35–1TKSPR are located at field location 35 which is assigned to field station 235 in the code communication system. These relays correspond to relays NRWSR, LHSR, RHSR and TKSPR, respectively, shown in drawing D–2547, Sheet 15A, in the back of the aforementioned Manual No. 514. Relays 36–1NRWSR, 36–2LHSR, 36–2RHSR and 36–1TKSPR are located at field location 36 which is assigned to field station 236 in the code communication system. The correspondence between these relays and the similar relays shown on Sheet 15A of said drawing D–2547 is readily apparent.

Relays 35–1NRWSR and 36–1NRWSR comprise the final stick relays at the field locations for controlling switches 35–1W and 36–1W (FIGS. 1*b* and 1*c*), respectively, to normal and reverse positions. Relays 35–2LHSR, 36–2LHSR, 35–2RHSR and 36–2RHSR comprise the final stick relays for controlling the clearing of left and right signals, respectively, at the field locations. These relays are of the magnetic stick type, the contacts of which are operated to first and second positions by an impulse of energy of one polarity or another through their control windings and which remain in the last operated position without energy. Such relays are well known in the art and no further description thereof is necessary. Relays 35–1TKSPR and 36–1TKSPR are conventional neutral relays which are employed in the field to repeat the occupied or unoccupied condition of track sections 35–1T and 36–1T, respectively, represented on the track diagram in FIGS. 1*b* and 1*c*, respectively. These relays are energized and deenergized respectively when their associated track sections are unoccupied or occupied.

The circuit arrangement shown on the left-hand side in FIG. 5 shows the arrangement at the control office for controlling the transmission of control codes to the field location. The dotted lines between the two sets of terminals shown in FIG. 5 represent the Form 514 code control communication system previously mentioned and employed in this example of our invention, and no details of this portion of the code control communication system need be shown. The terminals to the left of the dotted lines represent terminals on the office line coding unit, and the terminals to the right of the dotted lines represent terminals on the field line coding units. These units are shown on Sheets 14A and 15A, respectively, of drawing D–2547 in the aforesaid Manual No. 514.

The code control communication system in the example shown in this description operates in the identical manner to the communication system shown and described in said Manual No. 514, and it is, therefore, considered sufficient for purposes of this description to point out that the code system will transmit a code for controlling a switch control relay to a first position for controlling a switch to its reverse position when position energy is supplied to terminal 3A of the office line coding unit. Similarly, the code system will transmit a code for controlling a switch control relay to a second position for controlling a switch to its normal position when positive energy is supplied to terminal 1A of the office coding unit. Likewise, the code system will transmit a code for controlling signal control relays to a first position for clearing of signals when positive energy is supplied to terminal 5A or 7A, and will transmit a code to control the signal control relays to a second position for controlling signals to stop when no energy is supplied to said terminal 5A or 7A.

The manually controlled circuit for supplying positive energy to terminal 3A for controlling switch control relay 35–1NRWSR to its said first position extends from terminal B of the battery over front contact $d$ of station call relay 235S, the front point of contact $c$ of relay 35–1RWK, to be described, front contact $b$ of relay 35–1NWK, to be described, and over the back point of contact $f$ of relay 35–2USP to terminal 3A. The manually controlled circuit for supplying positive energy to terminal 1A for controlling switch control relay 35–1NRWSR to its said second position extends from terminal B of the battery over front contact $d$ of relay 235S, the back point of contact $c$ of relay 35–1RWK, back contact $c$ of relay 35–1NWK, and the back point of contact $g$ of relay 35–2USP to terminal 1A.

The manually controlled circuit for supplying positive energy to terminal 5A for controlling signal control relay 35–2LHSR to a position for clearing signal 35–2LA or 35–2LB (FIG. 1$b$) extends from terminal B of the battery over front contact $e$ of relay 235S, back contact $h$ of relay 35–2USP, the front point of contact $g$ of relay 35–2LHK, to be described, and back contact $g$ of relay 35–2RHK, to be described, to terminal 5A. The manually controlled circuit for supplying positive energy to terminal 7A for controlling signal control relay 35–2RHSR to a position for clearing signal 35–2R, FIG. 1$b$, extends from terminal B of the battery over front contact $e$ of relay 235S, back contact $h$ of relay 35–2USP, the back point of contact $g$ of relay 35–2LHK, and the front point of contact $h$ of relay 35–2RHK to terminal 7A.

The manually controlled circuit for supplying positive energy to terminal 3A for controlling switch control relay 36–1NRWSR to its said first position extends from terminal B of the battery over front contact $d$ of station call relay 236S, the front point of contact $c$ of relay 36–1RWK, to be described, front contact $b$ of relay 36–1NWK, to be described, and over the back point of contact $f$ of relay 36–2USP to terminal 3A. The manually controlled circuit for supplying positive energy to terminal 1A for controlling switch control relay 36–1NRWSR to its said second position extends from terminal B of the battery over front contact $d$ of relay 236S, the back point of contact $c$ of relay 36–1RWK, back contact $c$ of relay 36–1NWK and over the back point of contact $g$ of relay 36–2USP to terminal 1A.

The manually controlled circuit for supplying positive energy to terminal 5A for controlling signal control relay 36–2LHSR to a position for clearing signal 36–2L, FIG. 1$c$, extends from terminal B of the battery over front contact $e$ of relay 236S, back contact $h$ of relay 36–2USP, the front point of contact $g$ of relay 36–2LHK, to be described, and back contact $g$ of relay 36–2RHK, to be described, to terminal 5A. The manually controlled circuit for supplying positive energy to terminal 7A for controlling signal control relay 36–2RHSR to a position for clearing signal 36–2RA or 36–2RB extends from terminal B of the battery over front contact $e$ of relay 236S, back contact $h$ of relay 36–2USP, the back point of contact $g$ of relay 36–2LHK, and front contact $h$ of relay 36–2RHK to terminal 7A.

In addition to the above-traced manually controlled circuits connected to said terminals 1A, 3A, 5A and 7A, we have provided in accordance with our invention automatically operated circuits connected to said terminals. The automatically operated circuits for supplying positive energy to terminal 3A for controlling switch control relay 35–1NRWSR to its said first position extends from terminal B of the battery over front contact $d$ of station call relay 235S, the front point of contact $b$ of relay 35–2LBR or the back point of such contact and the front point of contact $b$ of relay 35–2RBR, such relays to be described, and over the front point of contact $f$ of relay 35–2USP to terminal 3A. The automatically operated circuit for supplying positive energy to terminal 1A for controlling switch control relay 35–1NRWSR to its said second position extends from terminal B of the battery over front contact $d$ of relay 235S, the back point of contact $b$ of relay 35–2LBR, the back point of contact $b$ of relay 35–2RBR, and over the front point of contact $g$ of relay 35–2USP to terminal 1A.

The automatically operated circuits for supplying positive energy to terminal 5A for controlling signal control relay 35–2LHSR to a position for clearing signal 35–2LA or 35–2LB (FIG. 1$b$) extends from terminal B of the battery over front contact $e$ of relay 235S, and over front contact $c$ of relay 35–2LBR in multiple with front contact $b$ of relay 35–2LAR, to be described, to terminal 5A. The automatically operated circuits for supplying positive energy to terminal 7A for controlling signal control relay 35–2RHSR to a position for clearing signal 35–2R (FIG. 1$b$) extends from terminal B of the battery over front contact $e$ of relay 235S, and over front contact $c$ of relay 35–2RBR in multiple with front contact $b$ of relay 35–2RAR, to be described, to terminal 7A.

The automatically operated circuits for supplying positive energy to terminal 3A for controlling switch control relay 36–1NRWSR to its said first position extends from terminal B of the battery over front contact $d$ of station call relay 236S, the front point of contact $b$ of relay 36–2RBR, in multiple with the back point of this contact and the front point of contact $b$ of relay 36–2LBR in series, such relays to be described, and over the front point of contact $f$ of relay 36–2USP to terminal 3A. The automatically operated circuit for supplying positive energy to terminal 1A for controlling switch control relay 36–1NRWSR to its said second position extends from terminal B of the battery over front contact $d$ of relay 236S, the back point of contact $b$ of relay 36–2RBR, the back point of contact $b$ of relay 36–2LBR, and over the front point of contact $g$ of relay 36–2USP to terminal 1A.

The automatically operated circuits for supplying positive energy to terminal 5A for controlling signal control relay 36–2LHSR to a position for clearing signal 36–2L extends from terminal B of the battery over front contact $e$ of relay 236S, and over front contact $c$ of relay 36–2LBR in multiple with front contact $b$ of relay 36–2LAR, to be described, to terminal 5A. The automatically operated circuits for supplying positive energy to terminal 7A for controlling signal control relay 36–2RHSR to a position for clearing signal 36–2RA or 36–2RB extends from battery terminal B over front contact $e$ of relay 236S, and over front contact $c$ of relay 36–2RBR in multiple with front contact $b$ of relay 36–2RAR, to be described, to terminal 7A.

Referring now to FIG. 6$a$, there is shown the switch indication circuits at field locations 35 and 36 and the switch indication relays in the control office. The terminals shown to the right of the arrows are terminals on the field line coding units at the respective field locations and the circuits shown on the right-hand side of the drawing are the circuits for controlling the indications to be transmitted. Relays 35–1NRWSR and 36–1NRWSR, contacts $a$ of which are shown at the field locations in FIG. 6$a$, are the switch control or final stick relays shown in FIG. 5, as previously mentioned, for controlling the movements of switches 35–1W and 36–1W to normal and reverse positions. Relays 35–1NWCR, 35–1RWCR, 36–1NWCR and 36–1RWCR, the windings and contacts of which are shown at the field locations in FIG. 6a, are switch correspondence or repeater relays which reflect the correspondence between the positions of switch control relays 35–1NRWSR and 36–1NRWSR and the positions of the respective switches 35–1W and 36–1W at field locations 35 and 36, respectively. The control circuits to the windings of these relays are not shown in the drawings but relays 35–1NWCR and 36–1NWCR may be controlled, for example, in a manner similar to relay 3NWC shown in FIG. 1b of Letters Patent of the United States No. 2,532,832, issued December 5, 1950, to Ira F. Cadman, for Approach Lock Releases in Railway Signaling Systems. Relays 35–1RWCR and 36–1RWCR are similar to relay 3RWC shown in FIG. 1b of said patent. Such switch correspondence or repeater relays are well known in the art and, since the control of these relays forms no part of our present invention, it is considered sufficient for purposes of this description to point out that contacts a and b of relays 35–1NWCR and 36–1NWCR are picked up only when switches 35–1W and 36–1W, respectively, and relays 35–1NRWSR and 36–1NRWSR, respectively, occupy normal positions. Contacts a and b of relays 35–1RWCR and 36–1RWCR are picked up only when switches 35–1W and 36–1W, respectively, and relays 35–1NRWSR and 36–1NRWSR, respectively, occupy reverse positions. Switches 35–1W and 36–1W, and control relays 35–1NRWSR and 36–1NRWSR, being assumed to normally occupy their normal positions, the contacts of relays 35–1NWCR and 36–1NWCR are shown picked up, and the contacts of relays 35–1RWCR and 36–1RWCR are shown released in FIG. 6a.

Terminals 9A and 11A in FIG. 6a are terminals on the office line coding unit in the control office. The dotted lines shown between the terminals on the office line coding unit and the field line coding units represent the Form 514 code control communication system employed in the present illustrated example of our invention. Terminals 9A and 11A are multiple connection terminals as is apparent in FIG. 6a and correspond to terminals 9A and 11A, respectively, shown on the right-hand side of Sheet 14A of drawing D–2547 in aforesaid Manual No. 514.

Relays 35–1NWK and 36–1NWK are the switch indication relays at the control office which indicate respectively the normal position of switches 35–1W and 36–1W and the corresponding position of their control relays at field locations 35 and 36, respectively. Similarly, relays 35–1RWK and 36–1RWK are switch indication relays indicating, respectively, the reverse position of switches 35–1W and 36–1W and the corresponding position of their control relays at the said field locations. As previously stated, switches 35–1W and 36–1W, and relays 35–1NRWSR and 36–1NRWSR, being assumed to normally occupy their normal positions, relays 35–1NWK and 36–1NWK are shown normally picked up and relays 35–1RWK and 36–1RWK are shown normally released.

Relay 35–1NWK has an indication pickup circuit extending from terminal 9A of the office line coding unit over the front point of make-before-break contact a of relay 235D and through the winding of relay 35–1NWK to terminal N of the battery. Relay 35–1NWK has a control pickup circuit extending from terminal B of the battery over front contact d of relay 1RP, multiple connection terminal B210, to be described, front contact g of relay 35LC, back contact k of relay 35–2USP, and through the winding of relay 35–1NWK to terminal N of the battery. Relay 35–1NWK has a first stick circuit extending from terminal B of the battery over the back point of make-before-break contact h of relay 35LC, front contact a of relay 35–1NWK, the back point of make-before-break contact a of relay 235D, and through the winding of relay 35–1NWK to terminal N of the battery. Relay 35–1NWK has a second stick circuit extending from terminal B of the battery over back contact d of relay 1NP, multiple connection terminal B211, to be described, the front point of make-before-break contact h of relay 35LC and thence over front contact a of relay 35–1NWK and through the remainder of the first stick circuit for relay 35–1NWK, just described, to terminal N of the battery.

Relay 35–1RWK has an indication pickup circuit extending from terminal 11A of the office line coding unit over the front point of make-before-break contact b of relay 235D, and through the winding of relay 35–1RWK to terminal N of the battery. Relay 35–1RWK has a control pickup circuit extending from terminal B of the battery over front contact e of relay 1RP, multiple connection terminal B212, to be described, front contact k of relay 35LC, back contact l of relay 35–2USP, and through the winding of relay 35–1RWK to terminal N of the battery. Relay 35–1RWK has a first stick circuit extending from terminal B of the battery over the back point of make-before-break contact h of relay 35LC, front contact a of relay 35–1RWK, the back point of make-before-break contact b of relay 235D and through the winding of relay 35–1RWK to terminal N of the battery. Relay 35–1RWK has a second stick circuit extending from terminal B of the battery over back contact d of relay 1NP, terminal B211, the front point of make-before-break contact h of relay 35LC and thence over front contact a of relay 35–1RWK and through the remainder of the first stick circuit for relay 35–1RWK, just described, to terminal N of the battery.

Relays 36–1NWK and 36–1RWK have pickup and stick circuits similar to those just described for relays 35–1NWK and 35–1RWK, respectively, except their including contacts of relays 36LC, 36–2USP and 236D and their own front contacts a, and no detailed tracing of these circuits is considered necessary.

Terminals B210, B211 and B212 are multiple connection terminals to which, in actual practice, control pickup circuits for the indication relays for each first switch at all field locations are connected, but, only two field locations being covered in detail in this described example of our invention, only the control pickup circuits for the indication relays for switches 35–1W and 36–1W (FIGS. 1b and 1c) are shown in FIG. 6a. It is also desired to point out that additional indication pickup circuits are, in actual practice, connected to terminals 9A and 11A for control of indication relays for each first switch at all field locations. However, these circuits are also not shown because in the illustrated example of our invention only two field locations are covered in detail.

The operation and purpose of the circuits shown in FIG. 6a will become more apparent later in this specification in the description of a specific example of the control of one of the switches shown on the track diagram in FIGS. 1a through 1d.

Figure 7:
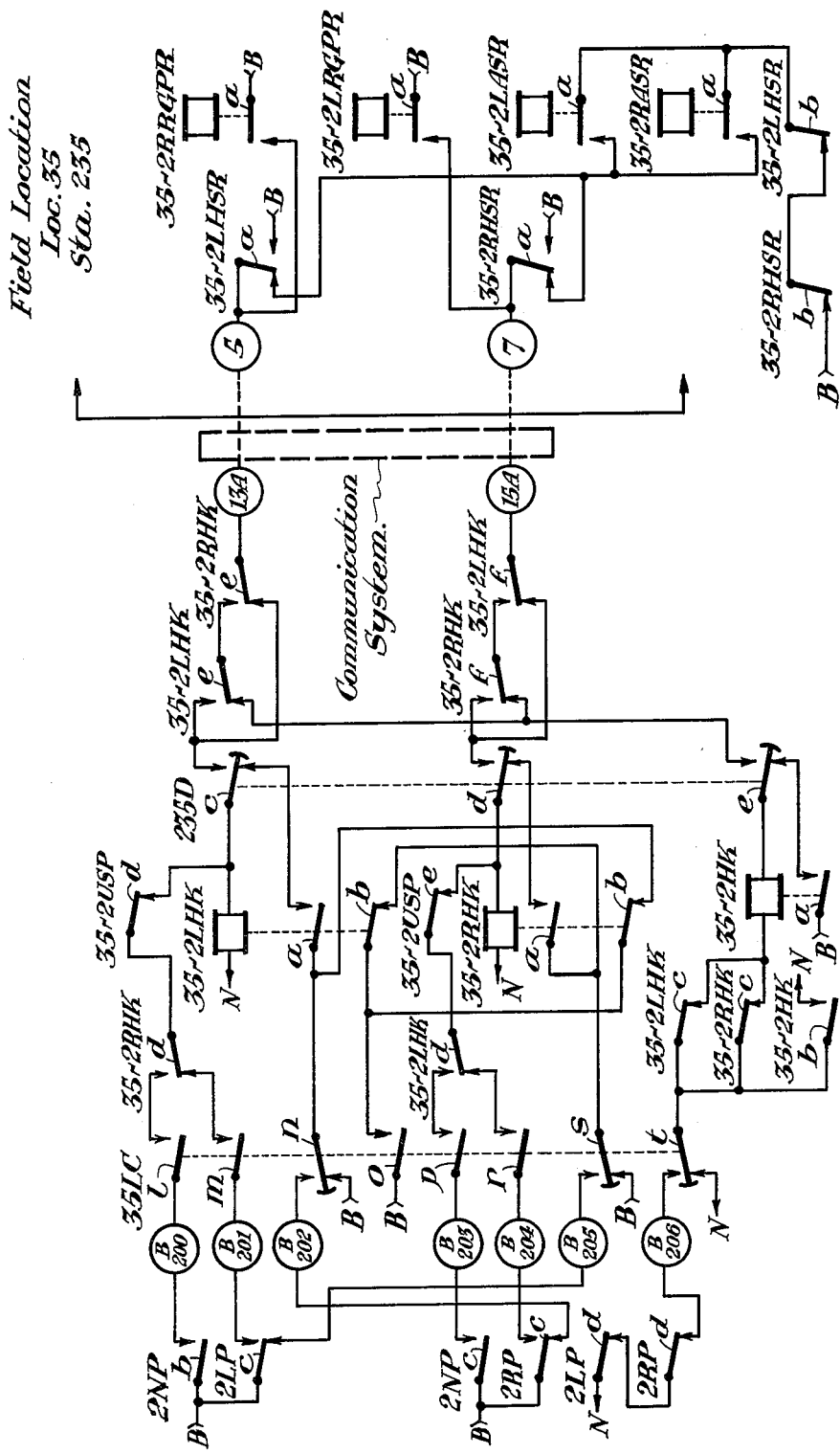
Figure 8:
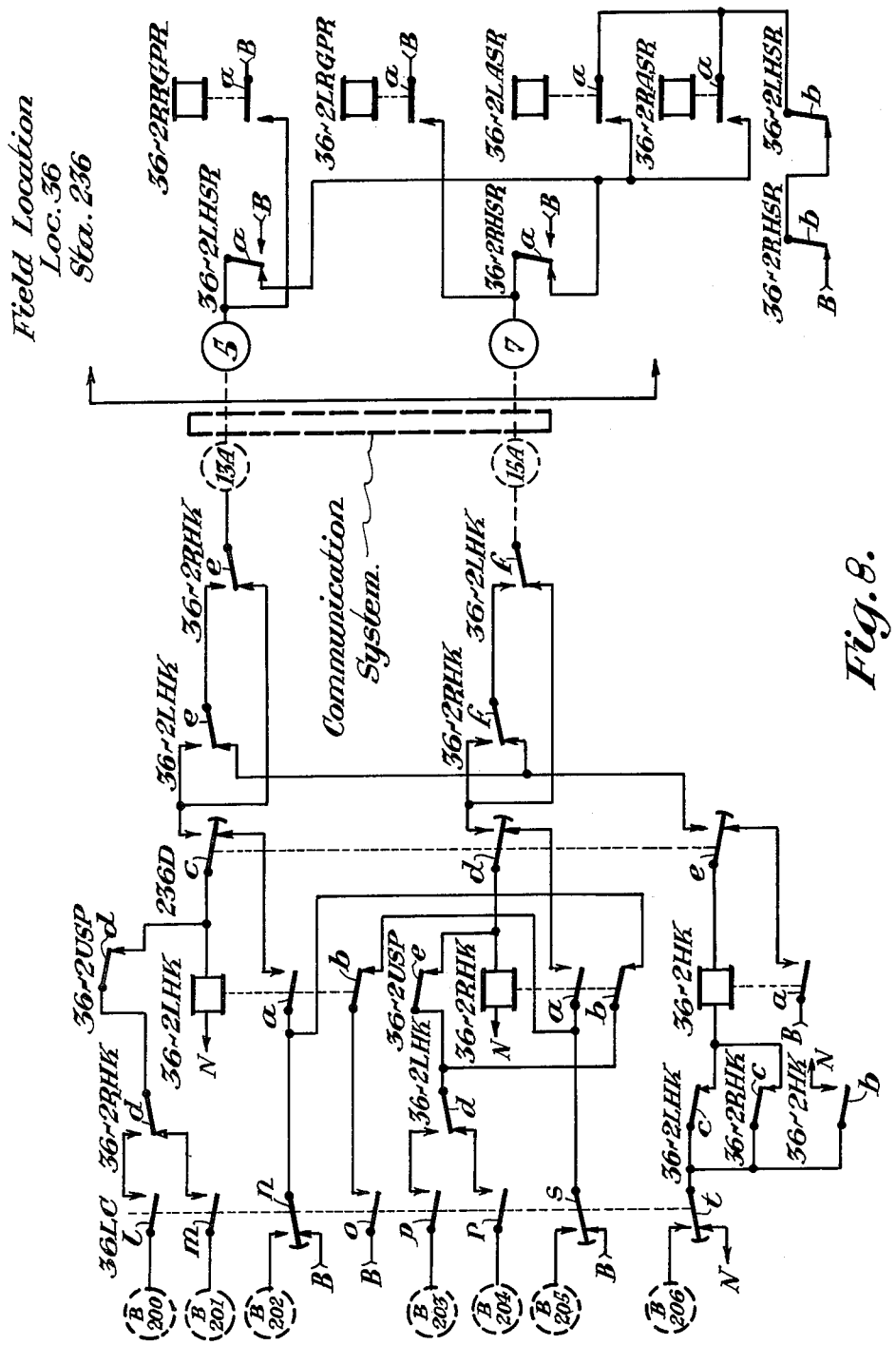

FIGS. 7 and 8 show the signal indication circuits at the field locations and the signal indication relays at the control office. The terminals shown to the right of the arrows are terminals on the field line coding units at the respective field locations and the circuits shown on the right-hand side of the drawings are the circuits for controlling the indications to be transmitted. Relays 35–2LHSR and 35–2RHSR, contacts a and b of which are shown in FIG. 7 at the field location 35, are the final stick relays shown in FIG. 5 for controlling the clearing of signals 35–2LA and 35–2LB, and 35–2R, respectively. Relays 36–2LHSR and 36–2RHSR, contacts a and b of which are shown in FIG. 8 at the field location 36, are the final stick relays shown in FIG. 5 for controlling the clearing of signals 36–2L, and 36–2RA and 36–2RB, respectively.

Relays 35–2LRGPR and 35–2RRGPR, the windings and contacts a of which are shown at field location 35 in FIG. 7, are signal repeater relays which reflect the condition of signals 35–2LA and 35–2LB, and 35–2R, respectively. The control circuits for the windings of these relays are not shown in the drawings, but such signal repeater relays and their operation are well known in the art. Relay 35–2RRGPR may be controlled for example in a manner similar to relay L58RP shown in FIG. 1b of Letters Patent of the United States No. 2,580,150, issued December 25, 1951, to Earl M. Allen, for Route Circuit Network Control Apparatus for Railway Signals. It is considered sufficient for purposes of this description to point out that back contact a of relay 35–2LRGPR is open when both signals 35–2LA and 35–2LB indicate stop, and said contact a is closed when either of said signals is cleared for a train movement to the left. Similarly, contact a of relay 35–2RRGPR is picked up and opens when signal 35–2R indicates stop, and said contact a is released and closed when said signal is cleared for a train movement to the right.

Relays 36–2LRGPR and 36–2RRGPR shown at field location 36 in FIG. 8 are signal repeater relays similar to those described above. These relays reflect the condition of signals 36–2L, and 36–2RA and 36–2RB, respectively. Back contact a of relay 36–2LRGPR is open when signal 36–2L indicates stop, and said contact a is closed when said signal is cleared for a train movement to the left. Back contact a of relay 36–2RRGPR is open when both signals 36–2RA and 36–2RB indicate stop, and said contact a is closed when either of said signals is cleared for a train movement to the right.

Relays 35–2LASR and 35–2RASR shown in FIG. 7, and relays 36–2LASR and 36–2RASR shown in FIG. 8 are approach locking relays for signals 35–2L and 35–2R, and 36–2L and 36–2R, respectively. The windings and contacts a of these relays are shown in FIG. 7 and FIG. 8 but the control circuits for the windings of the relays are not shown. Such approach locking relays and their operation are well known in the art. Relay 35–2LASR may be controlled, for example, in a manner similar to relay L58ALS shown in FIG. 1b of aforesaid Earl M. Allen Patent No. 2,580,150. It is deemed sufficient for purposes of this description to point out that such relays are normally picked up, and are released when a control code is received at the respective field location for clearing the respective signal or signals. That is, relay 35–2LASR is released when a control code is received at field location 35 for clearing signal 35–2LA or 35–2LB. Relay 35–2RASR is released when a control code is received for clearing signal 35–2R. Similarly, relay 36–2LASR is released when a control code is received at field station 36 for clearing signal 36–2L, and relay 36–2RASR is released when a control code is received for clearing signal 36–2RA or 36–2RB. When an approach locking relay is released and a control code is received for controlling the respective signal to indicate stop, the relay is not picked up until the expiration of a predetermined time delay. This time period is often termed the "in time" period of a signal and, as will be described in more detail later in this description, an "in time" indication is transmitted from the respective field location to the control office.

Terminals 13A and 15A in FIG. 7 are terminals on the office line coding unit in the control office. These terminals are also shown by dotted lines in FIG. 8 and it is believed readily understood that they are multiple connection terminals and that both sets of terminals shown are, therefore, the same terminals. The dotted lines shown between the terminals on the office line coding unit and the field line coding units represent, as before, the Form 514 code control communication system employed in illustrating and describing our invention. Terminals 13A and 15A in FIGS. 7 and 8 correspond to terminals 13A and 15A, respectively, shown on the right-hand side of the Sheet 14A of drawing D–2547 in aforementioned Manual No. 514 which describes said Form 514 code control system.

Relays 35–2LHK and 35–2RHK (FIG. 7) are the signal indication relays at the control office which indicate respectively the condition of signals 35–2LA and 35–2LB, and signal 35–2R. Similarly, relays 36–2LHK and 36–2RHK (FIG. 8) are the signal indication relays at the control office which indicate respectively the condition of signals 36–2L, and 36–2RA and 36–2RB. Relays 35–2RHK and 36–2LHK are picked up to indicate that their respective signals are cleared, and relays 35–2LHK and 36–2RHK are picked up to indicate that one of their respective signals are cleared. Signals 35–2LA, 35–2LB, 35–2R, 36–2L, 36–2RA and 36–2RB, illustrated on the track diagram in FIGS. 1b and 1c are assumed to normally be at stop and, therefore, the said signal indication relays are all shown released. Relays 35–2HK and 36–2HK are auxiliary signal indication relays, the purpose of which will become apparent later in this description. These relays are also normally released as shown.

Terminals B200 through B206 shown in FIG. 7 are multiple connection terminals to which the signal indication relays for each first set of signals at all field locations are connected. However, with only two field locations being covered in the presently described example of our invention, only two sets of signal indication relays are shown connected to said terminals, and these multiple connections are illustrated by showing said terminals by dotted lines in FIG. 8 of the drawings. It is to be understood that the terminals B200 through B206 shown in this manner in FIG. 8 represent the same terminals B200 through B206 shown by solid lines in FIG. 7.

Relay 35–2LHK has an indication pickup circuit which extends from terminal 13A on the office line coding unit over the back point of contact e of relay 35–2RHK, the front point of make-before-break contact c of relay 235D, and through the winding of relay 35–2LHK to terminal N of the battery. Relay 35–2LHK has an indication stick circuit extending from said terminal 13A over the front point of contact e of relay 35–2RHK, the front point of contact e of relay 35–2LHK, the front point of make-before-break contact c of relay 235D, and through the winding of relay 35–2LHK to terminal N of the battery.

Relay 35–2LHK has a first control pickup circuit extending from terminal B of the battery over front contact b of relay 2NP, terminal B200, front contact l of relay 35LC, the front point of contact d of relay 35–2RHK, back contact d of relay 35–2USP, and through the winding of relay 35–2LHK to terminal N of the battery. Relay 35–2LHK has a second control pickup circuit extending from terminal B of the battery over the front point of contact c of relay 2LP, terminal B201, front contact m of relay 35LC, the back point of contact d of relay 35–2RHK, back contact d of relay 35–2USP, and through the winding of relay 35–2LHK to terminal N of the battery.

Relay 35–2LHK has a control stick circuit comprising three branches, the first branch extending from terminal B of the battery over the back point of make-before-break contact n of relay 35LC to front contact a of relay 35–2LHK; the second branch extending from terminal B of the battery over the back point of contact c of relay 2RP, terminal B202, the front point of make-before-break contact n of relay 35LC to front contact a of relay 35–2LHK; and the third branch extending from terminal B of the battery over front contact o of relay 35LC, back contact b of relay 35–2RHK to front contact a of relay 35-2LHK where all three branches merge and extend over front contact a of relay 35–2LHK, the back point of make-before-break contact c of relay 235D, and through the winding of relay 35–2LHK to terminal N of the battery.

Relay 35–2RHK has an indication pickup circuit extending from terminal 15A of the office line coding unit over the back point of contact f of relay 35–2LHK, the front point of make-before-break contact d of relay 235D, and through the winding of relay 35–2RHK to terminal N of the battery. Relay 35–2RHK has an indication stick circuit extending from said terminal 15A over the front point of contact $f$ of relay 35–2LHK, the front point of contact $f$ of relay 35–2RHK, the front point of make-before-break contact $d$ of relay 235D, and through the winding of relay 35–2RHK to terminal N of the battery.

Relay 35–2RHK has a first control pickup circuit extending from battery terminal B over front contact $c$ of relay 2NP, terminal B203, front contact $p$ of relay 35LC, the front point of contact $d$ of relay 35–2LHK, back contact $e$ of relay 35–2USP, and through the winding of relay 35–2RHK to battery terminal N. Relay 35–2RHK has a second control pickup circuit extending from battery terminal B over the front point of contact $c$ of relay 2RP, terminal B204, front contact $r$ of relay 35LC, the back point of contact $d$ of relay 35–2LHK, back contact $e$ of relay 35–2USP, and through the winding of relay 35–2RHK to terminal N of the battery.

Relay 35–2RHK has a control stick circuit comprising three branches, the first branch extending from battery terminal B over the back point of make-before-break contact $s$ of relay 35LC to front contact $a$ of relay 35–2RHK; the second branch extending from battery terminal B over the back point of contact $c$ of relay 2LP, terminal B205, the front point of make-before-break contact $s$ of relay 35LC to front contact $a$ of relay 35–2RHK; and the third branch extending from terminal B of the battery over front contact $o$ of relay 35LC, the back point of contact $b$ of relay 35–2LHK to front contact $a$ of relay 35–2RHK where all three branches merge and extend over front contact $a$ of relay 35–2RHK, the back point of make-before-break contact $d$ of relay 235D, and through the winding of relay 35-2RHK to battery terminal N.

Relay 35–2HK has two indication pickup circuits, the first extending from terminal 13A on the office line coding unit over the front point of contact $e$ of relay 35–2RHK and over the back point of contact $e$ of relay 35–2LHK to the front point of make-before-break contact $e$ of relay 235D, and the second extending from terminal 15A on the office line coding unit over the front point of contact $f$ of relay 35–2LHK and over the back point of contact $f$ of relay 35–2RHK to the front point of make-before-break contact $e$ of relay 235D, where the two pickup circuits merge and extend over the front point of said contact $e$ of relay 235D, through the winding of relay 35–2HK, over back contacts $c$ of relays 35–2LHK and 35–2RHK, in a multiple circuit, thence over the back point of make-before-break contact $t$ of relay 35LC to battery terminal N, or over the front point of said contact $t$ of relay 35LC, terminal B206, and back contacts $d$ of relays 2RP and 2LP, in a series circuit, to battery terminal N. Relay 35–2HK has a stick circuit extending from battery terminal B over its own front contact $a$, the back point of make-before-break contact $e$ of relay 235D, through the winding of relay 35–2HK and thence through said back contacts $c$ of relays 35–2LHK and 35–2RHK in multiple, and over its own front contact $b$ to terminal N of the battery.

Relays 36–2LHK, 36–2RHK and 36–2HK shown in FIG. 8 have pickup and stick circuits similar to those just described for relays 35–2LHK, 35–2RHK and 35–2HK, respectively, except including contacts of relays 36LC, 36–2USP and 236D and their own contacts, and no detailed tracing of these circuits is considered necessary.

As hereinbefore stated, the above-described indication relays are utilized as control storage or memory relays, in addition to their usual use as indication relays. We will now describe in general terms the manner in which said relays are actuated to store field function commands or controls, and will later set forth specific examples of the operation of some of the relays in their employment as both field function control storage relays and field function indication relays.

In the usual code control communication system two neutral relays, such as 35–1NWK and 35–1RWK shown in FIG. 6$a$ are employed for indicating the two extreme positions of a switch, and one or the other of the relays is picked up to indicate said switch positions. Both relays are released at the same time only when the switch is in transit from one position to the other, and in the usual systems the two relays are never picked up at the same time. By providing control means for picking up both relays at the same time, a combination is available for establishing a control for operating the switch to one extreme position; and, by maintaining both relays picked up, this control can be stored until it performs its desired function, that is, the operation of the switch to said one extreme position. Similarly, by providing control means for releasing both relays at the same time, a combination is available for establishing a control for operating the switch to the other extreme position; and, by maintaining both relays released, this control can be stored until it performs its desired function, that is, the operation of the switch to said other extreme position. Usually a true "switch-in-transit" indication is provided by the released combination of both said indication relays. By employing this combination of said relays for storing a control for operating the switch to one extreme position, as set forth above, it at first appears that no means is now available for providing a switch-in-transit indication. However, if establishing and storing a switch control will be assumed to be equivalent to the switch actually being in transit, the said released combination of both indication relays can continue to be employed for providing the switch-in-transit indication when said both relays are released, and the above-described picked-up combination of both relays can be employed for providing said indication when both relays are picked up. This arrangement will become more apparent in the specific operational examples set forth hereinafter in this description.

Two neutral relays, such as relays 35–2LHK and 35–2RHK shown in FIG. 7 of the drawings, are employed in the usual code control communication systems for indicating the condition of opposing signals. Both relays are normally released to indicate the normal or stop condition of the signals and each is picked up in said systems when their respective signals are cleared. Because opposing signals cannot be cleared at the same time the picked-up combination of both signal indication relays is employed in said usual systems to indicate when the signals are "in time" which occurs, as previously explained, when a signal is cleared and then manually controlled to its stop condition. By providing control means for picking up each said relay when it is desired to clear its respective signal, and maintaining the picked-up relay in such position, means are provided for establishing and storing a signal control to be transmitted to the respective field location. However, it now appears that there are no means at the control office to respond to a signal clear indication being received from the field location. Accordingly, there is provided an additional signal indication relay, such as relay 35–2HK in FIG. 7 of the drawings, for each set of opposing signals. These relays are so arranged as to be picked up when either left or right signals are cleared and, in combination with a controlled picked-up condition of the LHK or RHK relay, an indication can be provided to indicate which signal is cleared. The picked-up condition of both LHK and RHK relays can continue to be employed for giving an "in time" indication as hereinafter described. This arrangement to accomplish this operation will become more apparent in the description of the specific operational examples of the operation of our invention set forth hereinafter in this specification.

There is shown in FIGS. 9$a$ and 9$b$ the track occupancy or signal block occupancy indication circuits at field locations 35 and 36, respectively, and the track or signal block occupancy indication relays at the control office.

The terminals 10A, 12A and 14A in FIG. 9a are terminals on the office line coding unit in the control office. These terminals are also shown by dotted lines in FIG. 9b and it will be readily understood that they are multiple connection terminals and that both sets of such terminals are, therefore, the same terminals. The terminals 2, 4 and 6 shown to the right of the arrow in each of FIGS. 9a and 9b are terminals on the field line coding units at the respective field locations and the circuits shown on the right-hand side of these terminals are the circuits for controlling the indications to be transmitted. The dotted lines shown between the terminals on the office line coding unit and the field line coding units represent, as before, the Form 514 code control communication system employed in illustrating and describing our invention. Terminals 10A, 12A and 14A in FIGS. 9a and 9b correspond to terminals 10A, 12A and 14A, respectively, shown on the right-hand side of Sheet 14A of drawing D–2547 in aforementioned Manual No. 514 which describes said Form 514 code control system.

Relays 35–1TR, 35–36MBR and 34–35BR, the windings and contacts a of which are shown at field location 35 in FIG. 9a, are track or signal block relays which reflect the condition of occupancy of associated sections of track shown in FIG. 1b. The control circuits for the windings of these relays are not shown in the drawings but their operations are well known in the art. Relay 35–1TR, for example, is energized when track section 35–1T (FIG. 1b) is unoccupied by a train and is released when that track section becomes occupied. Relay 34–35BR is energized when the single track stretch between locations 34 and 35 is unoccupied by a train and is released when any part of that stretch becomes occupied. Relay 35–36MBR is energized when the section of main track through the passing siding 35–36 is unoccupied by a train and is released when any part of that main track section becomes occupied.

Referring further to FIG. 9b, relays 36–1TR, 35–36SBR and 36–37BR, the windings and contacts a of which are shown at location 36 in such drawing figure, are track occupancy relays similar to those described for FIG. 9a. Relay 36–1TR is energized when track section 36–1T (FIG. 1c) is unoccupied by a train and is released when that track section becomes occupied. Relay 35–36SBR is energized when the siding track within the passing siding area 35–36 is unoccupied and is released when any part of that track becomes occupied. Relay 36–37BR is energized when the single track stretch between locations 36 and 37 is unoccupied and is released when any part of such stretch becomes occupied by a train.

Terminals 2, 4 and 6 shown in FIGS. 9a and 9b are, as previously pointed out, terminals on the field line coding units at the respective field locations and each set of such terminals correspond to terminals 2, 4 and 6 shown on the right-hand side of Sheet 15A of drawing D–2547 in the aforementioned Manual No. 514 which describes the Form 514 code control system employed for the illustration of the apparatus of our invention. Back contact a of relay 35–1TR in FIG. 9a corresponds to the back contact of relay TKSR connected to terminal 2 of the field line coding unit shown on the right-hand side of said Sheet 15A. Back contact a of relay 35–36MBR in FIG. 9a corresponds to the back contact of relay LAR connected to terminal 4 of the field line coding unit shown on Sheet 15A of drawing D–2547, and back contact a of relay 34–35BR in FIG. 9a corresponds to the back contact of relay RAR connected to terminal 6 on the right-hand side of said Sheet 15A. Back contacts a of relays 36–1TR, 35–36SBR and 36–37BR in FIG. 9b, similarly to the corresponding relays in FIG. 9a, also correspond respectively to the back contacts of relays TKSR, LAR and RAR on Sheet 15A of drawing D–2547.

Relays 35–1TK, 35–36MBK and 34–35BK in FIG. 9a and relays 36–1TK, 36–37BK and 35–36SBK in FIG. 9b are typical track occupancy or signal block indication relays normally employed in a centralized railway traffic control system for conveying to the control machine operators information of the location of trains in the stretch of railway provided with such control system. These relays are employed in our invention for automatically initiating or establishing switch and signal controls for controlling the movements of trains through the stretch of railway in response to the approach of such trains toward the ends of passing siding location. These track occupancy indication relays, sometimes referred to as approach indication relays, are normally released and, as will hereinafter be described, become energized, when their associated track sections shown in FIGS. 1b and 1c become occupied.

Relay 35–1TK has a pickup circuit extending from terminal 10A on the office line coding unit, the front point of make-before-break contact f of relay 235D and through the winding of relay 35–1TK to battery terminal N. Relay 35–1TK is provided with a stick circuit which may be traced from battery terminal B, front contact a of relay 35–1TK, the back point of make-before-break contact f of relay 235D and through the windings of relay 35–1TK to battery terminal N.

Relay 35–36MBK has a pickup circuit extending from terminal 12A on the office line coding unit, the front point of make-before-break contact g of relay 235D and through the winding of relay 35–36MBK to battery terminal N. Relay 35–36MBK is provided with a stick circuit extending from terminal B of the battery, front contact a of relay 35–36MBK, the back point of make-before-break contact g of relay 235D and through the winding of relay 35–36MBK to battery terminal N.

Relay 34–35BK has a pickup circuit extending from terminal 14A on the office line coding unit, the front point of make-before-break contact h of relay 235D and through the winding of relay 34–35BK to battery terminal N. Relay 34–35BK has a stick circuit extending from terminal B of the battery, front contact a of relay 34–35, the back point of the make-before-break contact h of relay 235D and through the winding of relay 34–35BK to battery terminal N.

Relays 36–1TK, 35–36SBK and 36–37BK in FIG. 9b have pickup and stick circuits similar to those described for the indication relays in FIG. 9a, except including make-before-break contacts f, g and h of relay 236D and their own front contacts a, and no detailed tracing of these circuits is considered necessary. The operation of the track occupancy indication relays will become more apparent hereinafter in specific examples of the operation of the apparatus of our invention.

There is shown in FIG. 9c the winding and a contact b of an indication relay 34–1TK, and an indication repeater relay 34–35BKA and a control circuit therefor. Relay 34–1TK is the track occupancy indication relay for the end of siding track 34–1T at location 34 (FIG. 1b) and for purposes of this description it is sufficient to point out that relay 34–1TK is controlled in a manner similar to relay 35–1TK in FIG. 9a, that is, relay 34–1TK is normally released and becomes picked up whenever track section 34–1T is occupied by a train. Since only the apparatus for locations 35 and 36 is shown and described in detail, the control circuits for relay 34–1TK are not shown but the relay may be considered to be controlled similarly to relay 35–1TK.

Relay 34–35BKA shown in FIG. 9c has a multiple pickup circuit which extends from terminal B of the battery over front contacts b of relays 34–1TK, 35–1TK and 34–35BK, all in multiple, and through the winding of relay 34–35BKA to battery terminal N. Relay 34–35BKA is, therefore, normally released and becomes picked up whenever relay 34–1TK, 35–1TK or 34–35BK becomes picked up. The purpose of relay 34–35BKA will become apparent later.

In FIG. 9d there is shown the winding and a contact b of an indication relay 37–1TK, and an indication repeater relay 36–37BKA and a control circuit therefor. Relay 37–1TK is the track occupancy indication relay for the end of siding track 37–1T at location 37 (FIG. 1c). Similarly to relay 34–1TK, since only the apparatus for locations 35 and 36 is shown and described in detail, the control circuits for relay 37–1TK are not shown but the relay may be considered to be controlled in a manner similar to relay 36–1TK in FIG. 9b, that is, relay 37–1TK is normally released and becomes picked up whenever track section 37–1T (FIG. 1c) is occupied by a train.

Relay 36–37BKA shown in FIG. 9d has a multiple pickup circuit extending from terminal B of the battery over front contacts b of relays 37–1TK, 36–1TK and 36–37BK, all in multiple, and through the winding of relay 36–37BKA to battery terminal N. Relay 36–37BKA is, therefore, normally released and becomes picked up whenever relay 37–1TK, 36–1TK or 36–37BK becomes picked up. The purpose of relay 36–37BKA will be covered hereinafter.

There is shown in FIGS. 10a through 10e, and in FIGS. 11a through 11e a plurality of relays and control circuits therefor provided at the control office for field locations 35 and 36, respectively. These relays and control circuits are employed in our invention for establishing priority of routes through and out of the passing siding 35–36, as will become apparent. The windings and contacts only of an additional plurality of relays is shown in each of the pairs of FIGS. 10a and 10d and 11a and 11d, and the control circuits for these additional relays will be discussed hereinafter.

Figure 10A:
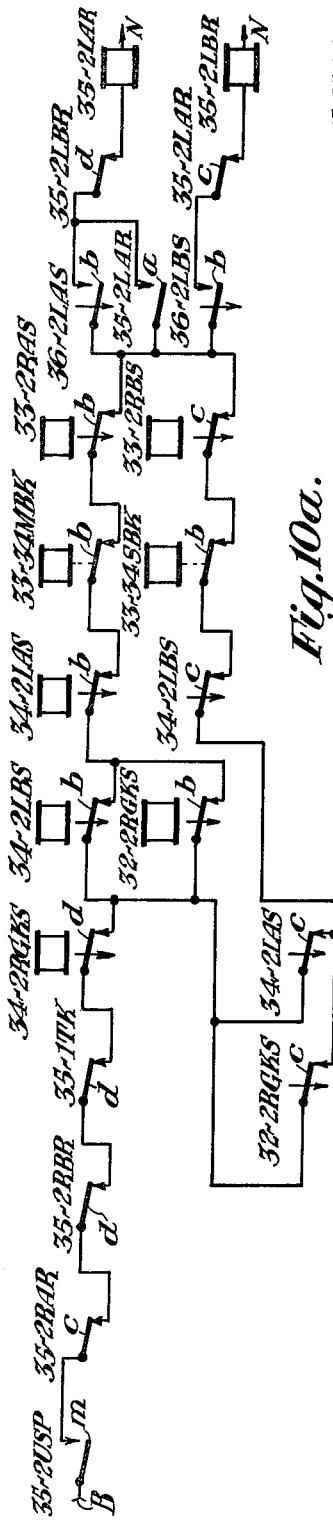
FIGS. 10a, 10b, 10c, 10d and 10e illustrate the relays and control circuits employed at the control office for automatically indicating or establishing in response to track occupancy indications received, the switch and signal controls to be transmitted to field station 235.

Referring to FIG. 10a, relays 35–2LAR and 35–2LBR are the route control relays for initiating westward routes or routes to the left past signals 35–2LA and 35–2LB out of the main and siding tracks, respectively, of the passing siding 35–36 (Loc. 35, FIG. 1b). Relay 35–2LAR is provided with a first pickup circuit which may be traced from battery terminal B, front contact m of relay 35–2USP, back contact c of relay 35–2RAR, to be discussed, back contact d of relay 35–2RBR, to be discussed, back contact d of relay 35–1TK, back contact d of relay 34–2RGKS, to be discussed, back contacts b, in multiple of relays 34–2LBS and 32–2RGKS, to be discussed, back contact b of relay 34–2LAS, to be discussed, back contact b of relay 33–34MBK, to be discussed, back contact b of relay 33–2RAS, to be discussed, front contact b of relay 36–2LAS, to be discussed, and over back contact d of relay 35–2LBR and through the winding of relay 35–2LAR to battery terminal N. Relay 35–2LAR has a second pickup circuit extending from battery terminal B, front contact m of relay 35–2USP, back contact c of relay 35–2RAR, back contact d of relay 35–2RBR, back contact d of relay 35–1TK, back contact b of relay 34–2RGKS, front contacts C, in multiple, of relays 32–2RGKS and 34–2LAS, to be discussed, back contact c of relay 34–2LBS, to be discussed, back contact b of relay 33–34SBK, to be discussed, back contact c of relay 33–2RBS, to be discussed, front contact b of relay 36–2LAS, and over back contact d of relay 35–2LBR and through the winding of relay 35–2LAR to battery terminal N. Relay 35–2LAR is provided with a stick circuit which consists of its own front contact a in multiple in the above-traced circuits with the front contact b of relay 36–2LAS. Relay 35–2LBR is provided with first and second pickup circuits which are identical to the above-traced pickup circuits for relay 35–2LAR except the pickup circuits for relay 35–2LBR include front contact b of relay 36–2LBS and back contact c of relay 35–2LAR in place of front contact b of relay 36–2LAS and back contact d of relay 35–2LBR, respectively, employed in the pickup circuits for relay 35–2LAR. The operation of relays 35–2LAR and 35–2LBR will be covered hereinafter.

Figure 10C:
Figure 10B:
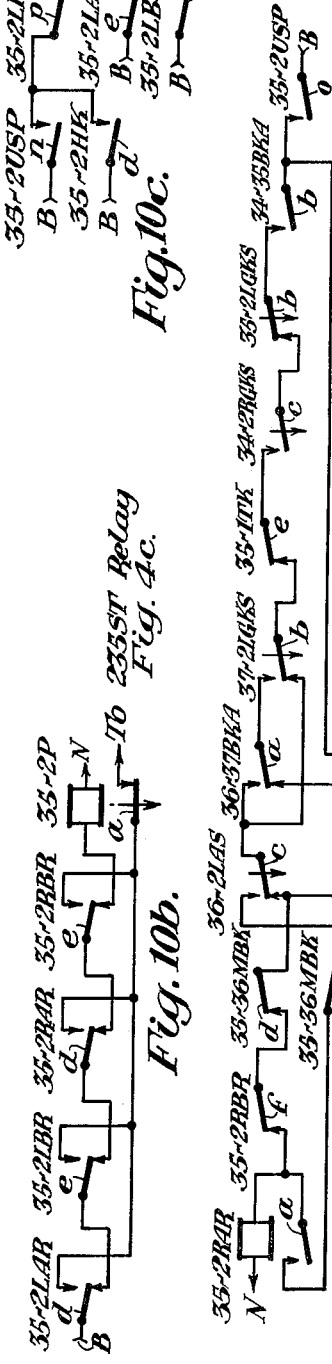

Referring to FIG. 10b, there is shown a slow release relay 35–2P which is employed to control the previously mentioned second pickup circuit for relay 235ST in FIG. 4c. Relay 35–2P has a pickup circuit which extends from battery terminal B over the back point of contact d of relay 35–2LAR, the back point of contact e of relay 35–2LBR, the back point of contact d of relay 35–2RAR, the back point of contact e of relay 35–2RBR and through the winding of relay 35–2P to battery terminal N. Relay 35–2P is, therefore, energized whenever relays 35–2LAR, 35–2LBR, 35–2RAR and 35–2RBR are all released. Relay 35–2P becomes deenergized and opens its front contact a, following the delay period provided by its slow release feature, whenever one of the relays 35–2LAR, 35–2LBR, 35–2RAR or 35–2RBR becomes picked up. The picking up of one of these relays momentarily closes the second pickup circuit for relay 235ST in FIG. 4c. This circuit is a multiple circuit extending from battery terminal B in FIG. 10b over the front point of contact d of relay 35–2LAR, or over the back point of contact d of relay 35–2LAR and the front point of contact e of relay 35–2LBR, or over the back points of contacts d and e of relays 35–2LAR and 35–2LBR, respectively, and the front point of contact d of relay 35–2RAR, or over the back points of contacts d, e and d of relays 35–2LAR, 35–2LBR, and 35–2RAR, respectively, and the front point of contact e of relay 35–2RBR, to front contact a of slow release relay 35–2P and thence to the control winding of relay 235ST in FIG. 4c and through such winding to battery terminal N. It is thus apparent that relay 235ST becomes momentarily energized and picks up whenever one of the relays 35–2LAR, 35–2LBR, 35–2RAR or 35–2RBR becomes picked up. Relay 235ST once so picked up remains temporarily picked up over its stick circuit including back contact c of relay 235S (FIG. 4c). The purpose of energizing relay 235ST in the manner described will be made apparent later.

Relay 35–2LGKS in FIG. 10c is provided with a first multiple pickup circuit extending from battery terminal B over front contact n of relay 35–2USP and front contact d of relay 35–2HK in multiple, front contact p of relay 35–2LHK, and through the winding of relay 35–2LGKS to battery terminal N. Relay 35–2LGKS is provided with a second multiple pickup circuit extending from battery terminal B over front contact e of relay 35–2LAR and front contact f of relay 35–2LBR in multiple, and through the winding of relay 35–2LGKS to battery terminal N. Relay 35–2LGKS is provided with a stick circuit which may be traced from terminal B of the battery over front contact c of relay 34–35BKA, front contact a of relay 35–2LGKS and through the winding of relay 35–2LGKS to battery terminal N. Thus, relay 35–2LGKS becomes picked up whenever relay 35–2USP or relay 35–2HK becomes picked up and relay 35–2LHK is picked up, or whenever relay 35–2LAR or 35–2LBR becomes picked up. Once relay 35–2LGKS becomes picked up, it is maintained picked up so long as relay 34–35BKA is picked up. The picking up of relay 34–35BKA indicates that track section 34–1T, track section 35–1T or the stretch of single track between these two track sections is occupied by a train. The purpose of relay 35–2LGKS will be pointed out hereinafter.

Figure 10D:
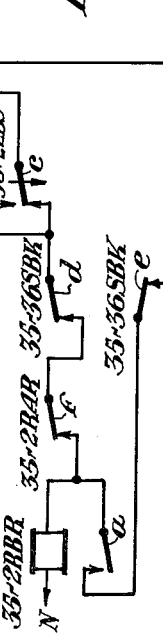

Relays 35–2RAR and 35–2RBR shown in FIG. 10d are the route control relays for initiating eastward routes or routes to the right past signal 35–2R into the main and siding tracks, respectively, of passing siding 35–36 (Loc. 35, FIG. 1b). Relay 35–2RAR is provided with a multiple pickup circuit which extends from terminal B of the battery over front contact o of relay 35–2USP, front contact b of relay 34–35BKA, back contact b of relay 35–2LGKS, front contact c of relay 34–2RGKS, back contact e of relay 35–1TK, and thence branching into three paths, the first path extending over the back point of contact b of relay 37–2LGKS, to be discussed, and the back point of contact c of relay 36–2LAS to a back contact d of relay 35–36MBK, the second path extending over the front point of contact b of relay 37–2LGKS, the front point of contact a of relay 36–37BKA and the back point of contact c of relay 36–2LAS to said back contact

*d* of relay 35–36MKB, and the third path extending over the front point of contact *b* of relay 37–2LGKS, the back point of contact *a* of relay 36–37BKA and the front point of contact *c* of relay 36–2LBS to said back contact *d* of relay 35–36MBK where all three paths join and extend over said back contact *d* of relay 35–36MBK, back contact *f* of relay 35–2RBR and through the winding of relay 35–2RAR to battery terminal N. Relay 35–2RAR is provided with a stick circuit which may be traced from battery terminal B over front contact *o* of relay 35–2USP, back contact *e* of relay 35–36MBK, front contact *a* of relay 35–2RAR and through the winding of relay 35–2RAR to battery terminal N.

Relay 35–2RBR is provided with a multiple pickup circuit which extends from battery terminal B over front contact *o* of relay 35–2USP, front contact *b* of relay 34–35BKA, back contact *b* of relay 35–2LGKS, front contact *c* of relay 34–2RGKS, back contact *e* of relay 35–1TK, and thence branching into three paths, the first path extending over the back point of contact *b* of relay 37–2LGKS and the front point of contact *c* of relay 36–2LAS to back contact *d* of relay 35–36SBK, the second path extending over the front point of contact *b* of relay 37–2LGKS, the front point of contact *a* of relay 36–37BKA and the front point of contact *c* of relay 36–2LAS to back contact *d* of relay 35–36SBK, and the third path extending over the front point of contact *b* of relay 37–2LGKS, the back point of contact *a* of relay 36–37BKA, and over the back point of contact *c* of relay 36–2LBS to back contact *d* of relay 35–36SBK where all three paths join and extend over said back contact *d* of relay 35–36SBK, back contact *f* of relay 35–2RAR and through the winding of relay 35–2RBR to battery terminal N. Relay 35–2RBR is provided with a stick circuit which extends from battery terminal B over front contact *o* of relay 35–2USP, back contact *e* of relay 35–36SBK, front contact *a* of relay 35–2RBR and through the winding of relay 35–2RBR to battery terminal N. The operation of relays 35–2RAR and 35–2RBR will be covered hereinafter in this description.

Figure 10E:
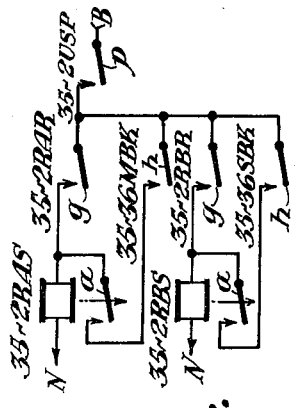

Relay 35–2RAS in FIG. 10e has a pickup circuit extending from battery terminal B over front contact *p* of relay 35–2USP, front contact *g* of relay 35–2RAR and through the winding of relay 35–2RAS to battery terminal N. Relay 35–2RAS has a stick circuit extending from battery terminal B over front contact *p* of relay 35–2USP, front contact *h* of relay 35–36MBK, front contact *a* of relay 35–2RAS and through the winding of relay 35–2RAS to battery terminal N. Relay 35–2RAS is thus picked up whenever relays 35–2USP and 35–2RAR become picked up and, once so picked up, is maintained picked up so long as relays 35–2USP and 35–36MBK are picked up. The picking up of relay 35–36MBK indicates that the main track within the passing siding area 35–36 is occupied by a train. The purpose of relay 35–2RAS will be discussed hereinafter.

Relay 35–2RBS in FIG. 10e is provided with a pickup circuit extending from battery terminal B over front contact *p* of relay 35–2USP, front contact *g* of relay 35–2RBR and through the winding of relay 35–2RBS to battery terminal N. Relay 35–2RBS is provided with a stick circuit extending from battery terminal B over front contact *p* of relay 35–2USP, front contact *h* of relay 35–36SBK, front contact *a* of relay 35–2RBS and through the winding of relay 35–2RBS to battery terminal N. Relay 35–2RBS thus becomes picked up whenever relays 35–2USP and 35–2RBR become picked up and, once so picked up, is maintained picked up so long as relays 35–2USP and 35–36SBK are picked up. The picking up of relay 35–36SBK indicates that the siding track within the passing siding area 35–36 is occupied by a train. The purpose of relay 35–2RBS will be discussed later in this description.

Referring to FIG. 11a, relays 36–2RAR and 36–2RBR are the route control relays for initiating eastward routes or routes to the right past signals 36–2RA and 36–2RB out of the main and siding tracks, respectively, of the passing siding 35–36 (Loc. 36, FIG. 1c). Relay 36–2RAR is provided with a first pickup circuit which may be traced from battery terminal B, front contact *m* of relay 36–2USP, back contact *d* of relay 36–2LBR, to be discussed, back contact *c* of relay 36–2LAR, to be discussed, back contact *d* of relay 36–1TK, back contact *d* of relay 37–2LGKS, to be discussed, back contacts *b*, in multiple, of relays 37–2RBS and 39–2LGKS, to be discussed, back contact *b* of relay 37–2RAS, to be discussed, back contact *b* of relay 37–38MBK, to be discussed, back contact *b* of relay 38–2LAS, to be discussed, front contact *b* of relay 35–2RAS, and over back contact *d* of relay 36–2RBR and through the winding of relay 36–2RAR to battery terminal N. Relay 36–2RAR has a second pickup circuit extending from battery terminal B, front contact *m* of relay 36–2USP, back contact *d* of relay 36–2LBR, back contact *c* of relay 36–2LAR, back contact *d* of relay 36–1TK, back contact *b* of relay 37–2LGKS, back contacts *c*, in multiple, of relays 39–2LGKS and 37–2RAS, to be discussed, back contact *c* of relay 37–2RBS, to be discussed, back contact *b* of relay 37–38SBK, to be discussed, back contact *c* of relay 38–2LBS, to be discussed, front contact *b* of relay 35–2RAS, and over back contact *d* of relay 36–2RBR and through the winding of relay 36–2RAR to battery terminal N. Relay 36–2RAR is provided with a stick circuit which consists of its own front contact *a* in multiple in the above-traced circuits with the front contact *b* of relay 35–2RAS.

Relay 36–2RBR is provided with first and second pickup circuits which are identical to the above-traced pickup circuits for relay 36–2RAR except the pickup circuits for relay 36–2RBR include front contact *b* of relay 35–2RBS and back contact *c* of relay 36–2RAR in place of front contact *b* of relay 35–2RAS and back contact *d* of relay 36–2RBR, respectively, employed in the pickup circuits for relay 36–2RAR. The operation of relays 36–2RAR and 36–2RBR will be covered hereinafter.

Referring to FIG. 11b, there is shown a slow release relay 36–2P which is employed to control the previously mentioned second pickup circuit for relay 236ST in FIG. 4c. Relay 36–2P has a pickup circuit which extends from battery terminal B over the back point of contact *d* of relay 36–2RAR, the back point of contact *e* of relay 36–2RBR, the back point of contact *d* of relay 36–2LAR, the back point of contact *e* of relay 36–2LBR and through the winding of relay 36–2P to battery terminal N. Relay 36–2P is, therefore, energized whenever relays 36–2RAR, 36–2RBR, 36–2LAR and 36–2LBR are all released. Relay 36–2P becomes deenergized and opens its front contact *a*, following the delay period provided by its slow release feature, whenever one of the relays 36–2RAR, 36–2RBR, 36–2LAR or 36–2LBR becomes picked up. The picking up of one of these relays momentarily closes the second pickup circuit for relay 236ST in FIG. 4c. This circuit is a multiple circuit extending from battery terminal B in FIG. 11b over the front point of contact *d* of relay 36–2RAR, or over the back point of contact *d* of relay 36–2RAR and the front point of contact *e* of relay 36–2RBR, or over the back points of contacts *d* and *e* of relays 36–2RAR and 36–2RBR, respectively, and the front point of contact *d* of relay 36–2LAR, or over the back points of contacts *d*, *e* and *d* of relays 36–2RAR, 36–2RBR and 36–2LAR, respectively, and the front point of contact *e* of relay 36–2LBR, to front contact *a* of slow release relay 36–2P and thence to the control winding of relay 236ST in FIG. 4c and through said winding to battery terminal N. It is thus apparent that relay 236ST becomes momentarily energized and picks up whenever one of the relays 36–2RAR, 36–2RBR, 36–2LAR or 36–2LBR becomes picked up, and relay 236ST once so picked up remains temporarily picked up over its stick circuit including back contact *c* of relay 236S (FIG. 4c). The purpose of momentarily energizing relay 236ST in the manner described will be made apparent later.

Relay 36—2RGKS in FIG. 11c is provided with a first multiple pickup circuit extending from battery terminal B over front contact *n* of relay 36–2USP and front contact *d* of relay 36–2HK in multiple, front contact *p* of relay 36–2RHK, and through the winding of relay 36–2RGKS to battery terminal N. Relay 36–2RGKS is provided with a second multiple pickup circuit extending from battery terminal B over front contact *e* of relay 36–2RAR and front contact *f* of relay 36–2RBR in multiple, and through the winding of relay 36–2RGKS to battery terminal N. Relay 36–2RGKS is provided with a stick circuit which may be traced from terminal B of the battery over front contact *c* of relay 36–37BKA, front contact *a* of relay 36–2RGKS and through the winding of relay 36–2RGKS to battery terminal N. Thus, relay 36–2RGKS becomes picked up whenever relay 36–2USP or relay 36–2HK becomes picked up and relay 36–2RHK is picked up, or whenever relay 36–2RAR or 36–2RBR becomes picked up. Once relay 36–2RGKS becomes picked up, it is maintained picked up so long as relay 36–37BKA is picked up. The picking up of relay 36–37BKA indicates that track section 36–1T, track section 37–1T or the stretch of single track between these two track sections is occupied by a train. The purpose of relay 36–2RGKS will be pointed out hereinafter.

Relays 36–2LAR and 36–2LBR shown in FIG. 11d are the route control relays for initiating westward routes or routes to the left past signal 36–2L into the main or siding tracks of passing siding 35–36 (Loc. 36, FIG. 1c). Relay 36–2LAR is provided with a multiple pickup circuit which extends from terminal B of the battery over front contact *o* of relay 36–2USP, front contact *b* of relay 36–37BKA, back contact *b* of relay 36–2RGKS, front contact *c* of relay 37–2LGKS, back contact *e* of relay 36–1TK, and thence branching into three paths, the first path extending over the back point of contact *b* of relay 34–2RGKS, to be discussed, and the back point of contact *c* of relay 35–2RAS to a back contact *f* of relay 35–36MBK, the second path extending over the front point of contact *b* of relay 34–2RGKS, the front point of contact *a* of relay 34–35BKA and the back point of contact *c* of relay 35–2RAS to said back contact *f* of relay 35–36MBK, and the third path extending over the front point of contact *b* of relay 34–2RGKS, the back point of contact *a* of relay 34–35BKA and the front point of contact *c* of relay 35–2RBS to said back contact *f* of relay 35–36MBK where all three paths join and extend over said back contact *f* of relay 35–36MBK, back contact *f* of relay 36–2LBR and through the winding of relay 36–2LAR to battery terminal N. Relay 36–2LAR is provided with a stick circuit which may be traced from battery terminal B over front contact *o* of relay 36–2USP, back contact *g* of relay 35–36MBK, front contact *a* of relay 36–2LAR and through the winding of relay 36–2LAR to battery terminal N.

Relay 36–2LBR is provided with a multiple pickup circuit which extends from battery terminal B over front contact *o* of relay 36–2USP, front contact *b* of relay 36—37BKA, back contact *b* of relay 36–2RGKS, front contact *c* of relay 37–2LGKS, back contact *e* of relay 36–1TK, and thence branching into three paths, the first path extending over the back point of contact *b* of relay 34–2RGKS and the front point of contact *c* of relay 35–2RAS to back contact *f* of relay 35–36SBK, the second path extending over the front point of contact *b* of relay 34–2RGKS, the front point of contact *a* of relay 34–35BKA and the front point of contact *c* of relay 35–2RAS to back contact *f* of relay 35–36SBK, and the third path extending over the front point of contact *b* of relay 34–2RGKS, the back point of contact *a* of relay 34–35BKA, and over the back point of contact *c* of relay 35–2RBS to back contact *f* of relay 35–36SBK where all three paths join and extend over said back contact *f* of relay 35–36SBK, back contact *f* of relay 36–2LAR and through the winding of relay 36–2LBR to battery terminal N. Relay 36–2LBR is provided with a stick circuit which extends from battery terminal B over front contact *o* of relay 36–2USP, back contact *g* of relay 35–36SBK, front contact *a* of relay 36–2LBR and through the winding of relay 36–2LBR to battery terminal N. The operation of relays 36–2LAR and 36–2LBR will be covered hereinafter in this description.

Relay 36–2LAS in FIG. 11e has a pickup circuit extending from battery terminal B over front contact *p* of relay 36–2USP, front contact *g* of relay 36–2LAR and through the winding of relay 26–2LAS to battery terminal N. Relay 36–2LAS has a stick circuit extending from battery terminal B over front contact *p* of relay 36–2USP, front contact *k* of relay 35–36MBK, front contact *a* of relay 36–2LAS and through the winding of relay 36–2LAS to battery terminal N. Relay 36–2LAS is thus picked up whenever relays 36–2USP and 36–2LAR become picked up and, once so picked up, is maintained picked up so long as relays 36–2USP and 35–36MBK are picked up. The picking up of relay 35–36MBK indicates that the main track within the passing siding area 35–36 is occupied by a train. The purpose of relay 36–2LAS will be discussed hereinafter.

Relay 36–2LBS in FIG. 11e is provided with a pickup circuit extending from battery terminal B over front contact *p* of relay 36–2USP, front contact *g* of relay 36–2LBR and through the winding of relay 36–2LBS to battery terminal N. Relay 36–2LBS is provided with a stick circuit extending from battery terminal B over front contact *p* of relay 36–2USP, front contact *k* of relay 35–36SBK, front contact *a* of relay 36–2LBS and through the widing of relay 36–2LBS to battery terminal N. Relay 36–2LBS thus becomes picked up whenever relays 36–2USP and 36–2LBR become picked up and, once so picked up, is maintained picked up so long as relays 36–2USP and 35–36SBK are picked up. The picking up of relay 35–36SBK indicates that the siding track within the passing siding area 35–36 is occupied by a train. The purpose of relay 36–2LBS will be discussed later in this description.

Referring further to FIG. 10a and FIG. 10d, relays 33–2RAS, 33–2RBS, 33–34MBK, 33–34SBK, 34–2LAS, 34–2LBS, 32–RGKS and 34–2RGKS, the windings and contacts only of which are shown in the drawings, are relays which are associated with locations other than location 35 or 36 and, therefore, the control circuits for these relays are, for purposes of simplicity, not shown. However, the operation of these relays will be readily understood by referring to the control circuits for corresponding relays at locations 35 and 36 since the apparatus at each field location is repetitive, as will be apparent from a comparison of the apparatus shown in FIGS. 10a through 10e, with the apparatus shown in FIGS. 11a through 11e for locations 35 and 36, respectively. The correspondence between the above-listed relays and the similar relays at locations 35 and 36 is given in the following paragraph.

Relays 33–2RAS and 33–2RBS are associated with location 33 and correspond to relays 35–2RAS and 35–2RBS, respectively, shown in FIG. 10e, and it will be readily understood that relays 33–2RAS and 33–2RBS are actuated by control circuits similar to those shown for relays 35–2RAS and 35–2RBS, respectively. Relay 33–34MBK is associated with locations 33 and 34 and corresponds to and is actuated by a control circuit similar to that for relay 35–36MBK shown in FIG. 9a. Relay 33–34SBK is associated with locations 33 and 34 and corresponds to and is actuated by a control circuit similar to that for relay 35–36SBK shown in FIG. 9b. Relays 34–2LAS and 34–2LBS are associated with location 34 and correspond to and are actuated by control circuits similar to those for relays 36–2LAS and 36–2LBS, respectively, shown in FIG. 11e. Relays 32–2RGKS and 34–2RGKS are associated with locations 32 and 34, respectively, and each corresponds to and is actuated by a control circuit similar to that for relay 36–2RGKS shown in FIG. 11c.

Relays 38–2LAS, 38–2LBS, 37–38MBK, 37–38SBK, 37–2RAS, 37–2RBS, 37–2LGKS and 39–2LGKS, the windings and contacts only of which are shown in FIGS. 11a and 11d are associated with locations other than locations 35 and 36, similar to the above-listed relays in FIGS. 10a and 10d, and the control circuits for these relays also are not shown in the drawings. The correspondence between the above-listed relays and similar relays at locations 35 and 36 is set out in the following paragraph.

Relays 38–2LAS and 38–2LBS are associated with location 38 and correspond to and are actuated by control circuits similar to those for relays 36–2LAS and 36–2LBS, respectively, shown in FIG. 11e. Relay 37–38MBK is associated with locations 37 and 38 and corresponds to and is actuated by a control circuit similar to that for relay 35–36MBK shown in FIG. 9a. Relay 37–38SBK is also associated with locations 37 and 38 and corresponds to and is actuated by a control circuit similar to that for relay 35–36SBK shown in FIG. 9b. Relays 37–2RAS and 37–2RBS are associated with location 37 and correspond to and are actuated by control circuits similar to those for relays 35–2RAS and 35–2RBS, respectively, shown in FIG. 10e. Relays 37–2LGKS and 39–2LGKS are associated with locations 37 and 39, respectively, and each corresponds to and is actuated by a control circuit similar to that for relay 35–2LGKS shown in FIG. 10c.

Having thus described the apparatus of the centralized railway traffic control system shown in the drawings, including the apparatus of our invention, we will now set forth several operational examples of such apparatus. In order to maintain, in so far as possible, a distinct line of demarcation between the apparatus of our invention and the traffic control apparatus of the aforesaid Pascoe Patent 3,015,722, in conjunction with which the apparatus of our invention is herein described, we will describe several examples of manual operation of the traffic control system as covered by this prior patent and will then describe several operational examples of the automatic operation provided by the apparatus of our invention as applied to such a traffic control system.

All of the apparatus is shown in the drawings in its normal condition. Assuming that the control machine or control panel operator desires to manually clear signal 35–2LB, shown in FIG. 1b, at field location 35 (field station 235), for a train movement out of the siding in the left-hand or westward direction over switch 35–1W in its reverse position, he will first select the field location by depressing push buttons 3DPB and 5PB on the control panel (FIG. 3) in that order. This manipulation will energize location selection relay 35LC over its previously described pickup circuit including back contacts of push buttons 3DPB and 5PB, the relay will pick up, and, the buttons being stick push buttons as previously described, relay 35LC will temporarily remain picked up. Field location 35 has thus been selected.

The operator will now depress reverse switch control push button 1RPB (FIG. 4a) and left signal control push button 2LPB (FIG. 4b) in that order. The depressing of push button 1RPB momentarily closes back contact a of the button, and relay 1RP is energized over its previously described pickup circuit including front contact c of location selection relay 35LC and the back point of contact b of relay 35–1RWK. Relay 1RP accordingly picks up. The said front contact of relay 35LC prevents the establishment of the switch control before a field location has been selected. The said back contact of relay 35–1RWK permits the establishment of the reverse switch control only when the switch occupies its normal position or is in transit to its normal position. (Similarly the front point of contact b of relay 35–1RWK in the previously described pickup circuit for relay 1NP permits the establishment of a normal switch control only when the switch occupies its reverse position or is in transit to its reverse position.) Relay 1RP picks up as stated, and is maintained picked up over its previously described stick circuit including its own front contacts a and b, back contact c of relay 1NP and front contact b of relay 35LC. Back contact c of relay 1NP insures that the stick circuit for relay 1RP is opened when a normal switch control is established, and, if relay 1RP is picked up by the operator inadvertently depressing push button 1RPB when he intended to push button 1NPB, the subsequent depressing of button 1NPB and picking up of relay 1NP will open the stick circuit for relay 1RP at the open back contact c of relay 1NP, thereby releasing relay 1RP. The negative terminal of the battery is connected to relay 1NP over the front point of contact b of relay 35–1RWK when relay 1RP is up, due to relay 35–1RWK being picked up by the picking up of relay 1RP as will be hereinafter described. Front contact b of relay 35LC in the stick circuit for relay 1RP opens the stick circuit, when the control panel is transferred for control of another field location, or when the field location selection is manually cancelled or, as will appear hereinafter, after the controls have been transmitted to the field location 35. (Front contact b of relay 35LC also operates in a similar manner in the stick circuit for relay 1NP.)

The depressing of push button 2LPB (FIG. 4b), as described, momentarily closes back contact a of the button and relay 2LP is energized over its previously described pickup circuit including front contact d of relay 35LC. Relay 2LP accordingly picks up. Front contact d of relay 35LC prevents the establishment of the signal control before a field location has been selected; and opens the stick circuit for relay 2LP when the control panel is transferred for control of another field location, when the field location selection is manually cancelled or, as will appear hereinafter, after the controls have been transmitted to the field location 35. Relay 2LP picks up as stated and is maintained picked up over its previously described stick circuit including back contact a of relay 2NP and the front point of its own contact a. This make-before-break contact a insures the establishment of the stick circuit for relay 2LP before the back point of contact a in the pickup circuit for the relay is opened. The back point of contact a of relay 2NP in the stick circuit for relay 2LP provides means for releasing relay 2LP if it had been inadvertently picked up by the operator depressing push button 2LPB incorrectly. (The back point of contact a of relay 2NP also provides means for releasing relay 2RP under similar conditions.) The operation of relay 2NP will be discussed hereinafter in this description.

As previously stated, all apparatus being assumed to be in its normal condition, switch 35–1W at field location 35 occupies its normal position and switch indication relay 35–1NWK (FIG. 6a), prior to the picking up of relay 35LC, is held up over its previously described stick circuit including the back point of contact h of relay 35LC. When relay 35LC is picked up as previously described, relay 35–1NWK is continued to be held up by the circuit over the front point of contact h of relay 35LC and back contact d of relay 1NP. Said contact h is a make-before-break contact to insure the continued energization of relay 35–1NWK when the contact transfers from its back to its front contact point. When relay 1RP is picked up as described above, the control pickup circuit for relay 35–1RWK (FIG. 6a) including front contact e of relay 1RP and front contact k of relay 35LC, is completed and relay 35–1RWK picks up. The picking up of relay 35–1RWK establishes the stick circuit for that relay including its own front contact a and the front point of contact h of relay 35LC. Back contact d of relay 1NP in the stick circuits for relays 35–1NWK and 35–

1RWK provides the means for releasing both said relays to store a normal switch control when such a control is initiated by the depressing of push button 1NPB and the resultant pickup of relay 1NP.

As has previously been set forth the track diagram illustrated in FIGS. 1a through 1d is normally dark. However, as shown in FIG. 2 the picking up of relay 35–1RWK completes an intermittent energizing circuit for the filament of indication lamp 35–1WRKE which may be traced from coded battery CB, previously described, over the front point of contact g of relay 35–1NWK, front contact g of relay 35–1RWK and through the filament of said lamp to terminal N of the battery. Lamp 35–1WRKE thus commences flashing and indicates that a command or control has been stored for controlling switch 35–1W to its reverse position (or that the switch is actually in transit to its reverse position as described later).

The picking up of relay 2LP as previously described completes the previously described control pickup circuit for relay 35–2LHK (FIG. 7) including the front point of contact c of relay 2LP, front contact m of relay 35LC, the back point of contact d of relay 35–2RHK and back contact d of relay 36–2USP. Relay 35–2LHK accordingly picks up and completes its previously described stick circuits including its own front contact a.

The picking up of relay 35–2LHK as described above completes an intermittent energizing circuit for the filament of indication lamp 35–2LBAKE (FIG. 2) which may be traced from coded battery CB over the back point of contact c of relay 35–2HK, the back point of contact b of relay 35–2USP, the front point of contact l of relay 35–2LHK, back contact k of relay 35–2RHK, the front point of contact d of relay 35–1RWK and through the filament of said lamp to terminal N of the battery. Lamp 35–2LBAKE thus begins to flash and indicates that a control has been stored for clearing signal 35–2LB.

The operator having selected the desired field location 35 and established the proper controls as outlined above, now depresses the code start push button STPB (FIG. 4c) to establish and store a code start for field station 235 assigned to field location 35. The depressing of said push button closes the previously described pickup circuit for relay STP. Accordingly, relay STP picks up and closes its previously described stick circuit including its own front contact a, the back point of contact b of relay MP and front contact f of relay 35LC. Relay STP is accordingly temporarily maintained in its picked-up position, but released when relay MP picks up as hereinafter described. Front contact f of relay 35LC in the stick circuit for relay STP opens said stick circuit when the control panel is transferred for control of another field location or when the field location selection is manually cancelled.

The picking up of relay STP closes at its front contact c the previously described pickup circuit for start relay 235ST including front contact e of relay 35LC. Relay 235ST accordingly picks up and completes its stick circuit including its own front contact a and the back point of contact c of field station 235 call relay 235S. Normally closed back contact b of push button STPB over which all start relays such as 235ST are connected to terminal N of the battery is employed for reset purposes, and the pulling of push button STPB will open said contact b and release 235ST relay and any other start relays which are picked up. Contact b of push button STPB is thus employed in lieu of the reset button shown on the upper right-hand side of drawing D–2547, sheet 14A in aforesaid Manual No. 514. It should be pointed out that said contact b is also shown connected to terminal 17A of the office line coding unit, in a similar manner that the reset button in said drawing is connected.

The operator by depressing push button STPB completes the storages for field location 35, field station 235, and the control panel is now available to select another location and establish control storages for such other location.

It will first be assumed that at the time the operator depresses the start push button STPB, another field station is transmitting indications to the control office over the code control communication system, and, therefore, the controls for field location 35 cannot, as previously explained, be transmitted to said location; and that while the said controls are stored by the indication relays, as described above, the operator selects field location 36 to establish control storages to be transmitted to that location.

To select field location 36 the operator need only depress location selection push button 6PB on the control panel as push button 3DPB remains depressed from the previous selection of field location 35. Each group of location selection push buttons on the control panel being interlocked as previously explained, the depressing of push button 6PB returns push button 5PB, previously depressed in the selection of location 35, to its undepressed or normal position. Back contact d of push button 5PB (FIG. 3) is therefore opened, opening the pickup circuit for location selection relay 35LC and that relay releases. The pickup circuit for location selection relay 36LC is closed over back contact d of push button 6PB and relay 36LC picks up.

The release of relay 35LC opens, at its front contact b (FIG. 4a) and its front contact d (FIG. 4b) the stick circuits for relays 1RP and 2LP respectively, and these relays release. The release of relay 35LC also opens at its front contact f (FIG. 4c) the stick circuit for relay STP and that relay releases. The control panel is now available for the operator to establish control storages for field location 36 in a similar manner that the described control storages for location 35 were established.

The release of relay 35LC transfers the stick circuits for relays 35–1NWK and 35–1RWK (FIG. 6a) from the front point of contact h of relay 35LC to the back point of that relay and relays 35–1NWK and 35–1RWK remain picked up. Said contact h of relay 35LC being a make-before-break contact the opening of the stick circuits to said relays, when the contact is transferring from its front contact point to its back contact point, is prevented. Similarly, the release of relay 35LC transfers the stick circuit for relay 35–2LHK (FIG. 7) from the front point of make-before-break contact n of relay 35LC to the back point of said contact and relay 35–2LHK remains picked up. The transfer of these stick circuits also, as is obvious, disconnects the respective relays from the contacts of the function control push button repeater relays, and thereby removes the relays from under the control of the control panel. The controls to be transmitted to field location 35 thus remain stored until the code control communication system is available for transmitting the controls to said location.

It will now be assumed that at the time the operator depresses the start push button STPB as described above, no controls are to be initiated and established for another field station and, therefore, the control panel remains as last described, that is, with push buttons 3DPB and 5PB depressed. Relay 35LC, therefore, remains picked up at this time.

Relay MP shown in FIG. 6b picks up, as previously pointed out, when the M or master relay in the office line coding unit of the Form 514 code control communication system picks up. The M relay is not shown in the drawings but it is sufficient for purposes of this description to state that the M relay picks up when a start relay such as 235ST (FIG. 4c) picks up if the communication system is at rest, that is, available for the transmission of control information. Reference is again made to said Manual No. 514 and sheet 14A of drawing D–

2547 therein for a description of the operation of the code control communication system. Assuming therefore that the communication system is now available, relay 235ST having been picked up as described, relay M and consequently relay MP pick up. Contact b of relay MP in FIG. 4c opens its back contact point, opening the stick circuit to relay STP, which releases after the expiration of its slow release period. However, before front contact b of relay STP opens, the previously described circuit, including front contact f of relay 35LC and the front point of contact b of relay MP, closes momentarily, and since terminal A111 is connected to the cancellation windings or coils UCC and DCC (FIG. 3), these windings become energized momentarily. Push buttons 3DPB and 5PB are therefore actuated to their normal (undepressed) positions opening the pickup circuit for relay 35LC which releases. The control panel is now in its normal condition and available for selecting another field location. The release of relay 35LC releases relays 1RP and 2LP as described previously, and also opens at its front contact f (FIG. 4c) the cancellation circuit just described. Relays 35–1NWK, 35–1RWK, 35–2LHK and 235ST remain picked up as previously described, but the remainder of the apparatus is now in its normal condition.

During the course of the coding action of the code control communication system, station call relay 235S (FIG. 6d) is picked up in a manner described in said Manual No. 514. Make-before-break contact c of relay 235S (FIG. 4c) transfers the stick circuit for relay 235ST from the back contact point of relay 235S to its front contact point and terminal 8A of the office line coding unit. Relay 235ST is maintained picked up by the circuit from terminal 8A until the station selection portion of the communication code is terminated (8th step of the coding action are described in said Manual No. 514), and the internal circuit in the office line coding unit to terminal 8A is interrupted releasing relay 235ST which is thus returned to its normal position.

When station call relay 235S is picked up as set forth above, circuits are completed over front contacts d and e (FIG. 5) of relay 235S to transmit the stored switch and signal controls to field location 35 during the coding action of the code control communication system. The previously described reverse switch control communication circuit includes front contact d of relay 235S, the front point of contact c of relay 35–1RWK, front contact b of relay 35–1NWK, the back point of contact f of relay 35–2USP, and terminal 3A of the office line coding unit. The previously described control communication circuit for clearing signal 35–2LB includes front contact e of relay 235S, back contact h of relay 35–2USP, the front point of contact g of relay 35–2LHK, back contact g of relay 35–2RHK and terminal 5A of the office line coding unit. The similarity between these circuits and the circuits to terminals 3A and 5A shown on the upper right-hand portion of aforesaid drawing D-2547, sheet 14A, is readily apparent. The desired controls are thus transmitted to field location 35, and relays 35–1NRWSR and 35–2LHSR (FIG. 5) are controlled to their reverse positions. The similarity between these relays and relays NRWSR and LHSR shown in the lower right-hand portion of aforesaid drawing D-2547, sheet 15A, is also readily apparent. Station call relay 235S is released at the end of the communication control code (generally the 16th step in said Form 514 code control communication system) and the above-described circuits to terminals 3A and 5A of the office line coding unit are opened.

The stored controls having thus been transmitted to field location 35 it is assumed that a control is established at that location for controlling switch 35–1W to its reverse position and the switch commences said movement or is now in transit. It is also assumed, that after the switch has occupied its reverse position signal 35–2LB clears for the desired train movement. The circuits at location 35 for accomplishing these functions are not shown as they form no part of our present invention, but reference can be made to the aforesaid United States Patent 2,698,425, FIGS. 2d and 2e, and description thereof, for an understanding of the operation of the apparatus controlled by contacts of relays 1WS and 2LHS which are respectively similar to relays 35–1NRWSR and 35–2LHSR shown in FIG. 5 of the present drawings.

When a control is established and during the period that switch 35–1W is in transit, as assumed above, relays 35–1NWCR and 35–1RWCR (FIG. 6a) are both released and the previously mentioned switch indication circuits to terminals 1 and 3 of the field line coding unit are closed. The circuit to terminal 1 includes the back point of contact a of relay 35–1NWCR, back contact a of relay 35–1RWCR, and contact a of relay 35–1NRWSR in its reverse position. The circuit to terminal 3 includes the back point of contact b of relay 35–1RWCR, back contact b of relay 35–1NWCR and contact a of relay 35–1NRWSR in its reverse position. The energized condition of terminals 1 and 3 is transmitted to the control office by the code communication system and is reflected at the control office by the energized condition of both terminals 9A and 11A of the office line coding unit.

Delivery relay 235D (FIG. 6c) is momentarily picked up by the indication code being received in the control office from field location 35 (final step of the indication code as described in Manual No. 514), and the previously described circuits from terminals 9A and 11A (FIG. 6a) are completed over the front points of contacts a and b respectively of relay 235D to relays 35–1NWK and 35–1RWK, respectively. The stick circuits for relays 35–1NWK and 35–1RWK are opened at this time at the back points of contacts a and b respectively of relay 235D, but the indication pickup circuits for said relays being completed over the front points of said contacts, relays 35–1NWK and 35–1RWK, which it will be remembered were both picked up to establish the switch reverse control code, remain picked up. The make-before-break contacts a and b of relay 235D insure that the circuits over the front points of the contacts are closed before the stick circuits over the back points of the contacts are opened. Relay 235D subsequently releases reestablishing the stick circuits for both relays 35–1NWK and 35–1RWK which thus continue to remain picked up. The indication lamp 35–1WRKE in FIG. 1b and FIG. 2 continues to flash, giving the switch-in-transit indication.

When switch 35–1W at field location 35 has completed its movement to its full reverse position, relay 35–1RWCR (FIG. 6a) pick up closing the front point of its contact b and opening its back contact a. The switch indication circuit to terminal 1 of the field line coding unit at location 35 is, therefore, now open at back contact a of relay 35–1RWCR, and the indication circuit to terminal 3 of said unit is transferred from the back point of contact b of relay 35–1RWCR to the front point of said contact. The deenergized and energized condition of terminals 1 and 3, respectively, is now transmitted to the control office by the code communication system and is reflected at the control office by the deenergized and energized condition of terminals 9A and 11A, respectively, of the office line coding unit. When delivery relay 235D is now momentarily picked up, relay 35–1RWK remains picked up as before but relay 35–1NWK is released as terminal 9A is deenergized. Relay 235D subsequently releases, relay 35–1RWK remains picked up, and relay 35–1NWK remains released as its stick circuit is open at its own front contact a.

The release of relay 35–1NWK transfers the energizing circuit for the filament of indication lamp 35–1WRKE (FIG. 2) from the coded battery at the front point of contact g of relay 35–1NWK to terminal B of the battery at the back point of said contact and the lamp is steadily illuminated to indicate that switch 35–1W is occupying its reverse position. It will be remembered that it was previously stated that the track diagram is normally dark. However, from the circuit just described it is apparent that a reverse switch indication lamp remains steadily illuminated as long as its respective switch remains in its reverse position. This condition is not considered as a normal condition and the said lamp is maintained illuminated as a reminder to the operator of the position of the switch. No other changes in the indication lamp circuits take place at this time.

As previously stated, relay 35–2LHSR (FIG. 5) is controlled to its reverse position when the described stored controls are transmitted to field location 35. The movement of the contacts of relay 35–2LHSR to their reverse position deenergizes relay 35–2LASR (FIG. 7). This control circuit for relay 35–2LASR is not shown in the drawings but, this relay is controlled by a contact of relay 35–2LHSR in a manner similar to the control of relay L58ALS by contact 20 of relay L58HS in the previously mentioned Patent 2,580,150 to Earl M. Allen. Relay 35–2LASR is accordingly released. The control of relay 35–2LHSR to its reverse position closes a circuit for supplying energy to terminal 5 of the field line coding unit (FIG. 7). This circuit may be traced from terminal B of the battery over the reverse contact point of contact a of relay 35–2LHSR to terminal 5 of said coding unit. The purposes of this circuit will become apparent in the description to follow.

The control of relay 35–2LHSR to its reverse position and subsequent releasing of relay 35–2LASR completes a circuit for controlling signal 35–2LB to its clear condition. This circuit is not shown in the drawing but such signal control circuits are well known in the art and the circuit may, for example, be similar to the control circuit for signal L58 shown in said FIG. 1b of the above-mentioned Allen patent. The clearing of signal 35–2LB deenergizes relay 35–2LRGPR (FIG. 7) in a manner similar to the deenergization of relay L58RP in FIG. 1b of the Allen patent when signal L58, shown in said FIG. 1b, clears.

Relay 35–2LRGPR acordingly releases and energy is also supplied to terminal 7 (FIG. 7) of the field line coding unit over a circuit extending from terminal B of the battery over back contact a of relay 35–2LRGPR to said terminal 7. The release of relay 35–2LRGPR also initiates a code start for transmission of a signal clear indication code from field location 35 to the control office. Reference is made to the upper right-hand portion of drawing D–2547, sheet 15A, in aforesaid Manual No. 514, for an example of the code starting circuits located at a field location and to the description in said Manual for an understanding of the operation of these circuits.

The code control communication system transmits an indication code and the energized condition of terminals 5 and 7 on the field line coding unit is reflected by the energized condition of terminals 13A and 15A on the office line coding unit. Relay 235D at the control office again momentarily picks up to deliver the indication to the proper relays. Relay 35–2LHK (FIG. 7) which it will be remembered was previously picked up for the transmission of the control for clearing signal 35–2LB, remains picked up when relay 235D picks up as it is then energized over its previously described indication pickup circuit including the front point of contact c of relay 235D and the back point of contact e of relay 35–2RHK. Contact c of relay 235D is a make-before-break contact to insure the continued energization of relay 35–2LHK when the contact transfers from its back contact point to its front contact point.

When relay 235D momentarily picks up, the previously described indication pickup circuit for relay 35–2HK, including the front point of contact e of relay 235D, the back point of contact f of relay 35–2RHK, and the front point of contact f of relay 35–2LHK, is completed and relay 35–2HK picks up and closes its front contact a.

Relay 235D subsequently releases, again closing the stick circuit for relay 35–2LHK over the back point of contact c of relay 235D and the front contact a of relay 35–2LHK, and relay 35–2LHK remains picked up. The release of relay 235D also completes the previously described stick circuit for relay 35–2HK including the back point of contact e of relay 235D, front contacts a and b of relay 35–2HK, and back contact c of relay 35–2RHK, and relay 35–2HK remains picked up. Back contact t of relay 35LC also provides a connection to terminal N for this stick circuit, in multiple with that over front contact b of relay 35–2HK.

The picking up of relay 35–2HK transfers the energizing circuit for the filament of indication lamp 35–2–LBAKE (FIG. 2) from the previously described coded energy at the back point of contact c of relay 35–2HK to positive terminal B of the battery connected to the front point of said front contact c and the indication lamp is steadily illuminated to indicate that signal 2LB is clear.

Assuming that a train accepts signal 2LB and enters track section 35–1T (FIG. 1c), relay 35–1TKSPR (FIG. 5) is released closing its back contact a. A slotting circuit is thus completed for controlling relay 35–2LHSR to its normal position. This circuit extends from terminal B of the battery over the back point of contact a of relay 35–1TKSPR through the lower winding of relay 35–2–RHSR and the lower winding of relay 35–2LHSR to terminal N of the battery. Contact a of relay 35–2LHSR transfers from its reverse contact point to its normal contact point thereby opening the previously described energizing circuit to terminal 5 of the field line coding unit (FIG. 7). Signal 35–2LB is controlled to its stop condition by the train entering track section 35–1T, relay 35–2LRGPR (FIG. 7) picks up reflecting the stop condition of the signal, and relay 35–2LASR picks up. The picking up of relay 35–2LRGPR opens at the back contact a of that relay the previously described energizing circuit to terminal 7 of the field line coding unit. A stop signal indication is now transmitted from the field location to the control office and terminals 13A and 15A (FIG. 7) are deenergized when delivery relay 235D picks up. The stick circuits for relays 35–2LHK and 35–2HK are opened at the back points of contacts c and e, respectively, of relay 235D when that relay momentarily picks up; and terminals 13A and 15A being deenergized at this time, relays 35–2LHK and 35–2HK release. The release of relay 35–2LHK opens at the front point of its contact l (FIG. 2) the previously described energizing circuit for the filament of signal indication lamp 35–2LBAKE and the lamp is extinguished. The signal control and indication circuits and apparatus are now all again in their normal condition.

It will now be assumed that after the clearing of signal 35–2LB and before the signal is accepted by a train, the operator discovers that he has mistakenly cleared an improper signal and, therefore, desires to control signal 35–2LB to stop. The operator again selects field location 35 in the same manner as before and picks up relay 35LC (FIG. 3). Now, referring to FIG. 4b, the operator pulls signal control push button 2LPB, thereby closing the previously described pickup circuit for relay 2NP over contact b of push button 2LPB. Relay 2NP thus picks up and closes its previously described stick circuit including its own front contact a, back contacts b of relays 2RP and 2LP, and front contact d of relay 35LC. Relay 2NP is thus temporarily maintained in its picked-up position. The operator now depresses starting push button STPB to initiate a start for the transmission of the control for operating signal 35–2LB to its stop condition. Relays STP and 235ST (FIG. 4c) operate in the same manner as previously described when the signal clear control was to be transmitted.

Referring now to FIG. 7, the pickup of relay 2NP closes at its front contact c the previously described control pickup circuit for relay 35–2RHK, which picks up and establishes its previously described stick circuit including its own front contact a and the front point of contact s of relay 35LC. The pickup of relay 35–2RHK opens at its back contact c the stick circuit for relay 35–2HK which releases. Both relays 35–2LHK and 35–2RHK are now picked up and maintained picked up by their stick circuits, and relay 35–2HK is released.

In FIG. 2, the energizing circuit for the filament of signal indication lamp 35–2LBAKE is opened at back contact k of relay 35–2RHK and that lamp is extinguished. However, circuits for intermittently energizing the filament of lamps 35–2RBKE and 35–2LBBKE are closed at front contacts m of relays 35–2LHK and 35–2RHK. This circuit for the filament of lamp 35–2RBKE extends from coded battery CB over the front contacts m of relays 35–2LHK and 35–2RHK in series, the back point of contact c of relay 35–2USP, and through the filament of lamp 35–2RBKE to terminal N of the battery. The circuit for intermittently energizing the filament of lamp 35–2LBBKE extends from coded battery CB over the front contacts m of relays 35–2LHK and 35–2RHK in series, the back point of contact c of relay 35–2USP, the front point of contact e of relay 35–1RWK, and through the filament of lamp 35–2LBBKE to terminal N of the battery. Lamps 35–2RBKE and 35–2LBBKE are thus now flashing to give an indication that a signal clear control formerly established has been manually cancelled, and that a control for controlling said signal to stop has been established and that the signal is "in time."

Referring now to FIG. 5, the previously described circuit, including back contact g of relay 35–2RHK, for supplying energy to terminal 5A of the office line coding unit, is now open at said back contact g. When relay 235S picks up as previously described, no energy will be supplied to terminal 5A and the code control communication system will, therefore, operate to control relay 35–2LHSR to its normal position. The movement of contact a (FIG. 7) of relay 35–2LHSR from its reverse contact point momentarily removes energy from terminal 5 of the field line coding unit, but the closing of the normal contact point of contact a and the normal contact b of relay 35–2LHSR immediately closes a circuit for again supplying energy to said terminal 5. This circuit extends from terminal B of the battery over normal contact b of relay 35–2RHSR, normal contact b of relay 35–2LHSR, back contact a of relay 35–2LASR which remains released until the aforementioned delay period has expired, and over the normal contact point of contact a of relay 35–2LHSR to said terminal 5. The controlling of relay 35–2LHSR to its normal position as described above controls signal 35–2LB to its stop condition and relay 35–2LRGPR (FIG. 7) picks up. The picking up of relay 35–2LRGPR opens at back contact a of that relay the previously described energizing circuit to terminal 7 of the field line coding unit. However, the above-described energizing circuit for terminal 5 including back contact a of a relay 35–2LASR also extends over the normal contact point of contact a of relay 35–2RHSR to said terminal 7 and that terminal is retained energized.

A code start for initiating the transmission of an indication code from field location 35 to the control office is established when relay 35–2LRGPR picks up as described, and, after transmission of said code, terminals 13A and 15A of the office line coding unit are energized to reflect the energized condition of said terminals 5 and 7. When relay 235D in the control office picks up, the previously described energizing circuit, for relay 35–2LHK, including the front points of contacts e of relays 35–2LHK and 35–2RHK, and terminal 13A, is closed and relay 35–2LHK remains picked up. Similarly, when relay 235D picks up, the previously described energizing circuit for relay 35–2RHK, including the front points of contacts f of relays 35–2RHK and 35–2LHK, and terminal 15A, is closed and relay 35–2RHK remains picked up. Relay 235D subsequently releases reestablishing the stick circuits for relays 35–2LHK and 35–2RHK, including their own front contacts a, and the relays remain picked up. Contacts c and d of relay 235D being make-before-break contacts, continuity of the supply of energy to the windings of relays 35–2LHK and 35–2RHK is insured during the transfer of said contacts from their back to their front contact points or from their front to their back contact points.

Relays 35–2LHK and 35–2RHK remaining picked up, as described above, no change in the energizing circuits for the filaments of lamps 35–2RBKE and 35–2LBBKE occurs and the lamps continue to flash to give an "in time" indication.

When the delay time at field location 35 has expired, relay 35–2LASR (FIG. 7) is picked up opening at its back contact a the previously described energizing circuit for terminals 5 and 7 on the field line coding unit and the terminals are deenergized. The picking up of relay 35–2LASR also initiates a code start at the field location and an indication code is transmitted to the office. Terminals 13A and 15A on the office line coding unit reflect the deenergized condition of said terminals 5 and 7 and, when relay 235D momentarily picks up as before, relays 35–2LHK and 35–2RHK are released opening their front contacts a. When relay 35–2LHK and 35–2RHK are thus open and the relays remain released.

The previously described energizing circuits for the filaments of lamps 35–2RBKE and 35–2LBKE are opened when relays 35–2RHK and 35–2LHK release and the track diagram is now dark except for the continued illumination of reverse switch indication lamp 35–1WRKE as previously described.

It is believed expedient at this time to set forth the purpose of back contacts d (FIG. 7) of relays 2LP and 2RP in the previously described circuit from the winding of relay 35–2HK over said contacts to terminal N of the battery. It will be assumed that, as described above, signal 35–2LB has been manually cancelled and relays 35–2LHK and 35–2RHK are picked up indicating the "in time" condition of the signals 35–2L and 35–2R. It will be further assumed that the operator again selects field location 35 on the control panel and establishes a control for reclearing signal 35–2LB by depressing push button 2LPB (FIG. 4b). Relay 2LP is thus picked up in the manner previously described. The picking up of relay 2LP opens at the back point of its contact c (FIG. 7) the stick circuit for relay 35–2RHK including the front point of contact s of relay 35LC which picked up on the selection of field location 35. Relay 35–2RHK thus releases closing at its back contact c (FIG. 7) the pickup circuit for relay 35–2HK. If at this time, due to some change taking place at field location 35, an indication code is transmitted from that location to the office, terminals 13A and 15A on the office line coding unit are energized because signal 35–2LB at location 35 is still "in time." Therefore when delivery relay 235D momentarily picks up closing the front point of its contact e (FIG. 7), the pickup circuit from terminal 15A over the front point of contact f of relay 35–2LHK and the back point of contact f of relay 35–2RHK to the winding of relay 35–2HK is closed. However, relay 35–2HK cannot pick up as its pickup circuit is open at back contact d of relay 2LP as previously pointed out. Thus back contact d of relay 2LP prevents the picking up of relay 35–2HK and consequently the closing of the signal clear indication circuit over the front point of contact c (FIG. 2) to the filament of lamp 35–2LBAKE. Signal 35–2LB at field location 35 being "in time" it is obvious that said signal clear indication should not be given at this time. It is also believed obvious that back contact *d* of relay 2RP (FIG. 7) operates in a similar manner to prevent an improper signal clear indication if a control is initiated for clearing signal 35–2R when the signals are "in time."

It will now be assumed that, after the operator has cancelled signal 35–2LB as previously described, it is desired to control switch 35–1W to its normal position. The operator again selects field location 35 on the control panel in the manner previously described and location relay 35LC is picked up. The operator now depresses push button 1NPB (FIG. 4a) closing the previously described pickup circuit for relay 1NP including front contact *a* of relay 35LC and the front point of contact *b* of relay 35–1RWK. Relay 1NP thus picks up and establishes its previously described stick circuit including its own front contacts *a* and *b* and front contact *b* of relay 35LC.

The picking up of relay 1NP opens at its back contact *d* (FIG. 6a) the previously described stick circuit for relay 35–1RWK including its own front contact *a* and the front point of contact *h* of relay 35LC. Relay 35–1RWK releases and the previously described circuit for energizing the filament of reverse switch indication lamp 35–1WRKE (FIG. 2) is opened at front contact *g* of relay 35–1RWK and that lamp is extinguished. Relay 35–1NWK being already released a circuit is completed for intermittently energizing the filament of normal switch indication lamp 35–1WNKE. This circuit extends from coded battery CB, over the back point of contact *f* of relay 35–1NWK, back contact *f* of relay 35–1RWK and through the filament of the lamp to terminal N of the battery. Lamp 35–1WNKE commences to flash to give a "switch-in-transit" indication to the normal position of the switch. (The switch is not actually in transit at this time but the storage of the normal switch control is considered the equivalent of the switch being in transit.)

The release of relay 35–1RWK prepares at the back point of its contact *c* (FIG. 5) the previously described circuit to terminal 1A of the office line coding unit. The operator now depresses the starting push button STPB and relays STP and 235ST (FIG. 4c) operate in the identical manner previously described to initiate the transmission of the established control to field location 35 (field station 235). When relay 235S (FIG. 6d) picks up as previously set forth the circuit to terminal 1A of the office line coding unit is completed over front contact *d* of relay 235S (FIG. 5).

Relay 35–1NRWSR (FIG. 5) is controlled to its normal position during the course of the coding action of the code control communication system. (Reference is again made to aforementioned Manual No. 514 for an understanding of the operation of said system.) A circuit is now closed over a normal contact of relay 35–1NRWSR at location 35 for directing switch 35–1W to its normal position and the switch is assumed to now be in transit from its reverse to its normal position. (Reference is again made to aforesaid Miller Patent 2,698,425, FIGS. 2d and 2e, for an understanding of the controls for thus directing a switch to its normal position.) The movement of switch control relay 35–1NRWSR from its reverse position releases relay 35–1RWCR (FIG. 6a) and opens at front contact *b* of the relay the circuit for supplying energy to terminal 3 of the field line coding unit. The circuit to terminal 1 of said unit is now open at contact *a* of relay 35–1NRWSR, as is the circuit over the back point of contact *b* of relay 35–1RWCR to terminal 3 of the unit.

An indication code is initiated at field location 35 by the release of relay 35–1RWCR and the deenergized condition of said terminals 1 and 3 is reflected at the control office by the deenergized condition of terminals 9A and 11A on the office line coding unit. Relay 235D at the control office is momentarily picked up during the transmission of the indication code but, terminals 9A and 11A being deenergized, relays 35–1NWK and 35–1RWK remain released. The indication lamp circuits in FIG. 2 thus undergo no change and a "switch-in-transit" to the normal position indication continues.

When switch 35–1W completes its movement and occupies its normal position, relay 35–1NWCR (FIG. 6a) picks up and supplies energy to terminal 1 of the field line coding unit over the previously described circuit including the front point of contact *a* of said relay. The picking up of relay 35–1NWCR initiates another indication code and the energized condition of terminal 1 is reflected by the energized condition of terminal 9A on the office line coding unit. When relay 235D now picks up during the transmission of the indication code, the previously described indication pickup circuit for relay 35–1NWK is completed over the front point of contact *a* of relay 235D to terminal 9A. Relay 35–1NWK thus picks up and, when relay 235D subsequently releases, relay 35–1NWK is maintained picked up over its previously described stick circuit including its own front contact *a* and the back point of contact *h* of relay 35LC.

The picking up of relay 35–1NWK opens at the back point of its contact *f* (FIG. 2) the previously described energizing circuit to the filament of indication lamp 35–1WNKE and the lamp is extinguished. The track diagram shown in FIGS. 1a through 1d is now dark and all apparatus is again in its normal condition.

It should be pointed out at this time that the pickup circuits for relays 35–1NWK and 35–1RWK including front contacts *d* and *e*, respectively, of relay 1RP, and the releasing circuits for these relays over back contact *d* of relay 1NP (FIG. 6a) also operate as holding circuits to prevent, under some conditions, the destroying of command or control storages stored by said relays. (This discussion also similarly applies to the similar circuits for relays 36–1NWK and 36–1RWK, shown in FIG. 6a.) For an example, it will be assumed that location 35 has been selected in the manner previously described, switch control push button 1RPB has been actuated to initiate the storage of a reverse switch control for switch 1W at location 35, and, therefore, relays 35–1NWK and 35–1RWK are both picked up to complete the switch command or control storage. It will further be assumed that, at this time, switch 1W at location 35 is in some manner moved from its full normal indication position, such as may happen due to vibration or bad adjustment, etc. The movement of the switch from its normal indication position will release normal switch indication relay 35–1NWCR at said field location (FIG. 6a), thereby initiating the transmission of a switch-in-transit indication of the switch from its normal to its reverse position. Terminals 9A and 11A on the office line coding unit are not energized during the transmission of the indication code and, therefore, when delivery relay 235D at the control office momentarily picks up and contacts *a* and *b* of that relay open the stick circuits for relays 35–1NWK and 35–1RWK respectively, no energy is supplied to the windings of these relays from terminals 9A and 11A. However, these relays are prevented from releasing, and thereby destroying the switch control storage for controlling switch 1W to its reverse position, by the holding circuits for the relays including said front contacts *d* and *e* of relay 1RP and contacts *g* and *k* of relay 35LC.

Similar operation to that described above is performed to assure the release of both said indication relays 35–1NWK and 35–1RWK when both relays have been released to store a normal switch control storage for switch 1W and an indication code is received thereafter from field location 35. Such indication code may cause the energization of one or both terminals 9A and 11A of the office line coding units thereby picking up one or both of the indication relays 35–1NWK and 35–1RWK and destroying the normal switch indication storage. However, back contact *d* of relay 1NP in the stick circuits for said indication relays assures the release of the relays and the continued storage by the relays of the normal switch control storage.

It is believed apparent in view of the above discussion that the push button repeater relays 1NP and 1RP are employed for establishing switch control storages for first switches at a selected location (assume switch 1W at location 35) and for maintaining the established storages until the location selection relay at the selected location has released. After the release of the location selection relay upon the initiation of a control code no indication codes can be transmitted until the completion of that control code as the communication system is unavailable for the transmission of indication codes. Therefore, at this time, no indication code will be received at the control location from field location 35 to pick up delivery relay 235D and destroy a switch control storage. After the completion of the transmission of the control codes the indication codes will be transmitted and received and the switch control storage will be destroyed. However, this is the proper operation of the system because the switch control has already been transmitted and the storage of said control should thus be terminated.

The manipulations by the operator and the consequential operation of the circuits and apparatus in clearing signal 35–2R over switch 35–1W in its normal or reverse positions, or in clearing signal 35–2LA over switch 35–1W in its normal position, are similar to that described above for controlling switch 35–1W and signal 35–2LB and no description thereof is considered necessary. Similarly, the manual establishment of controls and operation of the circuits and apparatus in controlling the signals and switch shown at field location 36 is believed readily understood, in view of the above description, and no detailed description is deemed necessary for an understanding thereof.

Having thus described the operation, under manual control, of the centralized traffic control system with which we have chosen to illustrate the apparatus of our invention, we shall now describe the operation of such system under the automatic control provided by such apparatus.

Referring first to FIG. 12, it will be helpful for an understanding of the operation of the apparatus of our invention to outline in general terms the manner in which routes for train meets and passing train movements are automatically set up. Each of the lines A through E in FIG. 12 respresents the same stretch of railway track, including ends of passing siding areas 32 through 39 which correspond to the ends of sidings also shown in FIGS. 1a through 1d. In each of the lines A through E are shown two trains each represented by a rectangular geometric figure pointed at one end to show the direction of travel of the respective train. The trains are shown as traveling in opposite directions over the track stretch and, progressively in lines A through E, are shown in different stages of approaching and finally passing each other. Each signal at each end of siding is shown by an unshaded circle when it is displaying its stop aspect and by a shaded circle when it is displaying a proceed aspect. The arrange will be readily apparent from a brief glance at the drawing.

Line A of FIG. 12 shows an eastbound train on the main track within the siding area between the end of siding location 32 and the end of siding to the west thereof, and a westbound train on the main track within the siding area between the end of siding location 39 and the end of siding to the east thereof. With the trains at such locations the meeting point or siding area has not yet been determined and only the eastbound and westbound end-of-siding main track leaving signals at locations 32 and 39, respectively, display proceed aspects.

In line B of FIG. 12 it is assumed that both trains have passed their respective main track leaving signals at locations 32 and 39. Under these conditions the main track entering signals at locations 33 and 38, and the main track leaving signals at locations 34 and 37 are controlled to display proceeds aspects, and siding area 35–36 has, therefore, been selected as the meeting point or the passing siding area for the passing train movement of the two trains. If the eastbound train did not pass the main track leaving signal at location 32 until after the westbound train passed the main track leaving signal at location 37, then siding area 33–34 would have been selected as the meeting and passing point for the two trains. Similarly, if the westbound train did not pass the main track leaving signal at location 39 until after the eastbound train passed the main track leaving signal at location 34, then siding area 37–38 would have been selected as the meeting and passing point for the two trains.

In line C of FIG. 12 it is assumed that the westbound train passes the main track leaving signal at location 37 before the eastbound train passes the main track leaving signal at location 34. Under these conditions the switch at location 36 is controlled to its reverse position and the entering signal at location 36 governing the route into the siding track in passing siding area 35–36 is controlled to display a proceed aspect. Under these conditions when the eastbound train passes the main track leaving signal at location 34, the entering signal at location 35, governing the route into the main track of siding area 35–36, will be controlled to display a proceed aspect. If, however, the eastbound train passed the main track leaving signal at location 34 before the westbound train passed the main track leaving signal at location 37, the switch at location 35 would have been controlled to its reverse position and the entering signal at location 35, governing the route into the siding track in passing siding area 35–36, would have been controlled to display a proceed aspect. Under these conditions the subsequent passing of the main track leaving signal at location 37 by the westbound train would have controlled the entering signal at location 36, governing the route into the main track of siding area 35–36, to display a proceed aspect.

Line D of FIG. 12 shows the westbound train within the siding track of passing siding area 35–36 and the eastbound train approaching location 35. When the rear end of the westbound train passed the siding track leaving signal at location 36, the switch at that end became unlocked and was controlled to its normal position. Thereafter, the main track leaving signal at location 36 was controlled to display a proceed aspect when the eastbound train passed the main track leaving signal at location 34. If the eastbound train passed the main track leaving signal at location 34 before the rear end of the westbound train passed the siding track leaving signal at location 36, the proceed aspect displayed by the main track entering signal at location 35 would have been an approach aspect. If, however, the eastbound train passed the main track leaving signal at location 34 subsequent to the passage of the rear end of the westbound train past the siding track leaving signal at location 36, as shown in line D, the proceed aspect displayed by the main track entering signal at location 35 is a clear aspect since the main track leaving signal at location 36 is controlled to display a proceed aspect at this time. It will readily be understood that the meet would have been made in a similar but opposite manner if the eastbound train had entered the siding track within passing siding area 35–36 and the westbound train had been routed to the main track within such area.

Line E shows the completion of the meet. When the rear end of the eastbound train passes the main track leaving signal at location 35, the switch at that location is controlled to its reverse position and the leaving signal for the siding track at location 35 is controlled to display a proceed aspect. The westbound train can then proceed and when it passes the siding track leaving signal at location 35, the main track entering signal at location 34 and the main track leaving signal at location 33 will be controlled to display proceed aspects. When the eastbound train passes the main track leaving signal at location 36, the main track entering signal at location 37 and the main track leaving signal at location 38 are controlled to display proceed aspects. The switch at location 35 will be controlled to its normal position when the rear end of the westbound train passes the entering signal at location 35.

Having thus described in general terms the manner in which the apparatus of our invention operates to automatically provide for train meets and passing train movements, we shall now point out in detail several operational examples of the apparatus itself.

Referring to field location 35 (FIG. 1b), it is assumed that the operator selects such location on the control panel and energizes relay 35LC (FIG. 3) in the manner previously described. The operator further depresses push button USPB (FIG. 4d) and relay 35–2USP (FIG. 4d) becomes picked-up over its previously described circuit including contact a of push button USPB and front contact u of relay 35LC. Having thus become picked-up, relay 35–2USP completes its stick circuit including contact b of push button USPB and the front point of contact v of relay 35LC. The operator may now release relay 35LC and select another location if he so desires. When relay 35LC releases, the second stick circuit for relay 35–2USP is closed over the back point of contact v of relay 35LC. Relay 35–2USP is thus maintained picked-up until location 35 is again selected, again causing relay 35LC to become picked-up, and push button USPB is pulled to open contact b of the push button. It is readily apparent that relay 36–2USP (FIG. 4d) for location 36 (as well as similar relays for other locations and not shown in the drawings) is controlled in a manner similar to relay 35–2USP and no operational description will be given for the control of relay 36–2USP.

When relay 35–2USP becomes picked-up as described above, contacts f and g of the relay (FIG. 5) transfer the control circuits for switch control relay 35–1NRWSR from the manual control circuits to the automatic control circuits including contacts b of relays 35–2LBR and 35–2RBR, and relay 35–1NRWSR is removed from possibility of manual control while relay 35–2USP remains picked-up. Similarly, back contact h of relay 35–2USP (FIG. 5) opens the manual control circuits for signal control relays 35–2LHSR and 35–2RHSR and these control relays are also removed from possibility of manual control while relay 35–2USP remains picked-up.

Referring to FIG. 6a, back contacts k and l of relay 35–2USP open the control pickup circuits for switch indication relays 35–1NWK and 35–1RWK, respectively, and preclude any manual storage of switch controls in such relays. Similarly back contacts d and e of relay 35–2USP (FIG. 7) open the control pickup circuits for signal indication relays 35–2LHK and 35–2RHK, respectively, and preclude any manual storage of signal controls in such relays.

Contacts f, g and h, of relay 36–2USP (FIG. 5), contacts k and l of relay 36–2USP (FIG. 6a) and contacts d and e of relay 36–2USP (FIG. 8) transfer or open, when that relay becomes picked up, the manual control and the control storage circuits for location 36, in a manner similar to that described above for location 35, and no further description thereof is believed necessary.

It should be pointed out also that contacts b and c of each of the relays 35–2USP and 36–2USP (FIG. 2) transfer certain of the indication circuits from coded battery energy CB to steady battery energy B when each respective relay becomes picked up as outlined above. These indication circuits will be further covered hereinafter in this description.

The picking up of relay 35–2USP, as described above, prepares at front contact o of that relay (FIG. 10d) the pickup circuit for relay 35–2RAR. This pickup circuit includes a front contact c of relay 34–2RGKS which it will be assumed, for the purpose of this part of the description, to be picked up by the operator manually clearing signal 34–2RA or 34–2RB at location 34 (FIG. 1b). Relay 34–2RGKS is controlled in a manner similar to relay 36–2RGKS which will be discussed hereinafter.

Assuming that an eastbound train accepts the cleared signal (34–2RA or 34–2RB) at location 34, when the train enters track section 34–1T at that location, relay 34–1TK and consequently relay 34–35BKA (FIG. 9c) become picked up. The picking up of relay 34–35BKA completes at front contact b of that relay (FIG. 10d) the pickup circuit for relay 35–2RAR, and that relay also becomes picked up and closes its stick circuit including its own front contact a, back contact e of relay 35–36MBK and front contact o of relay 35–2USP.

Relay 35–2RAR becoming picked up opens at the back point of contact d of that relay (FIG. 10b) the pickup circuit for slow release relay 35–2P, and also closes at the front point of contact d of relay 35–2RAR the previously described pickup circuit for relay 235ST (FIG. 4c). This pickup circuit remains closed until the slow release period of relay 35–2P expires when that relay opens its front contact a (FIG. 10b) and interrupts the pickup circuit for relay 235ST. However, when relay 235ST becomes picked up it completes its stick circuit including its own front contact a and the back point of contact c of field station 235 call relay 235S. The energization of relay 235ST initiates the transmission of a control code over the code communication system as previously described.

During the course of the coding action of the code control communication system, station call relay 235S (FIG. 6d) becomes picked up in the manner previously pointed out. Make-before-break contact c of relay 235S (FIG. 4c) transfers the stick circuit for relay 235ST from the back contact point of relay 235S to its front contact point and terminal 8A of the office line coding unit. Relay 235ST is maintained picked-up by the circuit from terminal 8A until the station selection part of the communication code is terminated, as previously outlined.

When station call relay 235S is picked up, a circuit is completed over front contact e of relay 235S (FIG. 5) to transmit to field location 35 during the coding action of the code control communication system a signal control for clearing signal 35–2RA at location 35 (FIG. 1b). This circuit includes front contact e (FIG. 5) of relay 235S, front contact b of relay 35–2RAR and terminal 7A of the office line coding unit. The desired control is thus transmitted to field location 35 and relay 35–2RHSR (FIG. 5) is controlled to its reverse position. Station call relay 235S is released at the end of the communication control code and the circuit to terminal 7A of the office line coding unit is opened.

Signal 35–2RA at location 35 becomes cleared in a manner similar to that previously described under manual operation for signal 35–2LB, and relay 35–2RHK (FIG. 7) subsequently becomes picked up to indicate at the control office the cleared condition of signal 35–2RA. Referring to FIG. 2 it will be seen that when relay 35–2USP became picked up, as previously discussed, an energizing circuit for indication lamps 35–2RBKE and 35–2LABKE was closed at the front point of contact c of relay 35–2USP, and these lamps thus became steadily illuminated to indicate automatic control of these signals, i.e., location 35. When relay 35–2RHK picks up as pointed out above an energizing circuit for indication lamp 35–2RAKE is also closed. This circuit extends from terminal B of the battery over the front point of contact b of relay 35–2USP, the back point of contact l of relay 35–2LHK and front contact l of relay 35–2RHK. Indication lamp 35–2RAKE is thus energized at this time to indicate the cleared condition of signal 35–2RA.

When the previously mentioned train accepts signal 35–2RA and enters the main track in siding area 35–36, relay 35–36MBR (FIG. 9a) is released and closes over back contact a of that relay an indication circuit to terminal 4 of the coding unit at field location 35. At the same time a start for the code communication system is initiated and when relay 235D at the control office becomes energized relay 35–36MBK (FIG. 9a) becomes picked up over the front point of contact g of relay 235D to indicate the occupied condition of the main track in the siding area 35–36.

In FIG. 10d, when relay 35–36MBK becomes picked up, it opens at its back contacts d and e the previously discussed pickup and stick circuits for relay 35–2RAR and that relay releases. It will be noted that front contact b of relay 34–35BKA in the pickup circuit for relay 35–2RAR will become open when the rear end of the train vacates track section 35–1T at location 35 and, therefore, when the train vacates the main track in passing siding area 35–36, as hereinafter described, and relay 35–36MBK is consequently released, relay 35–2RAR will remain released since its pickup circuit is then open at front contact b of relay 34–35BKA. (It is also open at front contact c of relay 34–2RGKS at this time as will become apparent hereinafter.)

Returning to the time when relay 35–2RAR becomes energized as described above, the picking up of relay 35–2RAR closes at front contact g (FIG. 10e) of that relay the pickup circuit for relay 35–2RAS including front contact p of relay 35–2USP. when the train accepts signal 35–2RA and enters the main track of siding area 35–36, relay 35–36MBK becomes picked up, as discussed above, and completes the stick circuit for relay 35–2RAS. Relay 35–2RAS will thus remain picked up so long as the train occupies the main track in the siding area 35–36.

Assuming now that the operator also energized relay 36–2USP to place location 36 under automatic control, when relay 35–2RAS becomes picked up, a circuit is completed for picking up relay 36–2RAR (FIG. 11a), further assuming for the moment that there is no opposing train. This circuit includes front contact m of relay 36–2USP and front contact b of relay 35–2RAS. Thus relay 36–2RAR becomes picked up, when the previously mentioned eastbound train enters the track section between locations 34 and 35 and relay 34–35BKA and consequently relay 35–2RAS become picked up. The picking up of relay 36–2RAR closes at front contact e (FIG. 11c) of that relay the previously described pickup circuit for relay 36–2RGKS and that relay also becomes picked up.

When relay 36–2RAR becomes picked up, a circuit is prepared, at front contact b (FIG. 5) of relay 36–2RAR, for transmitting a control code to location 36 for actuating relay 36–2RHSR to its reverse position and thereby clearing signal 36–2RA. The picking up of relay 36–2RAR also transfers contact d (FIG. 11b) from its back contact point to its front contact point and start relay 236ST (FIG. 4c) is energized to store a code start for location 36. The circuit for energizing relay 236ST at this time has been previously discussed, and is similar to that described above for relay 235ST and no further detailed description thereof is believed necessary.

When the code communication system is actuated to transmit a control code to location 36, relay 236S completes at its front contact e (FIG. 5) the above-mentioned circuit including front contact b of relay 36–2RAR and extending to terminal 7A of the office line coding unit, and relay 36–2RHSR at location 36 is thereby actuated to clear signal 36–2RA.

When the eastbound train accepts signal 36–2RA and enters track section 36–1T, indication relay 36–1TK (FIG. 9b) becomes energized upon receipt of an indication code from location 36 and relay 36–37BKA (FIG. 9d) is consequently energized over front contact b of relay 36–1TK. The picking up of relay 36–37BKA closes at front contact c of that relay (FIG. 11c) the stick circuit for relay 36–2RGKS and that relay is thereby maintained picked up until the rear end of the eastbound train passes end-of-siding leaving signal 37–2LA or 37–2LB at location 37 (FIG. 1c). Relay 36–2RGKS (as well as relay 35–2LGKS in FIG. 10c) is a direction stick relay used to maintain the direction of traffic in the single track sections between locations 36 and 37, and 34 and 35, respectively, and these relays will be further discussed hereinafter.

Referring to the indication lamp circuits in FIG. 2, it will be noted that when relay 36–2USP became picked up to transfer location 36 to automatic control, indication lamps 36–2LBKE and 36–2RABKE become steadily energized. When an indication is received at the control office from location 36 that signal 36–2RA has cleared and relay 36–2RHK therefore becomes picked up, indication lamp 36–2RAAKE also becomes steadily energized. It should be pointed out that contacts b and c of relays 35–2USP and 36–2USP are employed in the indication lamp circuits merely to provide the control machine operator or operators, when each location is under automatic control, with indications that are different than when such location is under manual control, and that in actual practice other combinations of indication lamps may be energized for each location to distinguish between the time when such location is under manual control and the time when such location is under automatic control.

It should also be pointed out that when a train occupies the section of single track between locations 34 and 35, track section 35–1T, or the main track section within the siding area 35–36 (FIGS. 1b and 1c); indication lamps 34–35BKE, 35–1TKE or 35–36MBKE (FIG. 2) are energized over obvious circuits including front contacts c of relays 34–35BKE, 35–1TK and 35–36MBK, respectively, to indicate to the control panel operator, when on duty, the occupancy of the respective track sections. Similarly, when a train occupies the section of single track between locations 36 and 37, track section 36–1T, or the siding track section within the siding area 35–36 (FIGS. 1b and 1c); indication lamps 36–37BKE, 36–1TKE and 35–36SBKE (FIG. 2) are energized over obvious circuits including front contacts c of relays 36–37BK, 36–1TK and 35–36SBK, respectively, to indicate to the control panel operator, when on duty, the occupancy of the respective track sections.

Returning again to FIG. 10d and the time when the eastbound train accepts the cleared signal 34–2RA or 34–2RB at location 34 and consequently causes relay 34–35BKA to become picked up, it will be noted that relay 35–2RBR becomes picked up at that time, rather than 35–2RAR, if relay 37–2LGKS is released and relay 36–2LAS is picked up; or if relay 37–2LGKS is picked up, relay 36–37BKA is picked up, and relay 36–2LAS is picked up; or if relay 37–2LGKS is picked up, relay 36–37BKA is released, and relay 36–2LBS is released. The circuits over contacts of these relays to the winding of relay 35–2RBR have been previously discussed. Summarizing, relay 35–2RBR becomes picked up, in place of relay 35–2RAR, when, upon the eastbound train's entrance into track section 34–1T (FIG. 1b) one of the following conditions exists:

(1) Neither of the westbound leaving signals (37–2LA or 37–2LB) at location 37 is cleared or, if one of such signals had been cleared and accepted by a westbound train, the train has entered the main track within siding area 35–36 under automatic clearing of signal 36–2LA at location 36 and the rear end of the westbound train has vacated track section 36–1T at location 36 (relay 37–2LGKS released under either condition and relay 36–2LAS picked up).

(2) One of the westbound leaving signals (37–2LA or 37–2LB) at location 37 has been manually or automatically cleared (relay 37–2LGKS picked up) for a westbound train, such train has not accepted the cleared signal (relay 36–37BKA released) and there is no previous train in the siding track of siding area 35–36 (relays 36–2LBS and 35–36SBK released).

(3) One of the westbound leaving signals (37–2LA or 37–2LB) at location 36 has been manually or automatically cleared (relay 37–2LGKS picked up) for a westbound train, such train has accepted the cleared signal (relay 36–37BKA picked up) and the entering signal (36–2LA) at location 36, governing the entrance into the main track of siding area 35–36 has been automatically cleared (relay 36–2LAS picked up).

The picking up of relay 35–2RBR closes over the front contact g (FIG. 10e) of that relay the pickup circuit for relay 35–2RBS. The picking up of relay 35–2RBS prepares at front contact b (FIG. 11a) of that relay the pickup circuit for relay 36–2RBR. When relay 37–2LGKS releases, upon the rear end of the above-mentioned westbound train vacating track section 36–1T (FIG. 1c) and consequently releasing relay 36–37BKA, the pickup circuit for relay 36–2RBR is completed at back contact d (FIG. 11a) of relay 37–2LGKS and relay 36–2RBR becomes picked up.

In view of the previous description of the manner in which the picking up of relay 35–2RAR actuated relay 235ST (FIGS. 10b and 4c) to initiate the transmission of a control code to location 35, by further reference to FIG. 10b and to FIG. 11b, it is believed that the manner in which the picking up of any of the relays 35–2LAR, 35–2LBR, 35–2RBR, 36–2RAR, 36–2RBR, 36–2LAR and 36–2LBR energizes relay 235ST or 236ST to initiate the transmission of a control code to the respectively associated location 35 or 36 will be readily apparent. Therefore, for the purpose of simplification of the specification, the initiation of such control codes will not be discussed hereinafter in this decsription.

Referring to FIG. 5, when relay 35–2RBR becomes picked up, as outlined above, and closes the front point of its contact b, a circuit to terminal 3A of the office line coding unit, including the front point of contact f of relay 35–2USP, is prepared. When relay 235S becomes picked up, as previously set forth, the circuit to terminal 3A is completed and relay 35–1NRWSR at location 35 is subsequently actuated to its reverse position to cause switch 35–1W at location 35 (FIG. 1b) to move to its reverse position. Similarly, front contact c (FIG. 5) of relay 35–2RBR prepares a circuit to terminal 7A of the office line coding unit and, when relay 235S becomes picked up and closes its front contact e, the circuit to such terminal 7A is completed and relay 35–2RHSR at location 35 is actuated to clear signal 35–2RB which governs the route into the siding track of siding area 35–36 over switch 35–1W in its reverse position.

Still referrinng to FIG. 5, when relay 36–2RBR becomes picked up as outlined above and closes the front point of its contact b, a circuit to terminal 3A of the office line coding unit, including the front point of contact f of relay 36–2USP, is prepared. When relay 236S becomes picked up, as previously discussed, the circuit to said terminal 3A is completed over front contact d of relay 236S and relay 36–1NRWSR is subsequently actuated to its reverse position to cause switch 36–1W at location 36 (FIG. 1c) to move to its reverse position. Similarly front contact c (FIG. 5) of relay 36–2RBR prepares a circuit to terminal 7A of the office line coding unit and, when relay 236S becomes picked up and closes its front contact e, the circuit to such terminal 7A is completed and relay 36–2RHSR at location 36 is actuated to clear signal 36–2RB which governs the route out of the siding track of siding area 35–36 over switch 36–1W in its reverse position.

By the foregoing description of the automatic control of the signals and switches at locations 35 and 36 for an eastward train movement, it will be readily understood that the signals and switches at such locations for a westward train movement are controlled in a corresponding but opposite manner and, therefore, no detailed operational description of a westward train movement is considered necessary. The manner in which the switches and signals at each end of other siding locations are controlled will also be understood from the above operational description. However, in order that the apparatus arrangement of our invention will be completely understood and to make the description complete, the following brief additional description is provided.

When switch 35–1W at location 35 is moved to its reverse position as outlined above, relay 35–1RWK (FIG. 6a) is controlled to its reverse position, over the code communication system, in the manner identical to that previously set forth under the description of the manual operation of the control system. Therefore, when contact e (FIG. 2) of relay 35–1RWK transfers from its back contact point to its front contact point, indication lamp 35–2LBBKE (FIGS. 1b and 2) is energized, rather than indication lamp 35–2LABKE as when switch 35–1W remained in its normal position as previously discussed.

Similarly, when switch 36–1W at location 36 is moved to its reverse position, relay 36–1RWK (FIG. 6a) is controlled to its reverse position over the code communication system. Therefore, when contact e (FIG. 2) of relay 36–1RWK transfers from its back contact point to its front contact point, indication lamp 36–2RBBKE (FIGS. 1b and 2) is energized rather than indication lamp 36–2RABKE which would have been energized had switch 36–1W remained in its normal position when under the automatic operation of the control apparatus.

As previously mentioned, relay 35–2LGKS in FIG. 10c is a directional stick relay for maintaining the direction of traffic in the left-hand direction in the single track section between locations 34 and 35. Similarly, relay 36–2RGKS in FIG. 11c is a directional stick relay for maintaining the direction of traffic in the right-hand direction in the single track section between locations 36 and 37. Relay 37–2LGKS, the winding and contact d only of which are shown in FIG. 11a, contact c of which is shown in FIG. 11d, and contact b of which is shown in FIG. 10d is associated with location 37 and corresponds to relay 35–2LGKS (FIG. 10c). Relay 34–2RGKS, the winding and contact d only of which are shown in FIG. 10a, contact c of which is shown in FIG. 10d, and contact b of which is shown in FIG. 11d is associated with location 34 and corresponds to relay 36–2RGKS (FIG. 11c). It will be understood that the location at the west end of each passing siding has associated therewith a relay corresponding to relays 35–2LGKS and 37–2LGKS, as for example relay 39–2LGKS, the winding and contacts b and c only of which are shown in FIG. 11a. It will also be understood that the location at the east end of each passing siding has associated therewith a relay corresponding to relays 34–2RGKS and 36–2RGKS, as for example relay 32–2RGKS, the winding and contacts b and c only of which are shown in FIG. 10a. It is believed that the operation of the LGKS or the RGKS relay associated with each location will be readily apparent from the following description of the operation of relays 35–2LGKS and 36–RGKS.

Relay 35–2LGKS (FIG. 10c) becomes picked up whenever location 35 is under manual control and an indication is received that signal 35–2LA or 35–2LB has cleared (relays 35–2HK and 35–2LHK picked up), whenever location 35 is under automatic control and an indication is received that signal 35–2LA or 35–2LB has cleared (relays 35–2USP and 35–2LHK picked up), or whenever location 35 is under automatic control and relay 35–2LAR or 35–2LBR becomes picked up to clear signal 35–2LA or 35–2LB, respectively. Once so picked up, relay 35–2LGKS is maintained picked up over its stick circuit after a train accepts the cleared signal and until the rear end of such train passes signal 34–2RA or signal 34–2RB at location 34 (relay 34–35BKA picked up).

Back contact b of relay 35–2LGKS in the pickup circuits for relays 35–2RAR and 35–2RBR (FIG. 10d) prevents these latter relays from becoming picked up to initiate a control for clearing signal 35–2RA or 35–2RB when a control has been previously initiated for clearing signal 35–2LA or 35–2LB. Back contact *c* of relay 35–2RAR and back contact *d* of relay 35–2RBR in the pickup circuits for relays 35–2LAR and 35–2LBR (FIG. 10*a*) accomplish a similar purpose, that is, prevent relay 35–2LAR or 35–2LBR from becoming picked up to initiate a control for clearing signal 35–2LA or 35–2LB when a control has been previously initiated for clearing signal 35–2RA or 35–2RB.

Referring to FIG. 10*d*, it will be readily understood that a transfer contact of relay 35–2LGKS is employed in the pickup circuits for relays 33–2RAR and 33–RBR (not shown) in a manner similar to and for the same purpose that contact *b* of relay 37–2LGKS is employed in the pickup circuits for relays 35–2RAR and 35–2RBR. Referring to FIG. 11*a*, it will be understood that a back contact of relay 35–2LGKS is employed in the pickup circuits for relays 34–2RAR and 34–2RBR (not shown) in a manner similar to and for the same purpose that contact *d* of relay 37–2LGKS is employed in the pickup circuits for relays 36–2RAR and 36–2RBR. It will also be understood that a front contact of relay 35–2LGKS is employed in the pickup circuits for relays 34–2LAR and 34–2LBR (not shown) in a manner similar to and for the same purpose that contact *c* of relay 37–2LGKS is employed in the pickup circuits for relays 36–2LAR and 36–2LBR in FIG. 11*d*.

Relay 36–2RGKS (FIG. 11*c*) becomes picked up whenever location 36 is under manual control and an indication is received that signal 36–2RA or 36–2RB has cleared (relays 36–2HK and 36–2RHK picked up), whenever location 36 is under automatic control and an indication is received that signal 36–2RA or 36–2RB has cleared (relays 36–2USP and 36–2RHK picked up), or whenever location 36 is under automatic control and relay 36–2RAR or 36–2RBR becomes picked up to clear signal 36–2RA or 36–2RB, respectively. Once so picked up, relay 36–2RGKS is maintained picked up over its stick circuit after a train accepts the cleared signal and until the rear end of such train passes signal 37–2LA or signal 37–2LB at location 37 (relay 36–37BKA picked up).

Back contact *b* of relay 36–2RGKS in the pickup circuits for relays 36–2LAR and 36–2LBR (FIG. 11*d*) prevents these latter relays from becoming picked up to initiate a control for clearing signal 36–2LA or 36–2LB when a control has previously been initiated for clearing signal 36–2RA or 36–2RB. Back contact *d* of relay 36–2LBR and back contact *c* of relay 36–2LAR in the pickup circuits for relays 36–2RAR and 36–2RBR (FIG. 11*a*) accomplish a similar purpose, that is, prevent relay 36–2RAR or 36–2RBR from becoming picked up to initiate a control for clearing signal 36–2RA or 36–2RB when a control has been previously initiated for clearing signal 36–2LA or 36–2LB.

Referring to FIG. 11*d*, it will be readily understood that a transfer contact of relay 36–2RGKS is employed in the pickup circuits for relays 38–2LAR and 38–2LBR (not shown) in a manner similar to and for the same purpose that contact *b* of relay 34–2RGKS is employed in the pickup circuits for relays 36–2LAR and 36–2LBR. Referring to FIG. 10*a*, it will be understood that a back contact of relay 36–2RGKS is employed in the pickup circuits for relays 37–2LAR and 37–2LBR (not shown) in a manner similar to and for the same purpose that contact *d* of relay 34–2RGKS is employed in the pickup circuits for relays 35–2LAR and 35–2LBR. It will also be understood that a front contact of relay 36–2RGKS is employed in the pickup circuits for relays 37–2RAR and 37–2RBR (not shown) in a manner similar to and for the same purpose that contact *c* of relay 34–2RGKS is employed in the pickup circuits for relays 35–2RAR and 35–2RBR in FIG. 10*d*.

In FIG. 10*a* back contacts *b* and *c* of relays 34–2LBS, 34–2LAS and 32–2RGKS in the pickup circuits for relays 35–2LAR and 35–2LBR prevent relay 35–2LAR or 35–2LBR from becoming picked up for a following train movement westward from location 35, when location 34 is under automatic control and a control has been initiated for clearing signal 32–2RA or 32–2RB at location 32 or such signal is already cleared, or when location 34 is under automatic control and a cleared signal 32–2RA or 32–2RB has been accepted by an eastbound train.

Back contacts *b* of relays 32–2RAS and 33–34SBK (FIG. 10*a*) in the pickup circuits for relays 35–2LAR and 35–2LBR prevent either of these latter relays from becoming picked up for a train movement westward from location 35 when the siding track within passing siding area 33–34 is occupied by a train and a control has been automatically initiated for clearing signal 33–2RA at location 33 for an eastward train movement into the main track of siding area 33–34. Similarly, back contact *b* of relay 33–34MBK and back contact *c* of relay 33–2RBS in the pickup circuits for relays 35–2LAR and 35–2LBR prevent either of these latter relays from becoming picked up for a train movement westward from location 35 when the main track within passing siding area 33–34 is occupied by a train and a control has been automatically initiated for clearing signal 33–2RB at location 33 for an eastward train movement into the siding track of siding area 33–34. Back contacts *b* of relays 33–34MBK and 33–34SBK also prevent relay 35–2LAR or 35–2LBR from becoming picked up for a train movement westward from location 35 when both the siding track and main track within passing siding area 33–34 are occupied by trains.

In FIG. 11*a* back contacts *b* and *c* of relays 37–2RAS, 37–2RBS and 39–2LGKS in the pickup circuits for relays 36–2RAR and 36–2RBR prevent relay 36–2RAR or 36–2RBR from becoming picked up for a following train movement eastward from location 36, when location 37 is under automatic control and a control has been initiated for clearing signal 39–2LA or 39–2LB at location 39 or such signal is already cleared, or when location 37 is under automatic control and a cleared signal 39–2LA or 39–2LB has been accepted by a westbound train.

Back contacts *b* of relays 38–2LAS and 37–38SBK in the pickup circuits for relays 36–2RAR and 36–2RBR prevent either of these latter relays from becoming picked up for a train movement eastward from location 36 when the siding track within the passing siding area 37–38 is occupied by a train and a control has been automatically initiated for clearing signal 38–2LA at location 38 for a westward train movement into the main track of siding area 37–38. Similarly, back contact *b* of relay 37–38MBK and back contact *c* of relay 38–2LBS in the pickup circuits for relays 36–2RAR and 36–2RBR prevent either of these latter relays from becoming picked up for a train movement eastward from location 36 when the main track within passing siding area 37–38 is occupied by a train and a control has been automatically initiated for clearing signal 38–2LB at location 38 for a westward train movement into the siding track of siding area 37–38. Back contacts *b* of relays 37–38MBK and 37–38SBK also prevent relay 36–2RAR or 36–2RBR from becoming picked up for a train movement eastward from location 36 when both the siding track and main track within passing siding area 37–38 are occupied by trains.

By the above discussion of the circuits for relays 35–2LAR and 35–2LBR for signals 35–2LA and 35–2LB, respectively, at location 35, it is believed that the arrangement of the corresponding control circuits, not shown in the drawings but assumed to be provided for the westbound signals at the westward end of each passing siding, will be readily understood. Similarly, by the above discussion of the circuits for relays 36–2RAR and 36–2RBR for signals 36–2RA and 36–2RB, respectively, at location 36, it is believed that the arrangement of the corresponding control circuits, not shown in the drawings but assumed to be provided for the eastbound signals at the eastward end of each passing siding will be readily understood.

From the foregoing description it is apparent that, with the arrangement of apparatus of our invention as shown in the drawings of this application, we have shown means for at times providing for the automatic operation of a centralized traffic control system to set up train meets and passing train movements in the stretch of track provided with such control system.

While we have shown and described only one form of apparatus embodying our invention, it should be understood that ravious changes and modifications may be made therein within the scope of the appended claims without departing from the spirit and scope of our invention.

Having thus described our invention, what we claim is:

1. In a signaling system for a stretch of railway over which trains may travel in either direction and including a main track and a plurality of spaced-apart passing areas each including a passing siding track, each end of each siding track having preselected sections of said main track without the siding area as an approach section to that end of siding; the combination comprising; means, responsive to the occupancy of an approach section by a train approaching a siding area, for initiating a control for alignment of a route into the main track or the siding track within that area according as such train occupies such approach section subsequent or prior to the occupancy of the approach section at the other end of said siding area by another train traveling in the opposite direction from the first-mentioned train; and means, responsive to the occupancy by a train of the main track or siding track within a siding area for initiating a control for alignment of a route out of the leaving end of such area for the direction of travel of the train providing the approach section to such leaving end is unoccupied by another train approaching that siding area.

2. In combination with a stretch of railway track over which trains may travel in either direction and provided with a plurality of spaced-apart passing siding tracks each end of each siding track including a track switch for aligning routes and a group of entering and exit signals for governing train movements over the switch into and out of the siding area defined by the ends of such siding track, means responsive to a train approaching each of said siding areas for initiating controls for aligning a main track or a siding track route into the siding area then approached by such train and for clearing the corresponding entering signal according as such train approaches such siding area subsequent or prior to the approach of another train traveling in the opposite direction, means responsive to another train approaching in the opposite direction the siding area first approached by the first-mentioned train for initiating controls for aligning a main track route into the siding area and for clearing the corresponding entering signal, and means responsive to each train entering each siding area for initiating controls for aligning for the direction of travel of the train the route out of the siding area then occupied by such train and for clearing the corresponding exit signal, providing such train enters such siding area prior to the entrance into the next adjacent siding area of another train traveling in the opposite direction.

3. In a railway signaling system for a stretch of railway track including a plurality of spaced-apart passing siding areas each end of a siding area having a track switch and a group of signals for governing train movements over the switch in a first position into a main track comprising the section of said track stretch within the siding area, over the switch in a second position into a siding track, and over the switch in said first and second positions out of said main and siding tracks, respectively; and said system also including a communication system for transmitting controls and indications between a centralized office and each end of said passing siding areas, and indicating means at said office, responsive to the receipt of indications from said ends of passing siding areas for indicating the positions of trains within said track stretch; the combination comprising; means, controlled by said indicating means when a train occupies a siding track or a main track within a siding area, for transmitting, over said communicating system to the exit end of such siding area for the direction of travel of the train, controls for actuating the track switch at such end of siding area to its said second or first position, respectively, and for clearing the corresponding train governing signal, providing such train occupies said siding track or main track prior to the occupancy of prescribed section of said track stretch in approach to said exit end of the siding area by a train traveling over said track stretch in the opposite direction from the first-mentioned train; means, controlled by said indicating means when a train moving towards an entrance end of siding area occupies a prescribed section of said track stretch in approach to such siding area end, for transmitting, over said communication system to that siding area end, controls for actuating the track switch at that end of siding area to its first position or its second position and for clearing the corresponding train governing signal according as a prescribed section of said track stretch in approach to the opposite end of such siding area is unoccupied or occupied, respectively, by a prior train approaching such opposite end of siding area.

4. In a centralized traffic control system for a stretch of railway track having a plurality of passing siding tracks, said system including communication means for transmitting controls from a central control office to the wayside apparatus and for transmitting indications of the locations of individual trains in said track stretch from the wayside to said central control office; the combination comprising, means at said control office responsive to the successive indications of the approach of a first and a second train toward opposite ends of one of said siding tracks for initiating controls for aligning routes for said first train into said one siding track and said second train into the main track within the siding area, and means at said control office responsive to the initiation of said controls for transmitting such controls over said communication system to the wayside apparatus controlling the alignment of said routes.

5. In a centralized traffic control system for a stretch of railway track over which trains may travel in either direction and which has a plurality of passing areas each including a main track portion and a siding track, said system including communication means for transmitting controls from the central control office to wayside apparatus and indications of the location of trains in the stretch from the wayside apparatus to said central office, the combination comprising,
   (a) means at the office responsive to the indication of the approach of a train to a passing area for initiating controls to align a main track or a siding track route into that passing area according as said train approach indications are received subsequent or prior to the reception of indications of the approach to that passing area of another train from the opposing direction,
   (b) other means at the office responsive to the indication of the approach of said other train to said passing area for initiating controls for aligning the route into said passing area other than that route aligned in response to the approach indications of said first-mentioned train,
   (c) start means at said office responsive to the initiation of any of said controls for aligning routes for actuating the transmission of such controls by said communication means to the wayside apparatus controlling the selected routes.

6. In a centralized traffic control system for a stretch of railway track over which trains may travel in either direction and which has a plurality of passing areas each including a main track portion and a siding track, said system including communication means for transmitting controls from the central control office to wayside apparatus and indications of the location of trains in the stretch from the wayside apparatus to said central office, the combination comprising, (a) means at said office responsive to an indication of the approach of a train within a first preselected distance of a passing area for initiating controls to align a main track route when indications have been received that a first and a second preselected distance in approach to said passing area from the other direction are not occupied by an opposing train, (b) other means at said office responsive to an indication of the approach of a train within said first preselected distance of a passing area for initiating controls to align a siding track route when an indication of an opposing train occupying only said second opposing approach distance is previously received, (1) said other means being responsive to said approach indication for initiating controls to align a main track route when said opposing train occupies said first opposing approach distance, (c) third means at said office responsive to the indication of each train entering a passing area for initiating controls to align a route out of said passing area in the direction of travel of that train when an indication of non-occupancy of said first opposing approach distance is received, (d) start means at said office responsive to the initiation of any of said controls for aligning routes for actuating the transmission of such controls by said communication means to the wayside apparatus controlling the selected routes.

7. In a signaling system for a stretch of railroad track over which trains travel in either direction and including a plurality of spaced-apart passing areas, each with a main track section of said stretch and a siding track section, each end of each passing area including a track switch for aligning first and second routes into said main and siding track sections respectively and a group of signals for governing train movements over the routes aligned by said switch entering and leaving that passing area, the combination comprising, (a) a first means responsive to the occupancy of an approach section of said track at one end of a particular passing area by an approaching train for initiating a control action to align a first route and clear the governing signal therefor for movement of that approaching train into said particular passing area when a longer approach section at the opposite end of that passing area is free of occupancy by any opposing train or when a near portion of said opposite end approach section is already occupied by an opposing train and a second route is aligned into said particular passing area at the opposite end, (b) a second means responsive to the occupancy of said one end approach section by said approaching train for initiating a control action to align a second route and clear the governing signal therefor for movement of that approaching train into said particular passing area when only a distance portion of said opposite end longer approach section is previously occupied by said opposing train, (c) a third means responsive to the occupancy by said approaching train of the main or siding track section of said particular passing area for initiating a control action to align the corresponding route and clear the governing signal therefor for movement of that train out of said passing area at said opposite end when said longer approach section at that end is free of occupancy by an opposing train.

8. In a signaling system for a stretch of railroad track over which trains travel in either direction and including a plurality of spaced-apart passing areas, each with a main track section of said stretch and a siding track section, each end of each passing area including a track switch for aligning first and second routes into said main and siding track sections respectively and a group of signals for governing train movements over the routes aligned by said switch entering and leaving that passing area, the combination comprising, (a) a first means responsive to the occupancy of an approach section of said track at one end of a particular passing area by an approaching train for initiating control operations to align a first route and clear the governing signal therefor for movement of that approaching train into said passing area when a similar approach section at the opposite end of said particular passing area is free of occupancy by an opposing trains or when a second route into that passing area at said opposite end is aligned for an opposing train, (b) a second means responsive to the occupancy of said one end approach section by said approaching train for initiating control operations to align a second route and clear the governing signal therefor for movement of that approaching train into said particular passing area when a route into said opposite end similar approach section only has been cleared for an opposing train, (c) a third means responsive to the occupancy by said approaching train of the main or siding track section of said particular passing area for initiating control operations to align the corresponding route and clear the governing signal therefor for movement of that train out of said passing area at said opposite end when said similar approach section at that end is free of occupancy by any opposing train and no route into said similar approach section has yet been aligned.

9. In a signaling system for a stretch of railroad track over which trains travel in either direction and including a plurality of spaced-apart passing areas, each with a main track section of said stretch and a siding track section, each of each passing area including a track switch for aligning first and second routes into said main and siding track sections and respectively and a group of signals for governing train movements over the routes aligned by said switch entering and leaving that passing area, the combination comprising, (a) a first approach section on each end of a particular passing area, each extending to the next adjacent passing area in that direction, (b) a second approach section adjacent the end of each said first approach section remote from said particular passing area, each extending to the next more distant passing area in that direction, (c) a first means responsive to the occupancy of the first approach section at one end of said particular passing area by an approaching train for initiating control operations to align a first route and clear the governing signal therefor for movement of that approaching train into said passing area when the first and second approach sections at the opposite end of that particular passing area are free of occupancy by any opposing train or when a second route into said particular area is aligned at said opposite end for an opposing train occupying said opposite end first approach section, (d) a second means responsive to the occupancy of said one end first approach section by said approaching train for initiating control operations to align a second route and clear the governing signal therefor for movement of that approaching train into said particular passing area when only the second approach section at the opposite end of that passing area is occupied by an opposing train or when a second route is aligned from the passing area next adjacent said opposite end into said opposite end first approach section, (e) a third means responsive to the occupancy by said approaching train of the main or siding track section of said particular passing area for initiating control operations to align the corresponding route and clear the governing signal therefor for movement of that train out of said passing area at said opposite end when said first and second approach sections at that end are free of occupancy by any opposing train.

10. In a centralized traffic control system for a stretch of railroad track over which trains move in either direction and which includes a plurality of spaced-apart passing areas, each with a main track section of said stretch and a siding track section, each end of each passing area including a track switch for aligning first and second routes into said main and siding track sections respectively and a group of signals for governing train movements entering and leaving that passing area over the routes aligned by the corresponding switch, a route being established when the switch is aligned and the governing signal cleared, said control system including communication means for transmitting controls from a central office to the ends of the passing areas and for transmitting indications including the location of trains from the ends of the passing area; for each passing area, the combination at the office comprising, (a) a first pair of relays for each end for selecting a first and a second route into said passing area, (b) a second pair of relays for each end for selecting a first and second route out of said passing area, (c) a first circuit means for each end, each responsive to the receipt of an indication of the occupancy of an approach section at that one end by an approaching train for controlling the corresponding first pair of relays to select a route into that passing area, (1) said first circuit means being further controlled by recorded indications that a track section longer than the similar approach section adjacent the opposite end of that passing area is free of occupancy by an opposing train or that a second route into said passing area is established at said opposite end, for selecting a first relay of said corresponding first pair to select said first route, (2) said first circuit means being further controlled by a recorded indication that a route into said similar approach section at said opposite end has been previously established, for selecting a second relay of said corresponding first pair to select said second route, (d) a second circuit means for each end, each responsive to an indication of occupancy of said main or siding track section of said passing area by a train for controlling the corresponding second pair of relays at that end to select a corresponding route out of said passing area for the train when received indications record the longer track section adjacent that end free of occupancy by a train approaching said passing area and no route into the approach section at that end has been established, (e) a third circuit means for each end controlled by the corresponding first and second pair of relays for actuating the transmission to that end of said passing area of controls for switch and signals to establish the selected entering or leaving route.

References Cited by the Examiner

UNITED STATES PATENTS 2,916,612 12/59 Marple _____ 246—2
3,079,494 2/63 Preston _____ 246—5

EUGENE G. BOTZ, *Primary Examiner.*

LEO QUACKENBUSH, ARTHUR L. LA POINT, *Examiners.*

UNITED STATES PATENT OFFICE
CERTIFICATE OF CORRECTION

Patent No. 3,213,275 October 19, 1965

Homer B. Garrett et al.

It is hereby certified that error appears in the above numbered patent requiring correction and that the said Letters Patent should read as corrected below.

Column 55, line 62, for "distance" read -- distant --; column 56, line 16, for "trains" read -- train --; line 41, after "each", first occurrence, insert -- end --; same column 56, line 43, strike out "and", first occurrence.

Signed and sealed this 14th day of June 1966.

(SEAL)
Attest:

ERNEST W. SWIDER
Attesting Officer

EDWARD J. BRENNER
Commissioner of Patents